US011867352B2

(12) United States Patent
Rasmussen et al.

(10) Patent No.: US 11,867,352 B2
(45) Date of Patent: Jan. 9, 2024

(54) ADAPTER FOR CHARGING AND STABILIZING CAMERAS

(71) Applicant: Apple Inc., Cupertino, CA (US)

(72) Inventors: Timothy J. Rasmussen, San Jose, CA (US); Christopher S. Graham, San Francisco, CA (US); Eric S. Jol, San Jose, CA (US); Aaron A. Oro, Palo Alto, CA (US); Miranda L Daly, Mountain View, CA (US); Ibuki Kamei, San Jose, CA (US)

(73) Assignee: Apple Inc., Cupertino, CA (US)

(*) Notice: Subject to any disclaimer, the term of this patent is extended or adjusted under 35 U.S.C. 154(b) by 172 days.

(21) Appl. No.: 17/317,725

(22) Filed: May 11, 2021

(65) Prior Publication Data
US 2022/0042643 A1 Feb. 10, 2022

Related U.S. Application Data

(60) Provisional application No. 63/081,844, filed on Sep. 22, 2020, provisional application No. 63/061,458, filed on Aug. 5, 2020.

(51) Int. Cl.
H01M 10/46 (2006.01)
F16M 13/02 (2006.01)
(Continued)

(52) U.S. Cl.
CPC .......... F16M 13/02 (2013.01); G03B 17/561 (2013.01); H02J 7/0042 (2013.01); H02J 50/10 (2016.02); H04B 5/0075 (2013.01)

(58) Field of Classification Search
CPC ........ H02J 7/0042; H02J 7/0044; H02J 50/10; H02J 50/005; G03B 17/561; H04B 5/0075; F16M 13/02
(Continued)

(56) References Cited

U.S. PATENT DOCUMENTS 6,888,940 B1  5/2005 Deppen
8,073,324 B2  12/2011 Tsai
(Continued)

FOREIGN PATENT DOCUMENTS

CN  104467129 A  3/2015
CN  205670700 U  11/2016
(Continued)

Primary Examiner — Edward Tso
(74) Attorney, Agent, or Firm — Kilpatrick Townsend & Stockton LLP

(57) ABSTRACT

Adapters that can mount phones or other electronic devices on camera stabilizers, where the adapters are portable, can capable of charging, and can allow cameras on the phones to be easily leveled or adjusted to any orientation. An adapter can include a base portion having an opening, where a fastener in the opening can attach the adapter to a camera stabilizer, as well as an upright portion having an enclosure and a contacting surface. The enclosure can house a first magnet array for magnetically attracting a second magnet array in a phone, such that the phone can be readily mounted to a camera stabilizer. The enclosure can further house near-field communication circuits and components for identification. The upright portion and base portion can be connected by a fixed right angle or by a hinge, which can allow the adapter to fold into a more convenient form.

20 Claims, 50 Drawing Sheets

(51) Int. Cl.
*G03B 17/56* (2021.01)
*H04B 5/00* (2006.01)
*H02J 50/10* (2016.01)
*H02J 7/00* (2006.01)

(58) Field of Classification Search
USPC .................. 320/107, 108, 109, 114, 115
See application file for complete search history.

(56) References Cited

U.S. PATENT DOCUMENTS

| | | | |
|---|---|---|---|
| 8,558,411 | B2 | 10/2013 | Baarman |
| 8,688,037 | B2 | 4/2014 | Chatterjee et al. |
| 8,907,752 | B2 | 12/2014 | Wodrich et al. |
| 8,912,686 | B2 | 12/2014 | Stoner et al. |
| 9,038,971 | B1 | 5/2015 | Guthrie |
| 9,106,083 | B2 | 8/2015 | Partovi |
| 9,112,364 | B2 | 8/2015 | Partovi |
| 9,413,191 | B2 | 8/2016 | Kim et al. |
| 9,627,130 | B2 | 4/2017 | Golko et al. |
| 9,977,205 | B2 | 5/2018 | Williams et al. |
| 10,153,666 | B2 | 12/2018 | Lee et al. |
| 10,243,402 | B2 | 3/2019 | Park et al. |
| 10,273,942 | B2 | 4/2019 | Nakamura |
| 10,404,089 | B2 | 9/2019 | Kasar et al. |
| 10,418,839 | B2 | 9/2019 | Miller |
| 10,485,312 | B2 * | 11/2019 | Rodriguez .............. A45C 11/00 |
| 10,491,041 | B2 | 11/2019 | Wittenberg et al. |
| 10,622,842 | B2 | 4/2020 | Lee et al. |
| 11,342,800 | B2 | 5/2022 | Oro et al. |
| 2009/0212637 | A1 | 8/2009 | Baarman et al. |
| 2009/0278642 | A1 | 11/2009 | Fullerton et al. |
| 2010/0081377 | A1 | 4/2010 | Chatterjee et al. |
| 2012/0068942 | A1 | 3/2012 | Lauder |
| 2012/0112553 | A1 | 5/2012 | Stoner, Jr. et al. |
| 2012/0146576 | A1 | 6/2012 | Partovi |
| 2012/0306440 | A1 | 12/2012 | Yeh |
| 2013/0099730 | A1 | 4/2013 | Yoon |
| 2013/0113423 | A1 | 5/2013 | Baarman |
| 2013/0187596 | A1 | 7/2013 | Eastlack |
| 2013/0260677 | A1 | 10/2013 | Partovi |
| 2014/0242429 | A1 | 8/2014 | Lee |
| 2016/0094076 | A1 | 3/2016 | Kasar et al. |
| 2016/0105047 | A1 | 4/2016 | Cui |
| 2016/0128210 | A1 | 5/2016 | Lee |
| 2016/0206065 | A1 | 7/2016 | Ehrlich |
| 2017/0005399 | A1 | 1/2017 | Ito et al. |
| 2017/0070076 | A1 | 3/2017 | Karanikos |
| 2017/0245040 | A1 | 8/2017 | Hankey |
| 2018/0248406 | A1 | 8/2018 | Bae et al. |
| 2018/0301936 | A1 | 10/2018 | Lee et al. |
| 2019/0089188 | A1 | 3/2019 | Chien et al. |
| 2019/0198212 | A1 | 6/2019 | Levy |
| 2019/0363565 | A1 | 11/2019 | Graham et al. |
| 2020/0346006 | A1 | 11/2020 | Eigentler et al. |
| 2021/0099026 | A1 | 4/2021 | Larsson |
| 2021/0099027 | A1 | 4/2021 | Larsson |
| 2022/0014655 | A1 | 1/2022 | Hu |

FOREIGN PATENT DOCUMENTS

| | | |
|---|---|---|
| CN | 106877429 A | 6/2017 |
| CN | 207442540 U | 6/2018 |
| CN | 208581077 U | 3/2019 |
| EP | 0823717 A2 | 2/1998 |
| JP | 2013120837 A | 6/2013 |
| JP | 3197750 U | 5/2015 |
| JP | 2015171166 A | 9/2015 |
| JP | 6233504 B2 | 11/2017 |
| TW | M414057 U | 10/2011 |
| TW | 201347349 A | 11/2013 |
| TW | 201711335 A | 3/2017 |
| WO | 2010129369 A2 | 11/2010 |
| WO | 2011156768 A2 | 12/2011 |
| WO | 2016053633 A1 | 4/2016 |

* cited by examiner

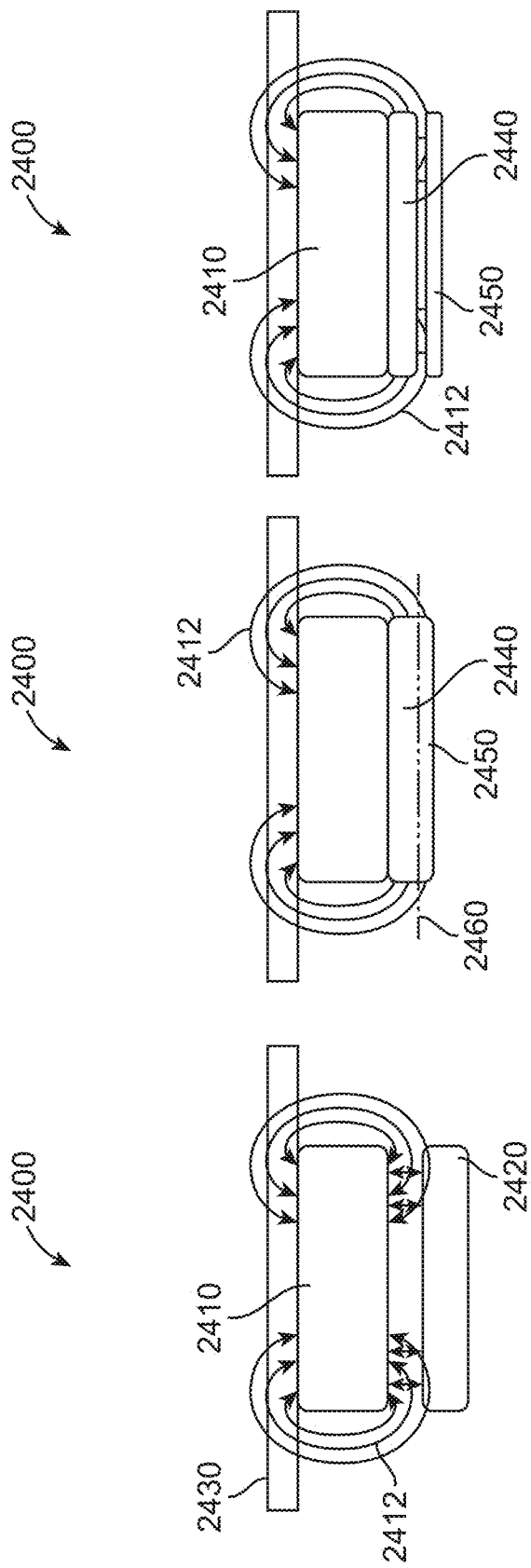

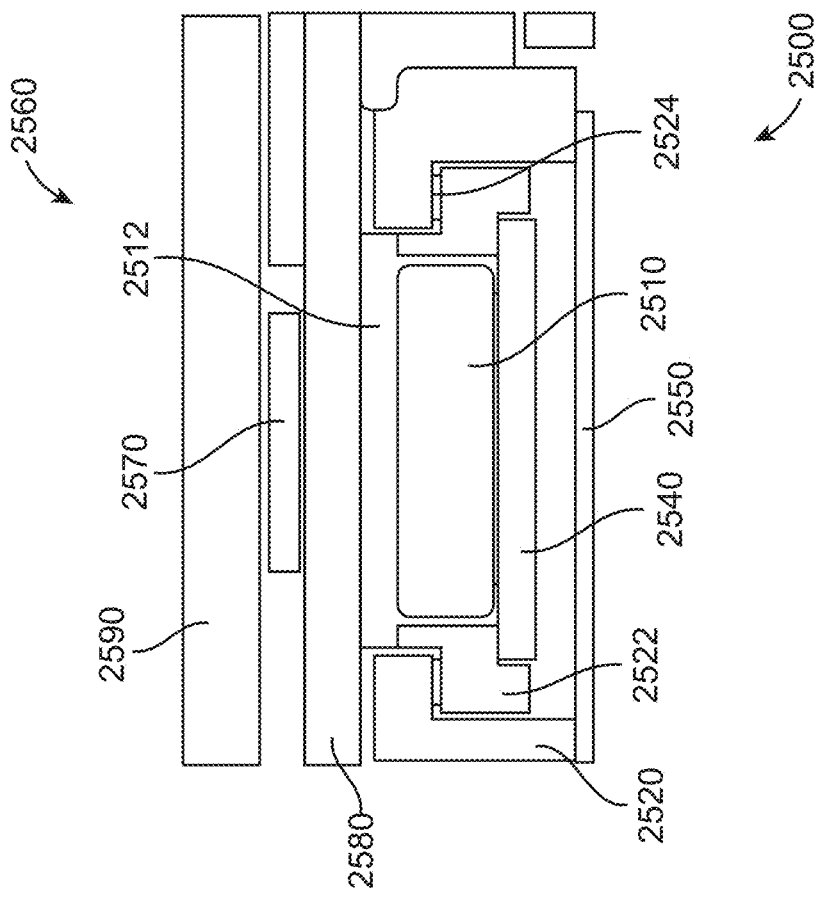
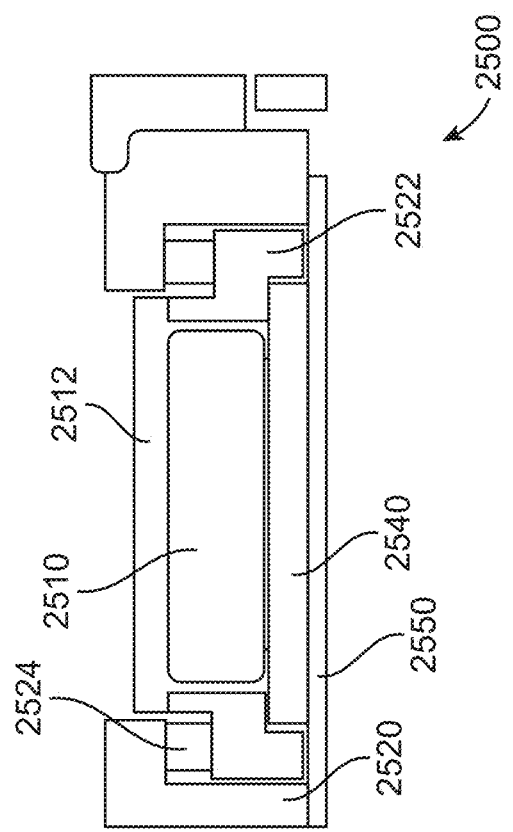
FIG. 25B
FIG. 25A

ADAPTER FOR CHARGING AND STABILIZING CAMERAS

CROSS-REFERENCE TO RELATED APPLICATIONS

The present application claims the benefit of and priority to U.S. provisional application No. 63/081,844, filed Sep. 22, 2020, and 63/061,458, filed Aug. 5, 2020, which are incorporated by reference.

BACKGROUND

The capabilities of some electronic devices to perform non-traditional tasks has been growing at an increasing rate. Examples include watches that can track a runner's course and tablet computers that can provide turn-by-turn directions. Other examples include the video and still cameras that are provided on some phones.

New phones can include multiple cameras, where each camera has a different focal length or range of focal lengths and can optimized for specific types of images, such as portraits, group photos, or low-light photography. Specialized software and processors can help to improve the quality of these various types of images. Some of these cameras have such a high quality that they are replacing traditional single-lens reflex (SLR) and other cameras in many applications.

The adoption of phone cameras into these non-traditional uses has been slowed by a lack of enabling infrastructure. While there are vast numbers and types of camera stabilizers such as tripods, gimbals, and other devices for SLR cameras, the same does not exist for cameras on phones.

Accordingly, it can be desirable to provide adapters, mounts, and other devices to allow existing camera stabilizers to be used with cameras on phones. Also, since many photographers have camera bags and camera backpacks that are already loaded with equipment, it can be desirable that these adapters be small and compact.

In many circumstances, these phone cameras might be used for very long periods. They can also be used in power-intensive applications such as recording video. As such, it can also be desirable that a phone be able to be charged while the phones are mated to the adapters. Since these adapters might be used in various environments, it can also be desirable that the cameras on the phones be readily placed in various orientations or positions to provide flexibility for a user.

Thus, what is needed are adapters that can mount phones on camera stabilizers, where the adapters are highly portable and are useful in a number of situations and environments.

SUMMARY

Accordingly, embodiments of the present invention can provide adapters that can attach phones or other electronic devices to camera stabilizers, where the adapters are highly portable and are useful in a number of situations and environments. An illustrative embodiment of the present invention can provide an adapter having a lateral base portion having an opening. The opening can be used to fasten the adapter to a camera stabilizer such as a tripod, gimbal, pier, drone, or other device. The adapter can further have an upright portion, where the upright portion can include a contacting surface for physically contacting a phone. The contacting surface can have a high friction or high stiction surface to increase friction between the adapter and phone. This can increase a shear force needed to remove the phone from the adapter. The upright portion and the base portion can be connected through a fixed right angle. The upright portion and the base portion can alternatively be connected though a hinge. This can allow the upright portion to be folded closed, that is, next to the base portion for a more compact arrangement, or opened to an angle, such as a right-angle. This can allow the adapter to more adroitly fit in a user's likely already crowded bag or backpack.

The upright portion can further include an enclosure forming a ring around the contacting surface, as well as sides and a back of the upright portion. The enclosure can house or support an attachment feature to attach a phone or other electronic device to the adapter. The attachment feature can be a magnet, a plurality of magnets, or a first magnet array. The attachment feature, such as a first magnet array, can magnetically attract a second attachment feature, such as a second magnet array, in a phone or other electronic device. The first magnet array can be positioned behind the ring around the contacting surface or elsewhere in the enclosure. The first magnet array can be fixed in place in the enclosure. Alternatively, when the phone or other electronic device is in proximity to the adapter, the first magnet array can move within the enclosure towards the contacting surface to increase the magnetic attraction between the phone and the adapter. This can increase a normal force necessary to remove the phone from the adapter. The first magnet array can have a shape and arrangement such that the phone (and its camera) can be freely rotatable about an axis of connection with the adapter. This can help in leveling and otherwise positioning the camera in a portrait or landscape mode, as well as at any angle between them. The adapter can further include additional magnets separate from the first magnet array to improve the alignment of the phone to the adapter at a specific position, such as in a portrait, landscape, or other orientation. The magnetic attachment between the electronic device and the adapter can provide a fast and simple way of attaching a phone or other electronic device to a camera stabilizer.

The enclosure can further include charging components such as an inductive coil for providing inductive charging and transmitting data to the phone and for receiving data from the phone. The enclosure can further include shielding to magnetically isolate the inductive coil from the first magnet array. This isolation can improve inductive coupling from the inductive coil to a corresponding coil of a power receiving phone or electronic device. Control electronics that receive an input power supply and generate alternating currents through the inductive coil can also be included in the enclosure. These alternating currents can generate a time-varying magnetic flux in the corresponding coil. The time-varying magnetic flux can generate currents in the corresponding coil that can be used to charge a battery in the phone. The time-varying magnetic flux can be modulated to transmit data to the phone. The control electronics can also sense currents induced in the coil in the adapter by the phone or other electronic device. The control circuitry can further read data transmitted by the phone using these induced currents. The data can include device identification for the phone, charge status, charging level requests, and other information.

Power and data can be received by an adapter through a cable. Data can also be transmitted by the adapter over this cable. The cable can be tethered to circuitry and components in the adapter, or the cable can include a connector insert that can be inserted into a connector receptacle in the adapter. The connector receptacle or other cable connection can be located in the base portion, upright portion, right-angle portion, or other portion of the adapter. The cable can provide a connection to the adapter from a power converting brick, battery pack, electronic device, or other power supply source. The cable can also provide data to be transmitted from the adapter to a phone or other external electronic device.

The adapter enclosure can further house near-field communication circuitry and components, such as a near-field communication tag and capacitors. This near-field communication circuitry in the adapter can be or include a near-field communication transmitter that can communicate with a near-field communication receiver in the phone or other electronic device. The near-field communication circuitry and components can allow a phone or other electronic device to detect an attached adapter for a camera stabilizer. This recognition can prompt the phone to perform one or more activities. For example, the phone can launch one or more camera applications, where the launched applications can be predetermined by the adapter manufacturer, software developers, the user, or others. A leveling application can automatically start on the phone after the recognition of an adapter attachment. Other devices, such as a watch that can be used to control the phone's camera, can be prompted to run specific software by the phone or the adapter. Further, specific applications for specific camera stabilizers can be launched. Other functions, such as notifications, can be disabled or silenced. The near-field communication circuitry and components can further provide identification and authentication information to the phone. This can be used by the phone in determining whether it is safe to be charged by the adapter, and at what power level the adapter can charge the phone.

While embodiments of the present invention are well-suited to providing adapters between phones and camera stabilizers, they can be used in other types of applications as well. For example, embodiments of the present invention can provide adapters that can be used between tablet computers and camera stabilizers, or between phones or tablets and other structures.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 12B shows an axial cross-section view through a portion of the system of FIG. 12A, while

FIGS. 24A through 24C illustrate moving magnets according to an embodiment of the present invention;

FIGS. 25A and 25B illustrate a moving magnetic structure according to an embodiment of the present invention;

DESCRIPTION OF ILLUSTRATIVE EMBODIMENTS

Figure 1:
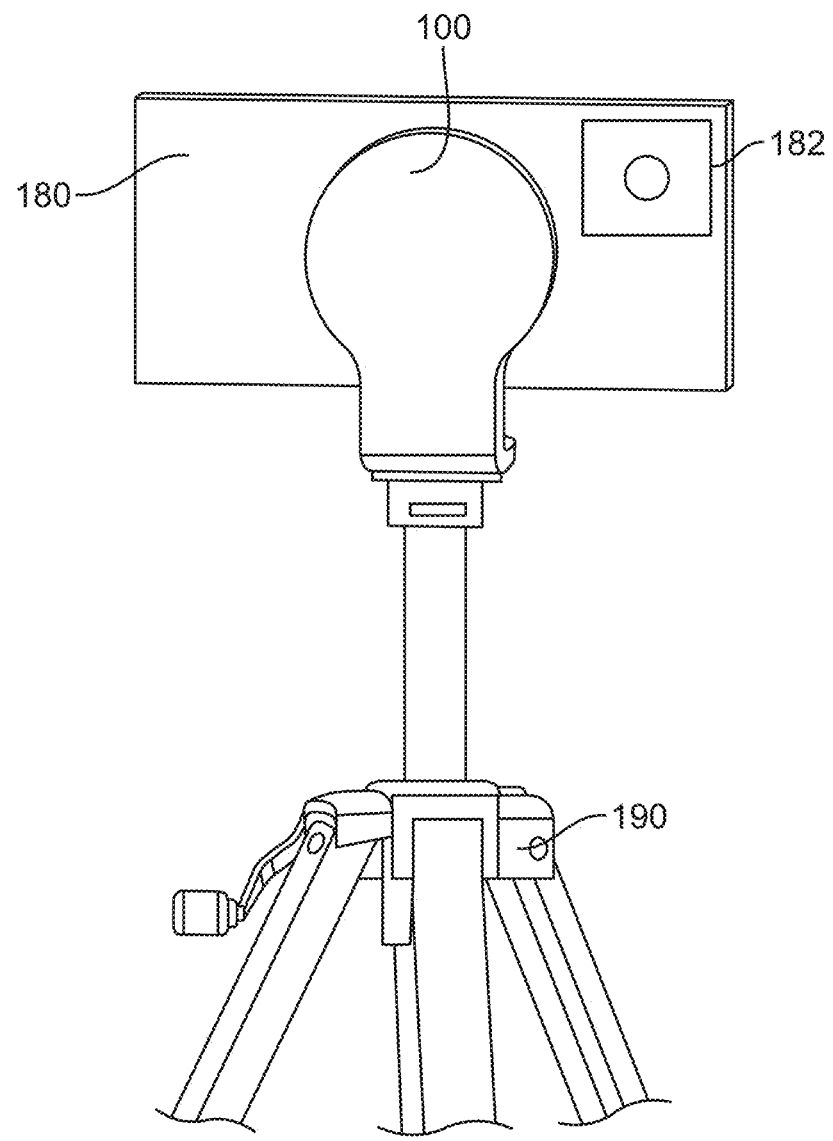
FIG. 1 illustrates an adapter for a camera stabilizer according to an embodiment of the present invention.

FIG. 1 illustrates an adapter for a camera stabilizer according to an embodiment of the present invention. Adapter 100 can be used to secure electronic device 180 to camera stabilizer 190. In this particular example, electronic device 180 can be a phone, though electronic device 180 can instead be a tablet computer, wearable computing device, camera (such as an SLR or a camera colloquially referred to as a point and shoot camera), or other electronic or mechanical device. Electronic device 180 can include one or more lenses, flash units, Light Detection and Ranging (LiDAR) Scanners or other components 182. Camera stabilizer 190 is shown as a tripod, though camera stabilizer 190 can instead be a gimbal, pier, drone, or other camera stabilizer or other control or positioning device.

Figure 4:
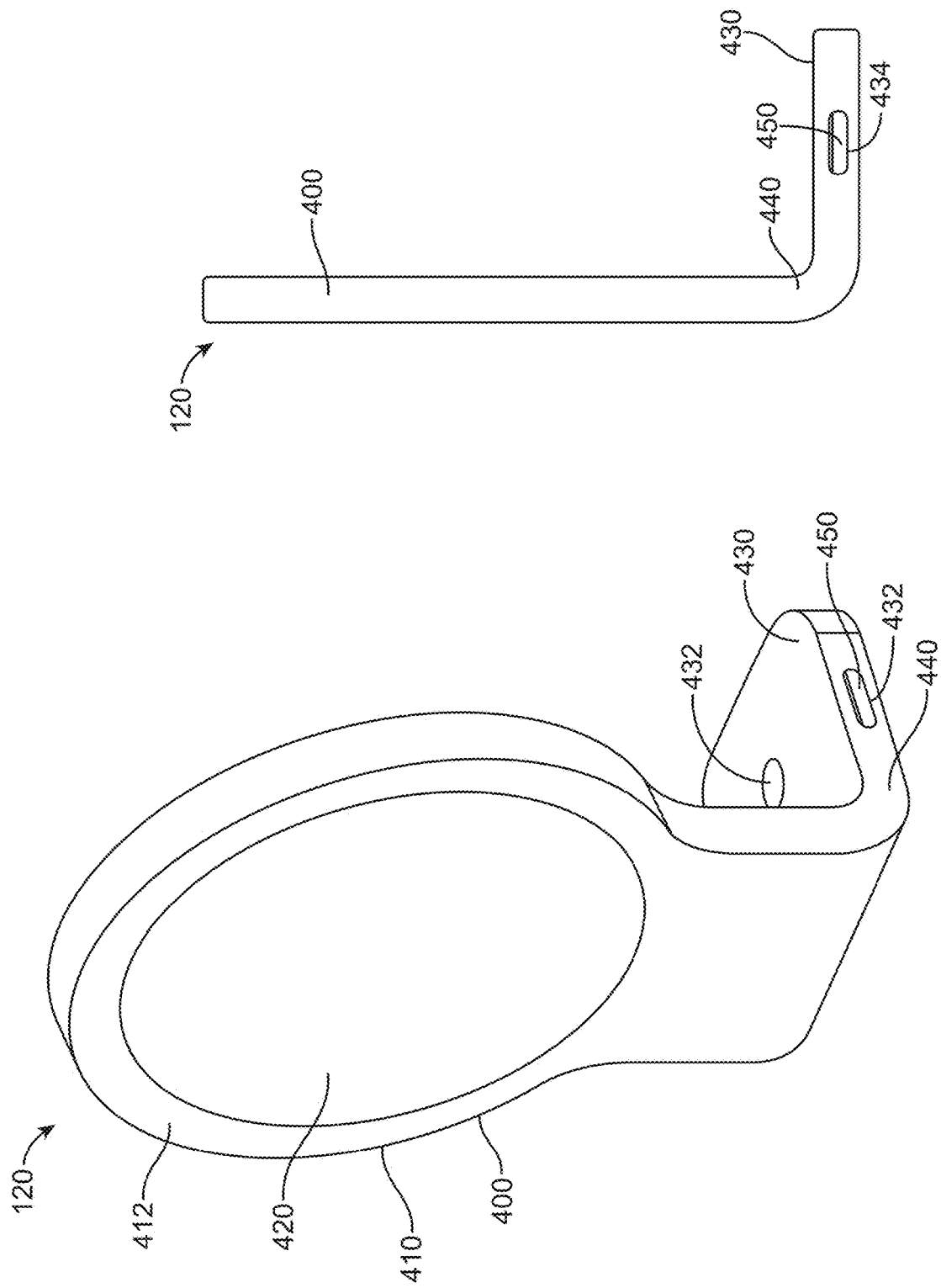
FIG. 4A and FIG. 4B illustrate an adapter for a camera stabilizer according to an embodiment of the present invention.

In these and other embodiments of the present invention, adapter 100 can be a passive adapter to mechanically secure electronic device 180 to camera stabilizer 190. In these and other embodiments the present invention, adapter 100 can instead be a powered adapter. When adapter 100 is a powered adapter, adapter 100 can include a connector receptacle 450 (shown in FIG. 4) for a cable (not shown.) A power converter (not shown) can further be included in adapter 100 or can be separate from adapter 100 and attached to camera stabilizer 190 or elsewhere.

Photographers often have a large number of devices, lenses, batteries, and other components. They can often carry these components in a camera bag, in which space can be at a premium. Accordingly, it can be desirable that adapter 100 have a small form factor. It can also be desirable that adapter 100 fold into a compact shape for storage and transport. An example is shown in the following figure.

Figure 2:
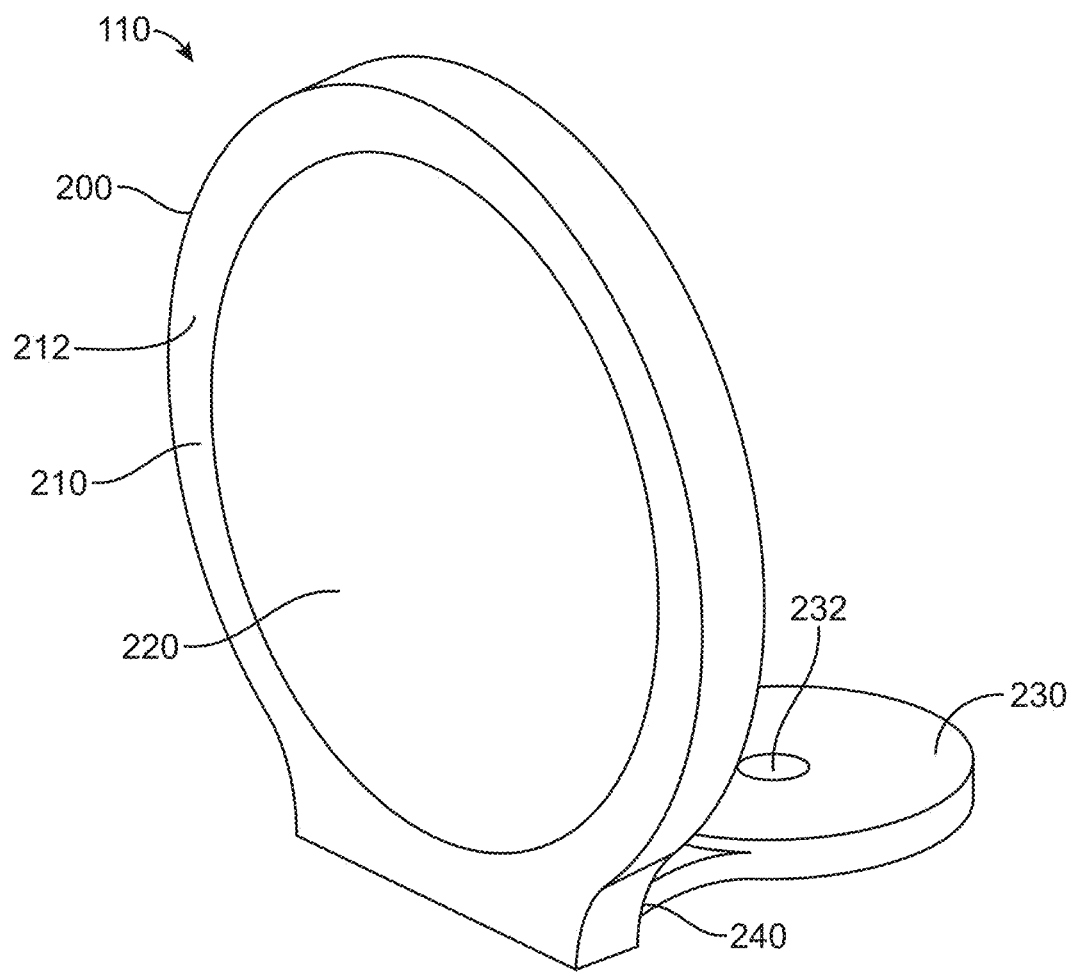
FIG. 2 illustrates an adapter for a camera stabilizer according to an embodiment of the present invention.

FIG. 2 illustrates an adapter for a camera stabilizer according to an embodiment of the present invention. Adapter 110 can be used as adapter 100 in FIG. 1, or as an adapter in other systems according to an embodiment of the present invention. Adapter 110 can include base portion 230 attached to upright portion 200 at hinge 240. Base portion 230 can include a hole or opening 232 for accepting a fastener (not shown) to secure adapter 110 to camera stabilizer 190 (shown in FIG. 1.) Upright portion 200 can include enclosure 210. Enclosure 210 can form ring 212 around contacting surface 220. It should be noted that while ring 212 is shown in this example as being roughly circular, in other embodiments of the present invention ring 212 can have an oval, square, or other shape. Contacting surface 220 can physically contact electronic device 180. Contacting surface 220 can be a high friction or high stiction surface that increases a shear force needed to remove electronic device 180 from adapter 110. Contacting surface 220 can also be at least somewhat adhesive. This can increase a normal force needed to remove electronic device 180 from adapter 110. Contacting surface 220, and the other contacting surfaces shown here or otherwise utilized by an embodiment of the present invention, can be formed of an elastomer, plastic, PVC plastic, rubber, silicon rubber, urethane, polyurethane, nitrile, polycarbonate (PC), neoprene, silicone, or other material. Enclosure 210, and the other enclosures shown here or otherwise utilized by an embodiment of the present invention, can be formed of a metal, such as stainless steel or aluminum, plastic, nylon, or other conductive or nonconductive material. They can be formed using computer numerical control (CNC) or other type of machining, stamping, metal injection molding (MIM), or other technique.

Figure 5:
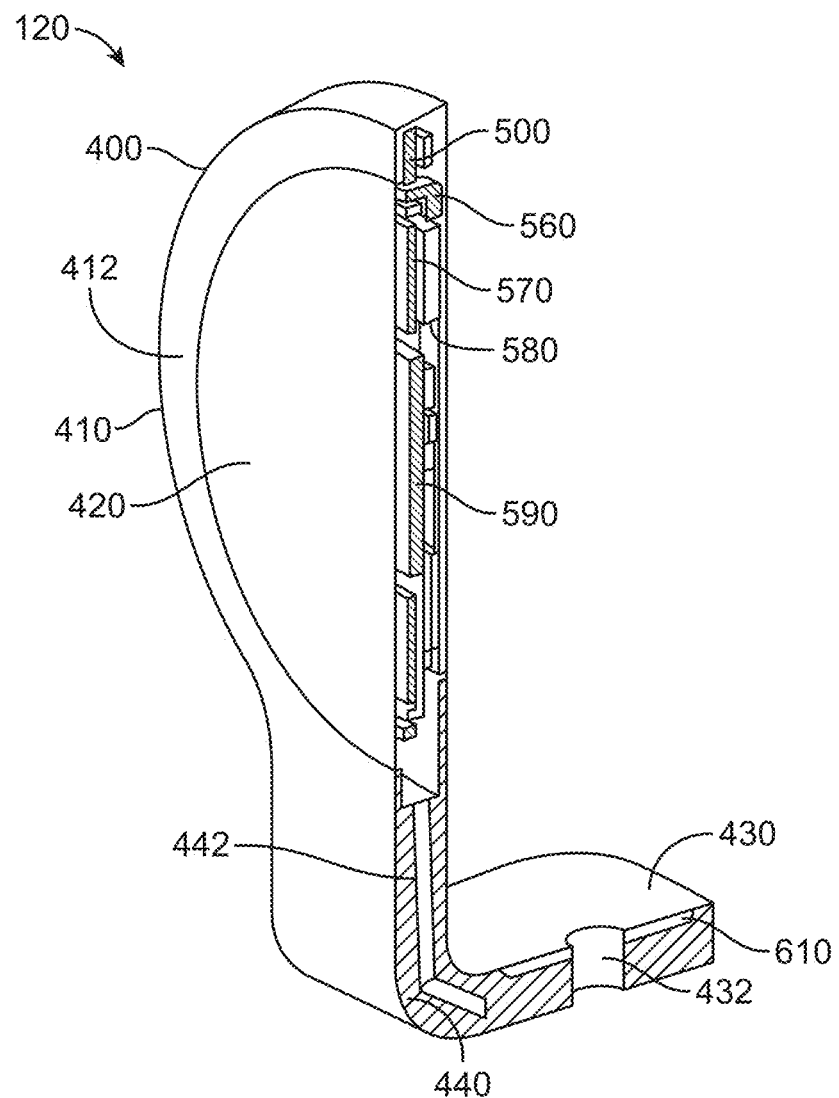
FIG. 5 illustrates a cutaway side view of the adapter of FIG. 4A.

Enclosure 210 and contacting surface 220 can enclose or house one or more attachment features that can be used to secure electronic device 180 to adapter 100. For example, enclosure 210 and contacting surface 220 can enclose one or more magnets 500, as shown in FIG. 5. These one or more magnets 500 can attract corresponding magnets (shown as secondary alignment components 818 in FIG. 8) in electronic device 180 (shown in FIG. 1.) This magnetic attraction can secure electronic device 180 to adapter 110 in a direction normal to, or orthogonal to, contacting surface 220. The magnetic connection between electronic device 180 and adapter 110 can provide a fast and simple way of attaching a phone or other electronic device 180 to a camera stabilizer 190 (shown in FIG. 1.)

Accordingly, it can be desirable for adapter 110 to provide a strong magnetic force to hold electronic device 180 securely in place to avoid an inadvertent disconnection. However, when no electronic device 180 is mated with adapter 110, magnets 500 can cause undesirable effects. For example, magnets 500 can inadvertently demagnetize information, such as information on credit cards or transit passes. Accordingly, a magnetic field provided by magnets 500 can be increased when adapter 110 is, or is about to be, mated with electronic device 180.

This magnetic field can be increased in various ways to more securely attach electronic device 180 to adapter 100. For example, the magnetic field can be generated by an electromagnet (not shown) used along with, or in place of, magnets 500. Current through the electromagnet can be increase increased during mating of adapter 110 to electronic device 180 to increase the magnetic attraction provided by the electromagnet. Also or instead, magnets 500 can move from a first position to a second position when adapter 110 is, or is about to be, mated with electronic device 180. Examples of magnets 500 that either move or are fixed (nonmoving) are shown below.

Figure 3:
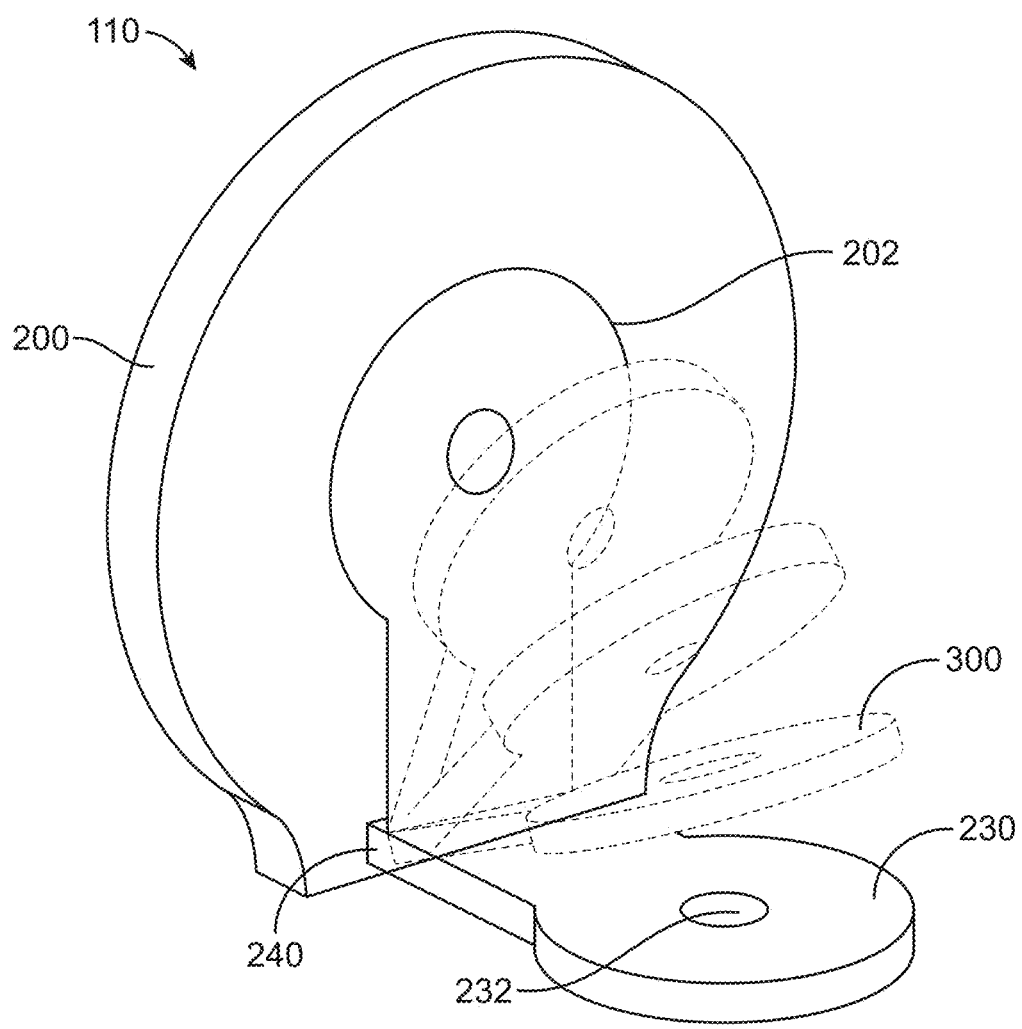
FIG. 3 illustrates the backside of the adapter of FIG. 2.

FIG. 3 illustrates the backside of the adapter of FIG. 2. Adapter 110 can include a base portion 230 and an upright portion 200. Base portion 230 can be joined to upright portion 200 at hinge 240. Hinge 240 can allow base portion 230 to move through positions 300 for storage. Base portion 230 can fit in recess 202 in a back side of upright portion 200. Since base portion 230 fits in recess 202, base portion 230 does not contribute to the overall size of adapter 110 when folded for transport, thereby saving space. Base portion 230 can include opening 232. A fastener (not shown) can pass through opening 232 to secure adapter 110 to camera stabilizer 190, as shown in FIG. 1. In these and other embodiments of the present invention, opening 232 can be replace by a fastener attached to base portion 230, where the fastener is used to attach adapter 110 to a camera stabilizer.

FIGS. 4A and 4B illustrate an adapter for a camera stabilizer according to an embodiment of the present invention. In FIG. 4A, adapter 120 can be used as adapter 100 in FIG. 1, or as an adapter in other systems according to an embodiment of the present invention. Adapter 120 can include base portion 430 and upright portion 400. Base portion 430 can be joined to upright portion 400 by right-angle portion 440. Base portion 430 can include opening 432 for accepting a fastener (not shown) to secure adapter 120 to camera stabilizer 190 (shown in FIG. 1.) Base portion 430 can include opening 434 in a side for connector receptacle 450. Connector receptacle 450 can be a universal serial bus (USB) connector, such as a USB Type-C connector, a Lightning™ connector, or other type of connector. Connector receptacle 450 can accept a connector insert of a cable (not shown) through which power and data can be received by adapter 120 and data can be provided by adapter 120. Upright portion 400 can include enclosure 410 and contacting surface 420. Enclosure 410 can provide ring 412 around contacting surface 420. It should be noted that while ring 412 is shown in this example as being roughly circular, in other embodiments of the present invention ring 412 can have an oval, square, or other shape. Contacting surface 420 can physically contact electronic device 180 (shown in FIG. 1.) Contacting surface 420 can be a high friction or high stiction surface that increases a shear force needed to remove electronic device 180 from adapter 120. Contacting surface 420 can also be at least somewhat adhesive. This can increase a normal force needed to remove electronic device 180 from adapter 120. Contacting surface 420 can be formed of an elastomer, plastic, PVC plastic, rubber, silicon rubber, urethane, polyurethane, nitrile, neoprene, silicone, or other material.

In FIG. 4B, adapter 120 can include base portion 430 and upright portion 400. Base portion 430 can be joined to upright portion 400 by right-angle portion 440. Base portion 430 can include opening 434 in a side for connector receptacle 450. Connector receptacle 450 can accept a connector insert of a cable (not shown) through which power and data can be received by adapter 120 and data can be provided by adapter 120.

FIG. 5 illustrates a cutaway side view of the adapter of FIG. 4A. Adapter 120 can include base portion 430 having opening 432, as well as upright portion 400. Base portion 430 can be joined to upright portion 400 by right-angle portion 440. Upright portion 400 can be housed by enclosure 410 and contacting surface 420.

Enclosure 410 and contacting surface 420 can house magnets 500. Magnets 500 can be fixed in place relative to enclosure 410. Alternatively, magnets 500 can move between at least a first position and a second position. For example, when adapter 120 is not mated with electronic device 180 (shown in FIG. 1), magnets 500 can be in the first or recessed position away from ring 412 and contacting surface 420. This can reduce a stray magnetic field at contacting surface 420, which can help to protect magnetically stored information, such as information stored on a user's credit cards or transit passes. As electronic device 180 is brought into the proximity of adapter 120, magnets (shown as secondary alignment components 818 in FIG. 8) in the electronic device 180 can attract magnets 500 in adapter 120. This attraction can cause the movement of magnets 500 to the second position, which can be closer to a surface of ring 412 and contacting surface 420. This change in position can increase the magnetic field between magnets 500 and magnets in electronic device 180, thereby securing electronic device 180 in place against contacting surface 420 of adapter 120. Examples of magnets 500 that are fixed as well as examples of magnets 500 that are capable of moving are shown in figures below.

Electronic device 180 can often operate in a high power consumption mode when it is attached to adapter 120. For example, electronic device 180 can include a flash. Electronic device 180 can operate in a video mode, which can involve writing large volumes of data to a memory. These and other activities can consume a fair amount of power from a battery internal to electronic device 180.

Accordingly, in these and other embodiments of the present invention, it can be desirable for adapter 120 to be able to charge electronic device 180. For this reason, enclosure 410 and contacting surface 420 can further house coil 570 and control electronics 590. Coil 570 can be shielded by shield 580. Shield 580 can be formed of a material that has high magnetic permeability, such as stainless steel. Shield 580 can shield magnets 500 from coil 570. Shield 580 can further improve the inductive coupling between coil 570 and a corresponding coil (shown as inductive coil 810 in FIG. 8) in electronic device 180. Control electronics 590 can provide an alternating current to coil 570. The resulting current in coil 570 can generate a time-varying magnetic flux that can induce sympathetic currents in a corresponding coil in electronic device 180. Control electronics (not shown) in electronic device 180 can use these induced currents to charge an internal battery.

Coil 570 and control electronics 590 can also allow adapter 120 to receive data from electronic device 180. For example, control circuits in electronic device 180 can provide current to the coil in electronic device 180. These currents can generate sympathetic currents in coil 570 in adapter 120. These sympathetic currents in coil 570 can be read by control electronics 590 in adapter 120. These currents can be modulated in amplitude, phase, or frequency to convey data from electronic device 180 to adapter 120. This data can include charge status, identification, authorization, information regarding power receiving capability, update information, or other types of information or data. For example, electronic device 180 can inform adapter 120 of the charging status and power receiving capability of electronic device 180. This data can be used by adapter 120. This data can also be provided to an external device by control electronics 590 through flexible circuit board 442, board 610, and a cable (not shown.) For example, image and sound captured by electronic device 180 can be provided to an external device (not shown), such as a monitor, through adapter 120.

Similarly, data can be sent from adapter 120 to electronic device 180. Data can be generated by adapter 120 or received by adapter 120 through connector receptacle 450. Control electronics 590 can receive data (for example from board 610 through flexible circuit board 442) and generate currents in coil 570. The currents in coil 570 can be modulated in amplitude, phase, or frequency to convey data from adapter 120 to electronic device 180. This data can include identification, authorization, information regarding power providing capability, or other types of information or data. The currents in coil 570 can generate induced currents in the corresponding coil in electronic device 180, which can be read by the control electronics in electronic device 180.

Power and data can be received at board 610 through a cable attached at connector receptacle 450 (shown in FIG. 4A) on adapter 120. Alternatively, board 610 can receive power and data through a cable tethered to adapter 120, for example though opening 434 (shown in FIG. 4A) in base portion 430. Board 610 can provide power and data to control electronics 590 via flexible circuit board 442 or other conduit in right-angle portion 440.

When an electronic device 180 is attached to adapter 120, it can be useful for electronic device 180 to determine that it is attached to an adapter for a camera stabilizer, and in response, to enter a camera mode. For example, electronic device 180 can activate camera hardware and applications, such as filtering, leveling, and other applications. It can also be useful for certain applications to be deactivated. For example, it can be desirable to turn off notifications or other applications that could otherwise be distracting to a user.

Accordingly, enclosure 410 and contacting surface 420 of adapter 120 can further enclose near-field communications components 560. Near-field communications components 560 can include a tag, capacitor, and support ring 562. The near-field communications components 560 can form a near-field communications transmitter that can communicate with a near-field communications receiver (not shown) in electronic device 180. A magnetometer or other sensor (not shown) in electronic device 180 can sense magnets 500 in adapter 120. In response, electronic device 180 can activate internal near-field communications components and circuitry (not shown) to generate a radio-frequency field. Near-field communications transmitter components 560 in adapter 120 can receive this radio-frequency field and use it to power a tag. The tag can then modulate this radio-frequency field. The modulated radio-frequency field can be read by the near field communications receiver components and circuitry in electronic device 180. Electronic device 180 can then determine that it is mounted on adapter 120. Once this determination is been made, electronic device 180 can enter a camera mode and turn on and turn off applications as described above.

Figure 6:
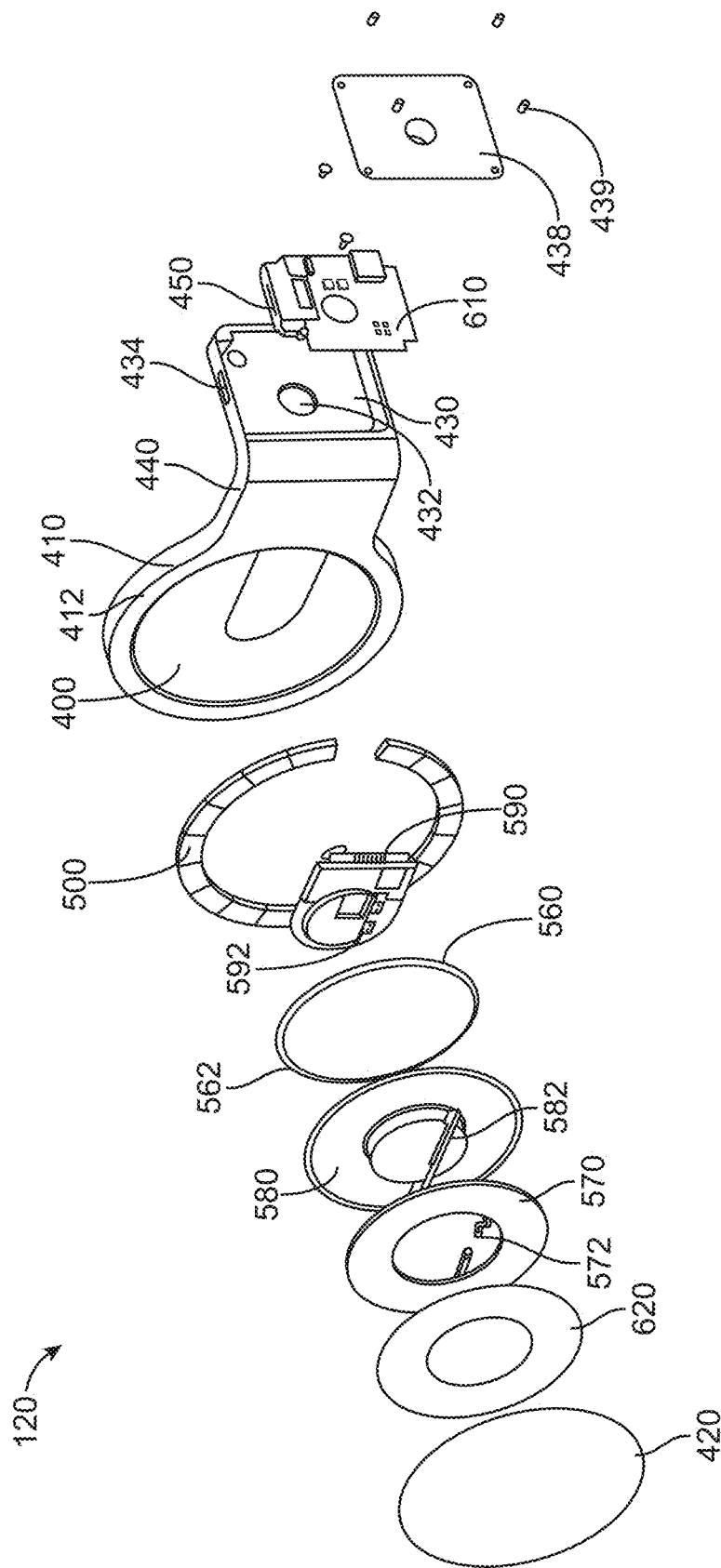
FIG. 6 is an exploded view of the adapter of FIG. 4A.

FIG. 6 is an exploded view of the adapter of FIG. 4A. Adapter 120 can include base portion 430 attached to upright portion 400 by right-angle portion 440. Upright portion 400 can include enclosure 410 and contacting surface 420. Magnets 500 can be housed by enclosure 410 and contacting surface 420. Magnets 500 can encircle coil 570. Near-field communications transmitter components 560 can be supported by support ring 562. Control electronics 590 can be located in a center of coil 570. Coil 570 can be shielded by ferrite or shield 580 and e-shield 620. Leads 572 of coil 570 can pass through slot 582 in ferrite or shield 580 to attach to pads 592 of control electronics 590. Magnets 500 can be positioned behind ring 412 of enclosure 410.

Base portion 430 can include board 610, which can be connected to control electronics 590 through flexible circuit board 442 (shown in FIG. 5.) Board 610 can support connector receptacle 450, which can be available at opening 434. Board 610 can be protected by bottom plate 438, which can be attached to base portion 430 by fasteners 439. A fastener (not shown) can pass through opening 432 in base portion 430 to secure adapter 120 to camera stabilizer 190 (shown in FIG. 1.) In these and other embodiments of the present invention, opening 432 can be replace by a fastener attached to base portion 430, where the fastener is used to attach adapter 120 to a camera stabilizer.

In these and other embodiments of the present invention, these structures can be formed of various materials in various ways. Contacting surface 420, and the other contacting surfaces shown here or otherwise utilized by an embodiment of the present invention, can be formed of an elastomer, plastic, PVC plastic, rubber, silicon rubber, urethane, polyurethane, nitrile, polycarbonate (PC), neoprene, silicone, or other material. Enclosure 410 and bottom plate 438, and the other enclosures, bottom plates, and other enclosure portions, shown here or otherwise utilized by an embodiment of the present invention, can be formed of a metal, such as stainless steel or aluminum, plastic, nylon, or other conductive or nonconductive material. They can be formed using computer numerical control (CNC) or other type of machining, stamping, metal injection molding (MIM), or other technique. Ferrite or shield 580 can be formed of a material that has high magnetic permeability, such as stainless steel, ferritic stainless steel, oxides of iron, manganese, zinc, or other material or combination of materials. E-shield 620 can be formed of a layer of copper or other conductive material to intercept electric fields between coil 570 and a corresponding coil (not shown) in electronic device 180 (shown in FIG. 1), and can have a low magnetic permeability to pass magnetic fields between coil 570 and the corresponding coil. E-shield 620 can include breaks to prevent the formation of eddy currents. Board 610 can be formed of FR-4 or other material.

Some or all of the circuitry and components shown in FIG. 6 can be implemented in adapter 100, adapter 110, and adapter 120. For example, each adapter 100, 110, and 120 can include magnets 500 for attaching electronic device 180 (shown in FIG. 1) to camera stabilizer 190. Each adapter 100, 110, and 120 can further include coil 570 and control electronics 590 for charging electronic device 180. Each adapter 100, 110, and 120 can further include near-field communications transmitter components 560 for identification purposes. Each of these and other circuits and components shown in FIG. 6 can be included or omitted from adapters according to embodiments of the present invention, such as adapters 100, 110, and 120, and other circuits and components can be included.

These circuits and components can allow adapters 100, 110, and 120 to provide power to electronic device 180. They can also allow adapters 100, 110, and 120 to receive data from electronic device 180. They can also allow adapters 100, 110, and 120 to provide data to electronic device 180. They can also allow electronic device 180 to detect that electronic device 180 is attached to an adapter, such as adapter 100, 110, or 120. One or more of these functions can be compatible with various specifications or protocols, such as the Qi wireless charging and data protocol or an NFC standard, such as ISO/IEC 14443, or with other standards or protocols that are currently being developed.

For example, power can be received by adapter 120 (or adapters 100 or 110) via a cable attached at opening 434, for example at connector receptacle 450. This received power can be an AC voltage that is converted to a DC voltage at board 610, or it can be a DC voltage that is received by board 610. Board 610 can provide power to control electronics 590 via flexible circuit board 442 or other conduit. Control electronics can provide an alternating current to coil 570. This current can generate a time-varying magnetic flux that can induce currents in a corresponding coil in electronic device 180. These induced currents can be used to charge a battery in electronic device 180.

Data can be received by adapter 120 (or adapters 100 or 110) from electronic device 180. For example, control electronics in electronic device 180 can generate a current in the corresponding coil. This current can be modulated to convey data. The current can be modulated in amplitude, phase, or frequency. The current can induce a sympathetic current in coil 570, from which data can be read by control electronics 590. The read data can be used by the adapter, or sent to another electronic device via flexible circuit board 442 or other conduit, board 610, connector receptacle 450, and a cable.

Similarly, data can be transmitted by adapter 120 (or adapters 100 or 110) to electronic device 180. Control electronics 590 can receive data, either from adapter 120 itself, or from an external source (not shown) via the cable, connector receptacle 450, and flexible circuit board 442 or other conduit. Control electronics 590 can modulate a current provided to coil 570. This current can be modulated in amplitude, phase, or frequency. The current can induce a current in the corresponding coil in electronic device 180, from which the data can be read.

Electronic device 180 can detect that electronic device 180 is attached to an adapter, such as adapter 100, 110, or 120. A magnetometer or other sensor (not shown) in electronic device 180 can sense magnets 500 in adapter 120. In response, electronic device 180 can activate internal near-field communications components and circuitry (not shown) to generate a radio-frequency field. Near-field communications transmitter components 560 in adapter 120 can receive this radio-frequency field and use it to power a tag. The tag can then modulate this radio-frequency field. The modulated radio-frequency field can be read by the near field communications components and circuitry in electronic device 180. Electronic device 180 can then determine that it is mounted on adapter 120.

Again, as electronic device 180 determines that it is attached to adapter 120, electronic device 180 can enter a camera mode. Various applications can be turned on and off in this camera mode. An example is shown in the following figure.

Figure 7:
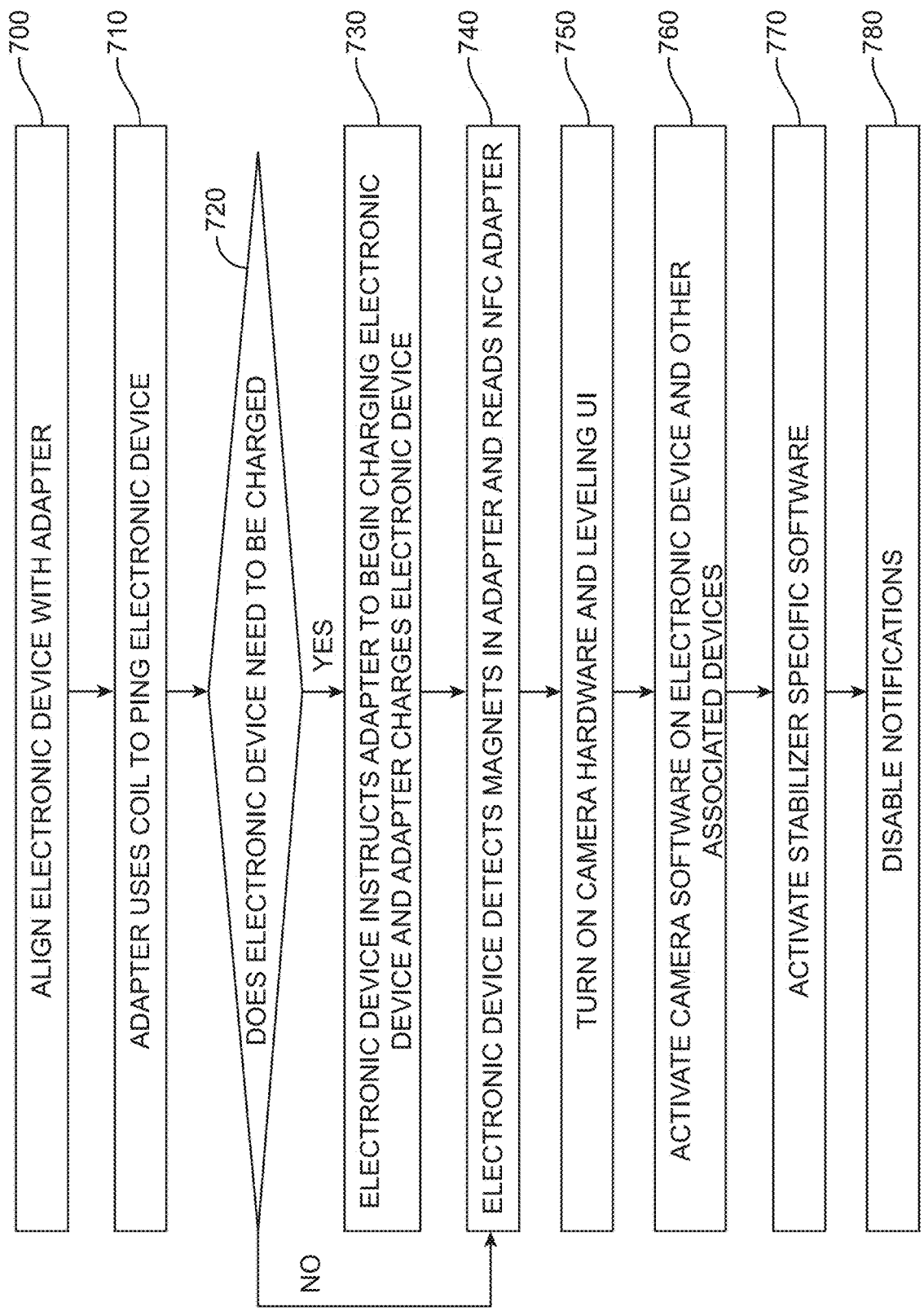
FIG. 7 illustrates an operation of an electronic device that is mated with an adapter according to an embodiment of the present invention.

FIG. 7 illustrates an operation of an electronic device that is mated with an adapter according to an embodiment of the present invention. In act 700, an electronic device, such as electronic device 180 (shown in FIG. 1) can be aligned with and attached to an adapter, such as adapter 120 in FIG. 4A. In act 710, adapter 120 (or adapter 100 or 110) can use its coil 570 to ping electronic device 180. Adapter can analyze the impedance seen by the coil in generating the ping and determine the presence of electronic device 180. If electronic device 180 is unpowered, for example a battery in electronic device 180 is fully discharged, adapter 120 can begin to provide power to charge electronic device 180. If electronic device 180 is powered, electronic device 180 can detect this ping and determine whether it needs to be charged in act 720. If electronic device 180 does need to be charged, then in act 730, electronic device 180 can instruct adapter 120 to begin charging electronic device 180, and adapter 120 in response can begin to charge electronic device 180. If electronic device 180 does not need to be charged, adapter 120 does not charge electronic device 180.

Whether or not electronic device 180 needs to be charged, electronic device 180 can detect magnets 500 in adapter 120 and in response can generate a near-field signal in act 740. Electronic device 180 can then receive data in response from near-field communications transmitter components 560, which can include a tag and capacitors, in adapter 120. Electronic device 180 can then determine that it is mounted on adapter 120.

In response to this detection, electronic device 180 can perform such activities as turning on camera hardware and starting up a leveling user interface in act 750. In act 760, camera software can be activated on the electronic device. Camera software can also be activated on other associated devices, for example a watch (not shown) that is paired with electronic device 180, external lighting (not shown), external camera triggers (not shown), a drone (not shown), or other electronic device. In act 770, camera stabilizer specific software can be activated. Other applications or software programs can be deactivated in act 780. For example, notifications and other applications that can cause distractions for a user can be disabled in act 780. The specific applications that are started and stopped in response to a determination that the electronic device 180 is mounted on adapter 120 can be programmed, controlled, or adjusted by manufacturers, users, or other third parties.

The various electronic functions performed by adapter 120 can be performed by circuits and components in either or both control electronics 590 and board 610. Typically, control electronics 590 can receive and provide currents in coil 570, while board 610 can receive power and data from an external source.

Again, magnets 500 can be fixed in place, or they can be movable between a first position and a second position. Examples of fixed magnets that can be used for magnets 500 are shown in the following figures. For example, magnets 500 can be any of the primary magnetic alignment components such as primary magnetic alignment component 816. As another example, coil 570 can be inductive coil 812 or any of the other coils shown herein. Adapter 100 and the other adapters can be implemented using the details of wireless charger device 802 and the other wireless chargers below.

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system can be said to be "attached" to each other.)

For purposes of the present description, a number of different categories of devices can be distinguished. As used herein, a "portable electronic device" refers generally to any electronic device that is portable and that consumes power and provides at least some interaction with the user. Examples of portable electronic devices include: smart phones and other mobile phones (more generally, phones); tablet computers; laptop computers; wearable devices (e.g., smart watches, headphones, earbuds); and any other electronic device that a user may carry or wear. Other portable electronic devices can include robotic devices, remote-controlled devices, personal-care appliances, and so on.

An "accessory device" (or "accessory") refers generally to an adapter, such as adapter 100 (shown in FIG. 1), adapter 110 (shown in FIG. 2), or adapter 120 (shown in FIG. 4), or other adapter consistent with an embodiment of the present invention, or other device that is useful in connection with a portable electronic device to enhance the functionality and/or esthetics of the portable electronic device. Many categories of accessories may incorporate magnetic alignment. For example, one category of accessories includes wireless charger accessories. As used herein, a "wireless charger accessory" (or "wireless charger device" or just "wireless charger") is an accessory that can provide power to a portable electronic device using wireless power transfer techniques. A "battery pack" (or "external battery") is a type of wireless charger accessory that incorporates a battery to store charge that can be transferred to the portable electronic device. In some embodiments, a battery pack may also receive power wirelessly from another wireless charger accessory. Wireless charger accessories may also be referred to as "active" accessories, in reference to their ability to provide and/or receive power. Other accessories are "passive accessories" that do not provide or receive power. For example, some passive accessories are "cases" that can cover one or more surfaces of the portable electronic device to provide protection (e.g., against damage caused by impact of the portable electronic device with other objects), esthetic enhancements (e.g., decorative colors or the like), and/or functional enhancements (e.g., cases that incorporate storage pockets, batteries, card readers, or sensors of various types). Cases can have a variety of form factors. For example, a "tray" can refer to a case that has a rear panel covering the back surface of the portable electronic device and side surfaces to secure the portable electronic device in the tray while leaving the front surface (which may include a display) exposed. A "sleeve" can refer to a case that has front and back panels with an open end (or "throat") into which a portable electronic device can be inserted so that the front and back surfaces of the device are covered; in some instances, the front panel of a sleeve can include a window through which a portion (or all) of a display of the portable electronic device is visible. A "folio" can refer to a case that has a retention portion that covers at least the back surface (and sometimes also one or more side surfaces) of the portable electronic device and a cover that can be closed to cover the display or opened to expose the display. It should be understood that not all cases are passive accessories. For example, a "battery case" can incorporate a battery pack in addition to protective and/or esthetic features; a battery case can be shaped generally as a tray, sleeve, or folio. Other examples of active cases can include cases that incorporate card readers, sensors, batteries, or other electronic components that enhance functionality of a portable electronic device.

In the present description, a distinction is sometimes made between a "charge-through accessory," which is an accessory that can be positioned between a portable electronic device and a wireless charger device without interfering with wireless power transfer between the wireless charger device and the portable electronic device, and a "terminal accessory," which is an accessory that is not a charge-through accessory. A wireless charging accessory is typically a terminal accessory, but not all terminal accessories provide wireless charging of a portable electronic device. For example some terminal accessories can be "mounting" accessories that are designed to hold the portable electronic device in a particular position. Examples of mounting include tripods, docking stations, other stands, or mounts that can hold a portable electronic device in a desired position and/or orientation (which might or might not be adjustable). Such accessories might or might not incorporate wireless charging capability.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory. (In this disclosure, adjectives such as "annular," "magnetic," "primary," "secondary" and "auxiliary" may be omitted when the context is clear.)

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. It should be understood that any device that has an annular alignment component might or might not also have a rotational alignment component, and rotational alignment components may be categorized as primary, secondary, or auxiliary depending on the type of device.

In some embodiments, a magnetic alignment system can also include a near-field communication (NFC) coil and supporting circuitry to allow devices to identify themselves to each other using an NFC protocol. An NFC coil in a particular device can be an annular coil that is disposed inboard of the annular alignment component or outboard of the annular alignment component. For example, in a device that has an annular alignment component surrounding an inductive charging coil, the NFC coil can be disposed in an annular gap between the inductive charging coil and the annular alignment component. It should be understood that an NFC component is optional in the context of providing magnetic alignment.

Figure 8:
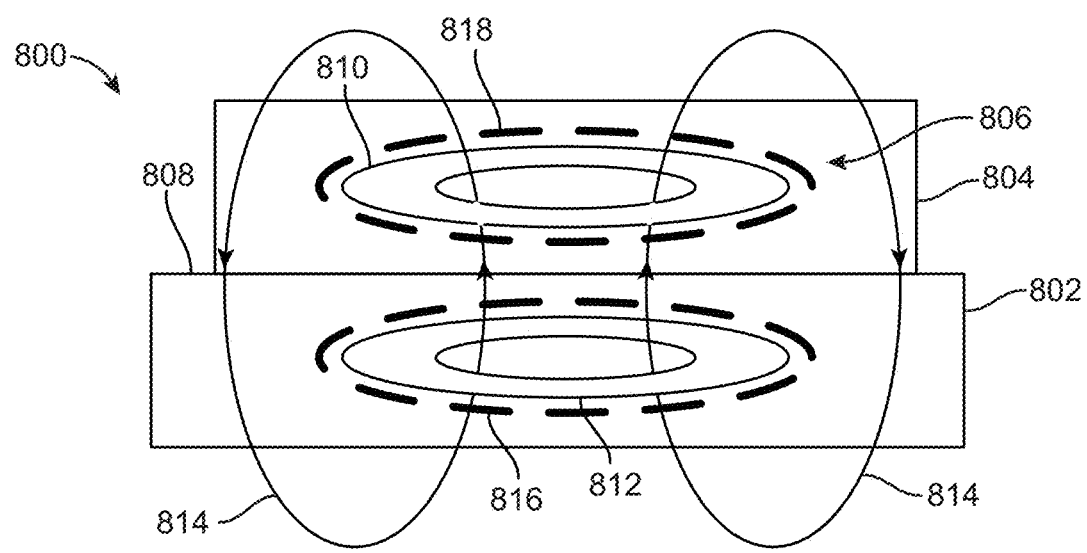
FIG. 8 shows a simplified representation of a wireless charging system incorporating a magnetic alignment system according to some embodiments.

FIG. 8 shows a simplified representation of a wireless charging system 800 incorporating a magnetic alignment system 806 according to some embodiments. A portable electronic device 804 is positioned on a charging surface 808 of a wireless charger device 802. Portable electronic device 804 can be a consumer electronic device, such as a smart phone, tablet, wearable device, or the like, or any other electronic device for which wireless charging is desired. Wireless charger device 802 can be any device that is configured to generate time-varying magnetic flux to induce a current in a suitably configured receiving device. For instance, wireless charger device 802 can be any of the adapters shown above, a wireless charging mat, puck, docking station, or the like. Wireless charger device 802 can include or have access to a power source such as battery power or standard AC power.

To enable wireless power transfer, portable electronic device 804 and wireless charger device 802 can include inductive coils 810 and 812, respectively, which can operate to transfer power between them. For example, inductive coil 812 can be a transmitter coil that generates a time-varying magnetic flux 814, and inductive coil 810 can be a receiver coil in which an electric current is induced in response to time-varying magnetic flux 814. The received electric current can be used to charge a battery of portable electronic device 804, to provide operating power to a component of portable electronic device 804, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 812 and 810. According to some embodiments, magnetic alignment system 806 can provide such alignment. In the example shown in FIG. 8, magnetic alignment system 806 includes a primary magnetic alignment component 816 disposed within or on a surface of wireless charger device 802 and a secondary magnetic alignment component 818 disposed within or on a surface of portable electronic device 804. Primary and secondary alignment components 816 and 818 are configured to magnetically attract one another into an aligned position in which inductive coils 810 and 812 are aligned with one another to provide efficient wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

Figure 9A:
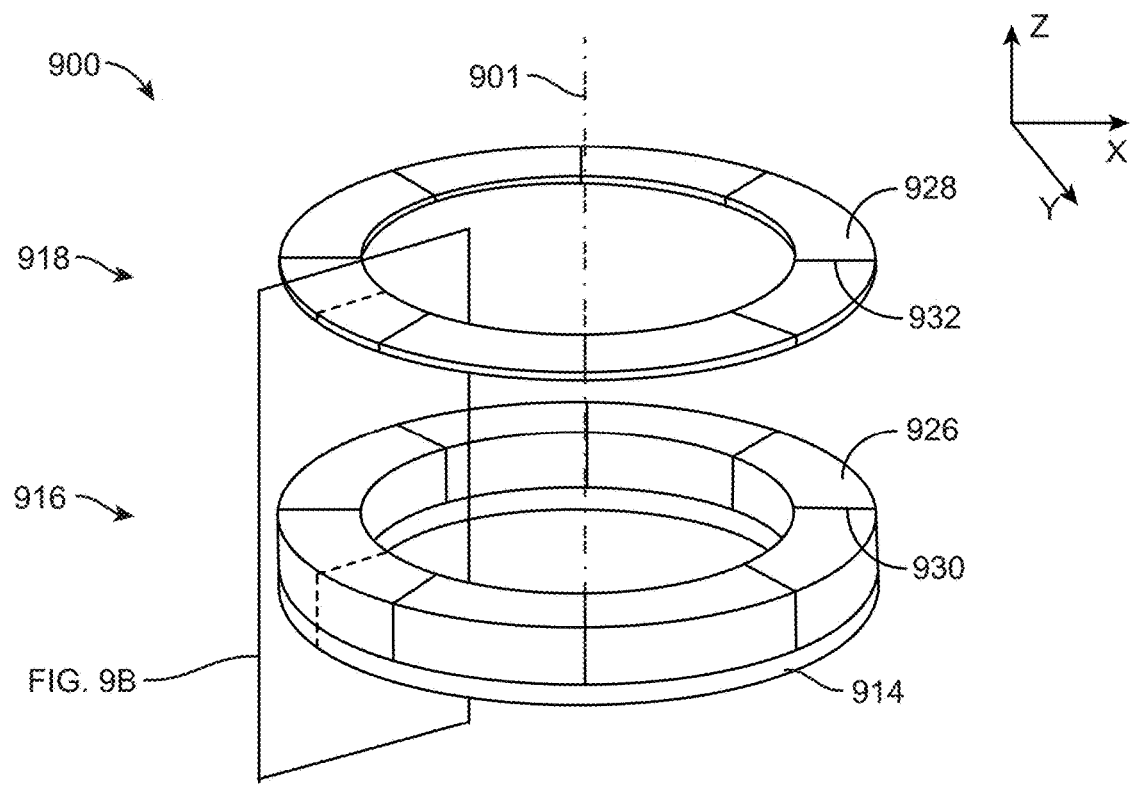
FIG. 9A shows a perspective view of a magnetic alignment system according to some embodiments.
Figure 9B:
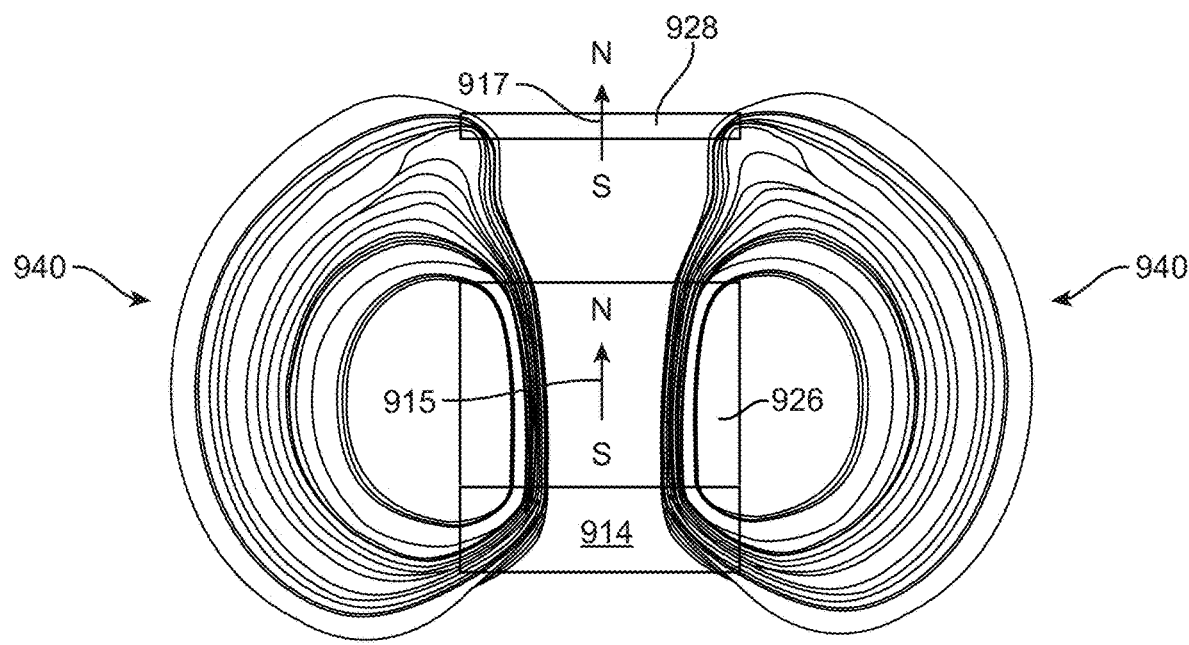
FIG. 9B shows a cross-section through the magnetic alignment system of FIG. 9A.

FIG. 9A shows a perspective view of a magnetic alignment system 900 according to some embodiments, and FIG. 9B shows a cross-section through magnetic alignment system 900 across the cut plane indicated in FIG. 9A. Magnetic alignment system 900 can be an implementation of magnetic alignment system 806 of FIG. 8. In magnetic alignment system 900, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 901 of magnetic alignment system 900, and a transverse plane (also referred to as a "lateral" or "x" or "y" direction) is defined to be normal to axis 901. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (The terms "top" and "bottom" may be used in reference to a particular view shown in a drawing but have no other significance.)

As shown in FIG. 9A, magnetic alignment system 900 can include a primary alignment component 916 (which can be an implementation of primary alignment component 816 of FIG. 8) and a secondary alignment component 918 (which can be an implementation of secondary alignment component 818 of FIG. 8). Primary alignment component 916 and secondary alignment component 918 have annular shapes and may also be referred to as "annular" alignment components. The particular dimensions can be chosen as desired. In some embodiments, primary alignment component 916 and secondary alignment component 918 can each have an outer diameter of about 124 mm and a radial width of about 13 mm. The outer diameters and radial widths of primary alignment component 916 and secondary alignment component 918 need not be exactly equal. For instance, the radial width of secondary alignment component 918 can be slightly less than the radial width of primary alignment component 916 and/or the outer diameter of secondary alignment component 918 can also be slightly less than the radial width of primary alignment component 916 so that, when in alignment, the inner and outer sides of primary alignment component 916 extend beyond the corresponding inner and outer sides of secondary alignment component 918. Thicknesses (or axial dimensions) of primary alignment component 916 and secondary alignment component 918 can also be chosen as desired. In some embodiments, primary alignment component 916 has a thickness of about 8.5 mm while secondary alignment component 918 has a thickness of about 0.37 mm.

Primary alignment component 916 can include a number of sectors, each of which can be formed of one or more primary arcuate magnets 926, and secondary alignment component 918 can include a number of sectors, each of which can be formed of one or more secondary arcuate magnets 928. In the example shown, the number of primary magnets 926 is equal to the number of secondary magnets 928, and each sector includes exactly one magnet, but this is not required. Primary magnets 926 and secondary magnets 928 can have arcuate (or curved) shapes in the transverse plane such that when primary magnets 926 (or secondary magnets 928) are positioned adjacent to one another end-to-end, primary magnets 926 (or secondary magnets 928) form an annular structure as shown. In some embodiments, primary magnets 926 can be in contact with each other at interfaces 930, and secondary magnets 928 can be in contact with each other at interfaces 932. Alternatively, small gaps or spaces may separate adjacent primary magnets 926 or secondary magnets 928, providing a greater degree of tolerance during manufacturing.

In some embodiments, primary alignment component 916 can also include an annular shield 914 (also referred to as a DC magnetic shield or DC shield) disposed on a distal surface of primary magnets 926. In some embodiments, shield 914 can be formed as a single annular piece of material and adhered to primary magnets 926 to secure primary magnets 926 into position. Shield 914 can be formed of a material that has high magnetic permeability, such as stainless steel, and can redirect magnetic fields to prevent them from propagating beyond the distal side of primary alignment component 916, thereby protecting sensitive electronic components located beyond the distal side of primary alignment component 916 from magnetic interference.

Primary magnets 926 and secondary magnets 928 (and all other magnets described herein) can be made of a magnetic material such as an NdFeB material, other rare earth magnetic materials, or other materials that can be magnetized to create a persistent magnetic field. In some embodiments, the magnets can be plated with a thin layer (e.g., 14-13 μm) of NiCuNi or similar materials. Each primary magnet 926 and each secondary magnet 928 can have a monolithic structure having a single magnetic region with a magnetic polarity aligned in the axial direction as shown by magnetic polarity indicators 915, 917 in FIG. 9B. For example, each primary magnet 926 and each secondary magnet 928 can be a bar magnet that has been ground and shaped into an arcuate structure having an axial magnetic orientation. (As will be apparent, the term "magnetic orientation" refers to the direction of orientation of the magnetic polarity of a magnet or magnetized region.) In the example shown, primary magnet 926 has its north pole oriented toward the proximal surface and south pole oriented toward the distal surface while secondary magnet 928 has its south pole oriented toward the proximal surface and north pole oriented toward the distal surface. In other embodiments, the magnetic orientations can be reversed such that primary magnet 926 has its south pole oriented toward the proximal surface and north pole oriented toward the distal surface while secondary magnet 928 has its north pole oriented toward the proximal surface and south pole oriented toward the distal surface.

As shown in FIG. 9B, the axial magnetic orientation of primary magnet 926 and secondary magnet 928 can generate magnetic fields 940 that exert an attractive force between primary magnet 926 and secondary magnet 928, thereby facilitating alignment between respective electronic devices in which primary alignment component 916 and secondary alignment component 918 are disposed (e.g., as shown in FIG. 8). While shield 914 can redirect some of magnetic fields 940 away from regions below primary magnet 926, magnetic fields 940 may still propagate to regions laterally adjacent to primary magnet 926 and secondary magnet 928. In some embodiments, the lateral propagation of magnetic fields 940 may result in magnetic field leakage to other magnetically sensitive components. For instance, if an inductive coil having a ferromagnetic shield is placed in the interior (or inboard) region of annular primary alignment component 916 (or secondary alignment component 918), leakage of magnetic fields 940 may saturate the ferrimagnetic shield, which can degrade wireless charging performance.

It will be appreciated that magnetic alignment system 900 is illustrative and that variations and modifications are possible. For instance, while primary alignment component 916 and secondary alignment component 918 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 916 and/or secondary alignment component 918 can each be formed of a single, monolithic annular magnet; however, segmenting magnetic alignment components 916 and 918 into arcuate magnets may improve manufacturing because (for some types of magnetic material) smaller arcuate segments may be less brittle than a single, monolithic annular magnet and less prone to yield loss due to physical stresses imposed on the magnetic material during manufacturing.

As noted above with reference to FIG. 9B, a magnetic alignment system with a single axial magnetic orientation may allow lateral leakage of magnetic fields, which may adversely affect performance of other components of an electronic device. Accordingly, some embodiments provide magnetic alignment systems with a "closed-loop" configuration that reduces magnetic field leakage. Examples will now be described.

Figure 10A:
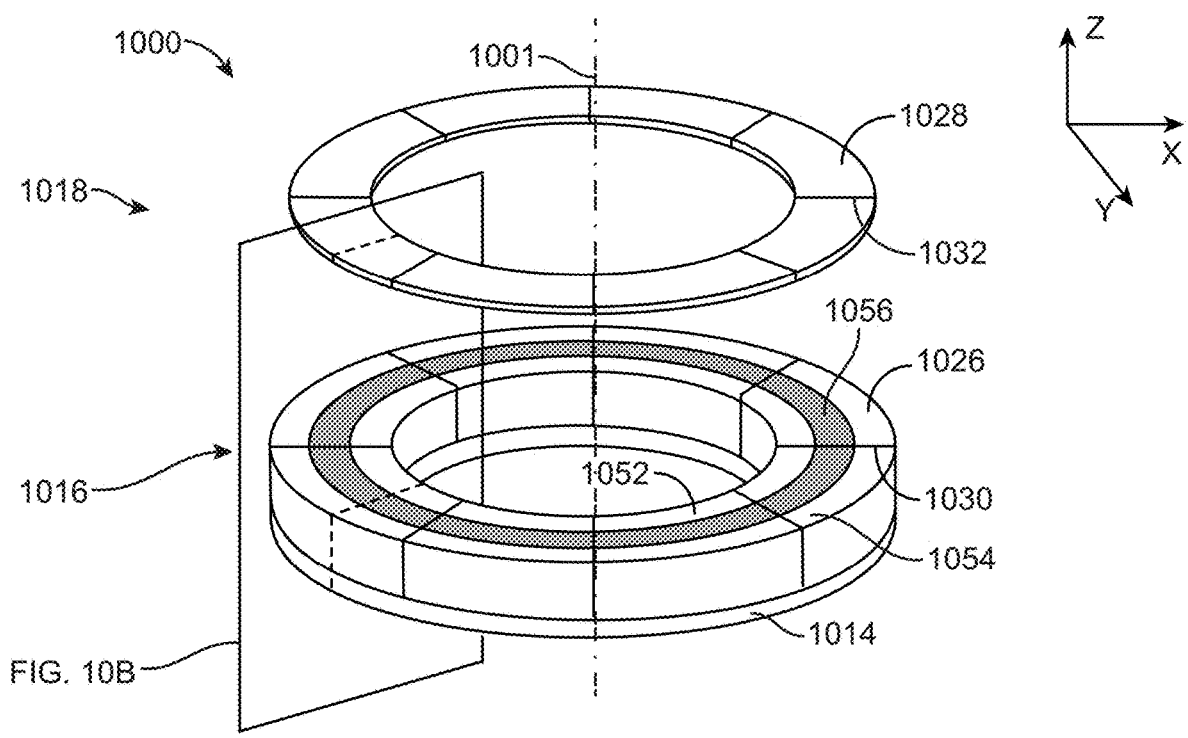
FIG. 10A shows a perspective view of a magnetic alignment system according to some embodiments.
Figure 10B:
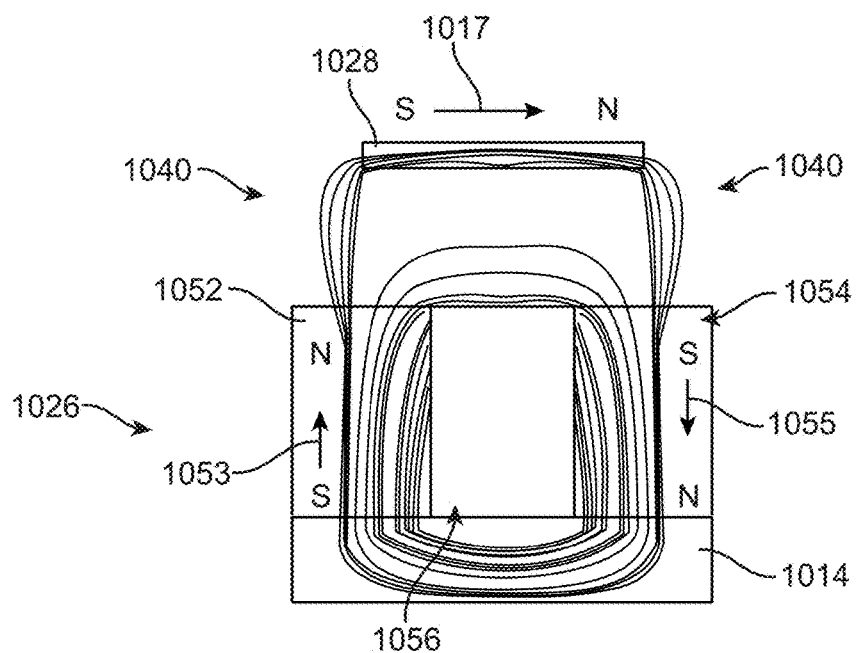
FIG. 10B shows a cross-section through the magnetic alignment system of FIG. 10A.

FIG. 10A shows a perspective view of a magnetic alignment system 1000 according to some embodiments, and FIG. 10B shows a cross-section through magnetic alignment system 1000 across the cut plane indicated in FIG. 10A. Magnetic alignment system 1000 can be an implementation of magnetic alignment system 806 of FIG. 8. In magnetic alignment system 1000, the alignment components have magnetic components configured in a "closed loop" configuration as described below.

As shown in FIG. 10A, magnetic alignment system 1000 can include a primary alignment component 1016 (which can be an implementation of primary alignment component 816 of FIG. 8) and a secondary alignment component 1018 (which can be an implementation of secondary alignment component 818 of FIG. 8). Primary alignment component 1016 and secondary alignment component 1018 have annular shapes and may also be referred to as "annular" alignment components. The particular dimensions can be chosen as desired. In some embodiments, primary alignment component 1016 and secondary alignment component 1018 can each have an outer diameter of about 124 mm and a radial width of about 13 mm. The outer diameters and radial widths of primary alignment component 1016 and secondary alignment component 1018 need not be exactly equal. For instance, the radial width of secondary alignment component 1018 can be slightly less than the radial width of primary alignment component 1016 and/or the outer diameter of secondary alignment component 1018 can also be slightly less than the radial width of primary alignment component 1016 so that, when in alignment, the inner and outer sides of primary alignment component 1016 extend beyond the corresponding inner and outer sides of secondary alignment component 1018. Thicknesses (or axial dimensions) of primary alignment component 1016 and secondary alignment component 1018 can also be chosen as desired. In some embodiments, primary alignment component 1016 has a thickness of about 8.5 mm while secondary alignment component 1018 has a thickness of about 0.37 mm.

Primary alignment component 1016 can include a number of sectors, each of which can be formed of a number of primary magnets 1026, and secondary alignment component 1018 can include a number of sectors, each of which can be formed of a number of secondary magnets 1028. In the example shown, the number of primary magnets 1026 is equal to the number of secondary magnets 1028, and each sector includes exactly one magnet, but this is not required; for example, as described below a sector may include multiple magnets. Primary magnets 1026 and secondary magnets 1028 can have arcuate (or curved) shapes in the transverse plane such that when primary magnets 1026 (or secondary magnets 1028) are positioned adjacent to one another end-to-end, primary magnets 1026 (or secondary magnets 1028) form an annular structure as shown. In some embodiments, primary magnets 1026 can be in contact with each other at interfaces 1030, and secondary magnets 1028 can be in contact with each other at interfaces 1032. Alternatively, small gaps or spaces may separate adjacent primary magnets 1026 or secondary magnets 1028, providing a greater degree of tolerance during manufacturing.

In some embodiments, primary alignment component 1016 can also include an annular shield 1014 (also referred to as a DC magnetic shield or DC shield) disposed on a distal surface of primary magnets 1026. In some embodiments, shield 1014 can be formed as a single annular piece of material and adhered to primary magnets 1026 to secure primary magnets 1026 into position. Shield 1014 can be formed of a material that has high magnetic permeability, such as stainless steel, and can redirect magnetic fields to prevent them from propagating beyond the distal side of primary alignment component 1016, thereby protecting sensitive electronic components located beyond the distal side of primary alignment component 1016 from magnetic interference.

Primary magnets 1026 and secondary magnets 1028 can be made of a magnetic material such as an NdFeB material, other rare earth magnetic materials, or other materials that can be magnetized to create a persistent magnetic field. Each secondary magnet 1028 can have a single magnetic region with a magnetic polarity having a component in the radial direction in the transverse plane (as shown by magnetic polarity indicator 1017 in FIG. 10B). As described below, the magnetic orientation can be in a radial direction with respect to axis 1001 or another direction having a radial component in the transverse plane. Each primary magnet 1026 can include two magnetic regions having opposite magnetic orientations. For example, each primary magnet 1026 can include an inner arcuate magnetic region 1052 having a magnetic orientation in a first axial direction (as shown by polarity indicator 1053 in FIG. 10B), an outer arcuate magnetic region 1054 having a magnetic orientation in a second axial direction opposite the first direction (as shown by polarity indicator 1055 in FIG. 10B), and a central non-magnetized region 1056 that does not have a magnetic orientation. Central non-magnetized region 1056 can magnetically separate inner arcuate region 1052 from outer arcuate region 1054 by inhibiting magnetic fields from directly crossing through central region 1056. Magnets having regions of opposite magnetic orientation separated by a non-magnetized region are sometimes referred to herein as having a "quad-pole" configuration.

In some embodiments, each secondary magnet 1028 can be made of a magnetic material that has been ground and shaped into an arcuate structure, and a magnetic orientation having a radial component in the transverse plane can be created, e.g., using a magnetizer. Similarly, each primary magnet 1026 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 1026 can be a compound structure with two arcuate pieces of magnetic material providing inner arcuate magnetic region 1052 and outer arcuate magnetic region 1054; in such embodiments, central non-magnetized region 1056 can be formed of an arcuate piece of nonmagnetic (or demagnetized) material or formed as an air gap defined by sidewalls of inner arcuate magnetic region 1052 and outer arcuate magnetic region 1054. DC shield 1014 can be formed of a material that has high magnetic permeability, such as stainless steel or low carbon steel, and can be plated, e.g., with 12-10 µm of matte Ni. Alternatively, DC shield 1014 can be formed of a magnetic material having a radial magnetic orientation (in the opposite direction of secondary magnets 1028). In some embodiments, DC shield 1014 can be omitted entirely.

As shown in FIG. 10B, the magnetic polarity of secondary magnet 1028 (shown by indicator 1017) can be oriented such that when primary alignment component 1016 and secondary alignment component 1018 are aligned, the south pole of secondary magnet 1028 is oriented toward the north pole of inner arcuate magnetic region 1052 (shown by indicator 1053) while the north pole of secondary magnet 1028 is oriented toward the south pole of outer arcuate magnetic region 1054 (shown by indicator 1055). Accordingly, the respective magnetic orientations of inner arcuate magnetic region 1052, secondary magnet 1028 and outer arcuate magnetic region 1056 can generate magnetic fields 1040 that exert an attractive force between primary magnet 1026 and secondary magnet 1028, thereby facilitating alignment between respective electronic devices in which primary alignment component 1016 and secondary alignment component 1018 are disposed (e.g., as shown in FIG. 8). Shield 1014 can redirect some of magnetic fields 1040 away from regions below primary magnet 1026. Further, the "closed-loop" magnetic field 1040 formed around central non-magnetized region 1056 can have tight and compact field lines that do not stray outside of primary and secondary magnets 1026 and 1028 as far as magnetic field 940 strays outside of primary and secondary magnets 926 and 928 in FIG. 9B. Thus, magnetically sensitive components can be placed relatively close to primary alignment component 1016 with reduced concern for stray magnetic fields. Accordingly, as compared to magnetic alignment system 900, magnetic alignment system 1000 can help to reduce the overall size of a device in which primary alignment component 1016 is positioned and can also help reduce noise created by magnetic field 1040 in adjacent components or devices, such as an inductive receiver coil positioned inboard of secondary alignment component 1018.

While each primary magnet 1026 includes two regions of opposite magnetic orientation, it should be understood that the two regions can but need not provide equal magnetic field strength. For example, outer arcuate magnetized region 1054 can be more strongly polarized than inner arcuate magnetized region 1052. Depending on the particular implementation of primary magnets 1026, various techniques can be used to create asymmetric polarization strength. For example, inner arcuate region 1052 and outer arcuate region 1054 can have different radial widths; increasing radial width of a magnetic region increases the field strength of that region due to increased volume of magnetic material. Where inner arcuate region 1052 and outer arcuate region 1054 are discrete magnets, magnets having different magnetic strength can be used.

In some embodiments, having an asymmetric polarization where outer arcuate region 1054 is more strongly polarized than inner arcuate region 1052 can create a flux "sinking" effect toward the outer pole. This effect can be desirable in various situations. For example, when primary magnet 1026 is disposed within a wireless charger device and the wireless charger device is used to charge a "legacy" portable electronic device that has an inductive receiver coil but does not have a secondary (or any) annular magnetic alignment component, the (DC) magnetic flux from the primary annular alignment component may enter a ferrite shield around the inductive receiver coil. The DC magnetic flux can contribute to saturating the ferrite shield and reducing charging performance. Providing a primary annular alignment component with a stronger field at the outer arcuate region than the inner arcuate region can help to draw DC magnetic flux away from the ferrite shield, which can improve charging performance when a wireless charger device having an annular magnetic alignment component is used to charge a portable electronic device that lacks an annular magnetic alignment component.

It will be appreciated that magnetic alignment system 1000 is illustrative and that variations and modifications are possible. For instance, while primary alignment component 1016 and secondary alignment component 1018 are each shown as being constructed of eight arcuate magnets, other embodiments may use a different number of magnets, such as 86 magnets, 88 magnets, 102 magnets, 106 magnets, or any other number of magnets, and the number of primary magnets need not be equal to the number of secondary magnets. In other embodiments, secondary alignment component 1018 can be formed of a single, monolithic annular magnet. Similarly, primary alignment component 1016 can be formed of a single, monolithic annular piece of magnetic material with an appropriate magnetization pattern as described above, or primary alignment component 1016 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 11:
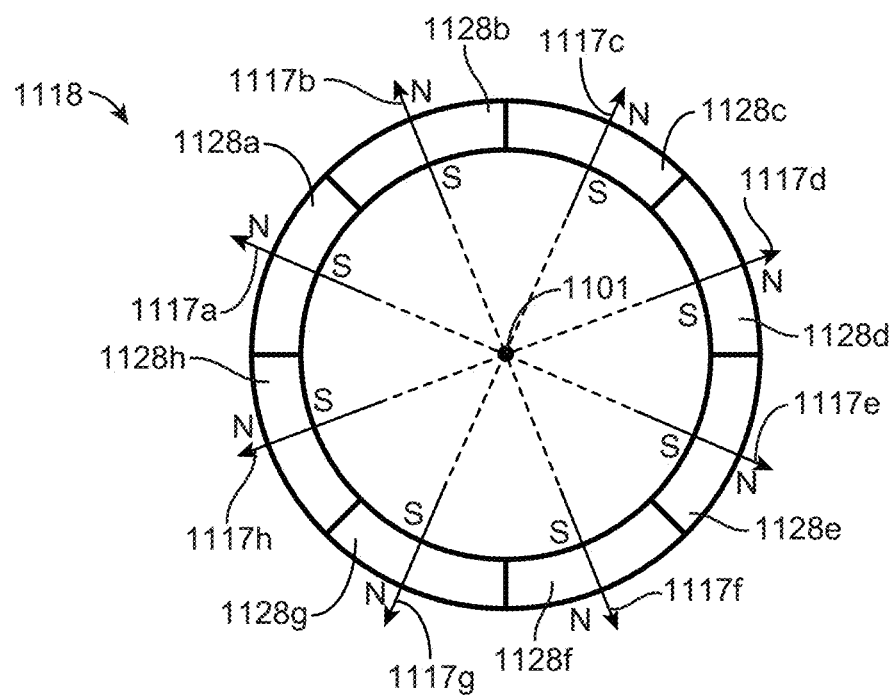
FIG. 11 shows a simplified top-down view of a secondary alignment component according to some embodiments.

As noted above, in embodiments of magnetic alignment systems having closed-loop magnetic orientations, such as magnetic alignment system 1000, secondary alignment component 1018 can have a magnetic orientation with a radial component. For example, in some embodiments, secondary alignment component 1018 can have a magnetic polarity in a radial orientation. FIG. 11 shows a simplified top-down view of a secondary alignment component 1118 according to some embodiments. Secondary alignment component 1118, like secondary alignment component 1018, can be formed of arcuate magnets 1128*a-h* having radial magnetic orientations as shown by magnetic polarity indicators 1117*a-h*. In this example, each arcuate magnet 1128*a-h* has a north magnetic pole oriented toward the radially outward side and a south magnetic pole toward the radially inward side; however, this orientation can be reversed, and the north magnetic pole of each arcuate magnet 1128*a-h* can be oriented toward the radially inward side while the south magnetic pole is oriented toward the radially outward side.

Figure 12A:
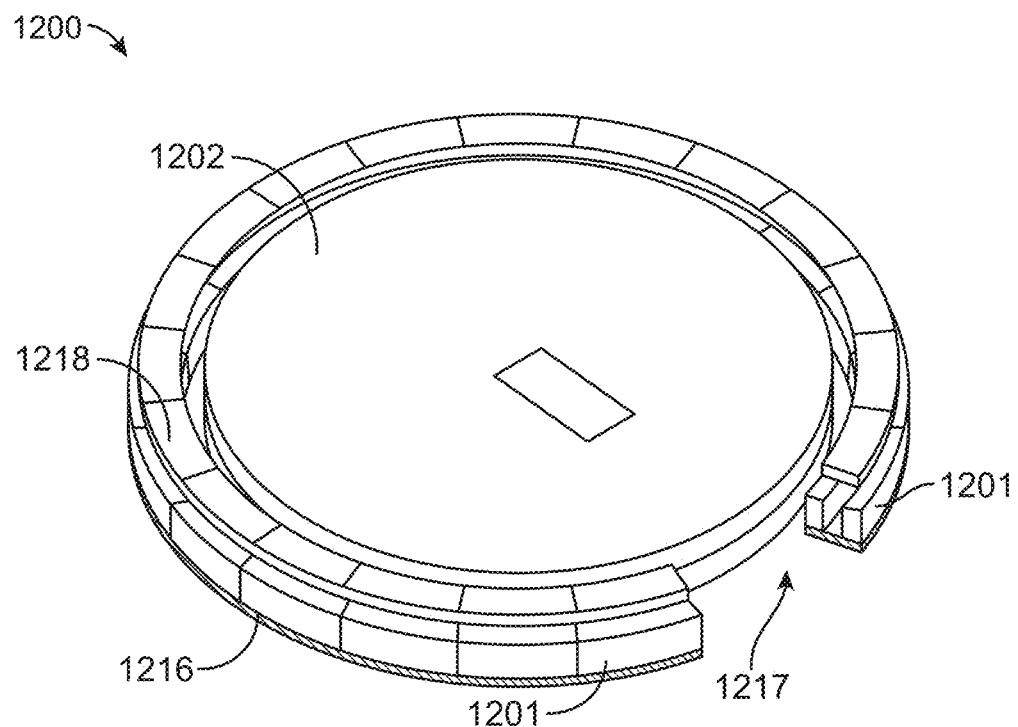
FIG. 12A shows a perspective view of a magnetic alignment system according to some embodiments.

FIG. 12A shows a perspective view of a magnetic alignment system 1200 according to some embodiments. Magnetic alignment system 1200, which can be an implementation of magnetic alignment system 1000, includes a secondary alignment component 1218 having a radially outward magnetic orientation (e.g., as shown in FIG. 11) and a complementary primary alignment component 1216. In this example, magnetic alignment system 1200 includes a gap 1217 between two of the sectors; however, gap 1217 is optional and magnetic alignment system 1200 can be a complete annular structure. Also shown are components 1202, which can include, for example an inductive coil assembly or other components located within the central region of primary magnetic alignment component 1216 or secondary magnetic alignment component 1218. Magnetic alignment system 1200 can have a closed-loop configuration similar to magnetic alignment system 1000 (as shown in FIG. 10B) and can include arcuate sectors 1201, each of which can be made of one or more arcuate magnets. In some embodiments, the closed-loop configuration of magnetic alignment system 1200 can reduce or prevent magnetic field leakage that may affect components 1202.

Figure 12B:
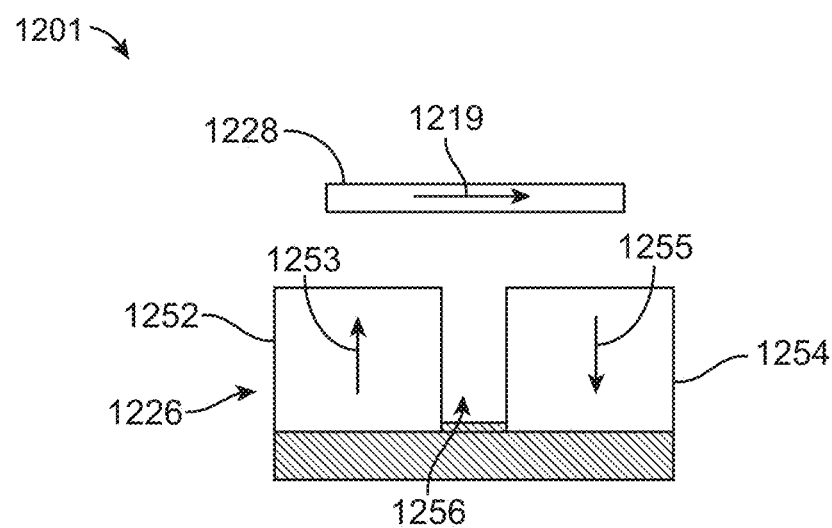

FIG. 12B shows an axial cross-section view through one of arcuate sectors 1201. Arcuate sector 1201 includes a primary magnet 1226 and a secondary magnet 1228. As shown by orientation indicator 1219, secondary magnet 1228 has a magnetic polarity oriented in a radially outward direction, i.e., the north magnetic pole is toward the radially outward side of magnetic alignment system 1200. Like primary magnets 1026 described above, primary magnet 1226 includes an inner arcuate magnetic region 1252, an outer arcuate magnetic region 1254, and a central nonmagnetized region 1256 (which can include, e.g., an air gap or a region of nonmagnetic or non-magnetized material). Inner arcuate magnetic region 1252 has a magnetic polarity oriented axially such that the north magnetic pole is toward secondary magnet 1228, as shown by indicator 1253, while outer arcuate magnetic region 1254 has an opposite magnetic orientation, with the south magnetic pole oriented toward secondary magnet 1228, as shown by indicator 1255. As described above with reference to FIG. 10B, the arrangement of magnetic orientations shown in FIG. 12B results in magnetic attraction between primary magnet 1226 and secondary magnet 1228. In some embodiments, the magnetic polarities can be reversed such that the north magnetic pole of secondary magnet 1228 is oriented toward the radially inward side of magnetic alignment system 1200, the north magnetic pole of outer arcuate region 1254 of primary magnet 1226 is oriented toward secondary magnet 1228, and the north magnetic pole of inner arcuate region 1252 is oriented away from secondary magnet 1228.

When primary alignment component 1216 and secondary alignment component 1218 are aligned, the radially symmetrical arrangement and directional equivalence of magnetic polarities of primary alignment component 1216 and secondary alignment component 1218 allow secondary alignment component 1218 to rotate freely (relative to primary alignment component 1216) in the clockwise or counterclockwise direction in the lateral plane while maintaining alignment along the axis.

Figure 12C:
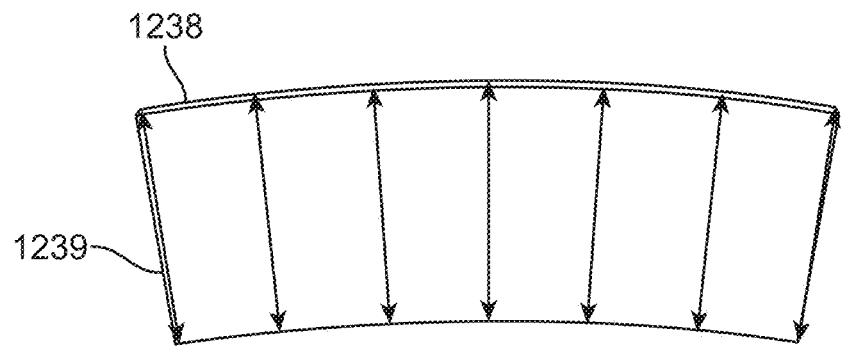
FIGS. 12C through 12E show examples of arcuate magnets with radial magnetic orientation according to some embodiments.
Figure 12D:
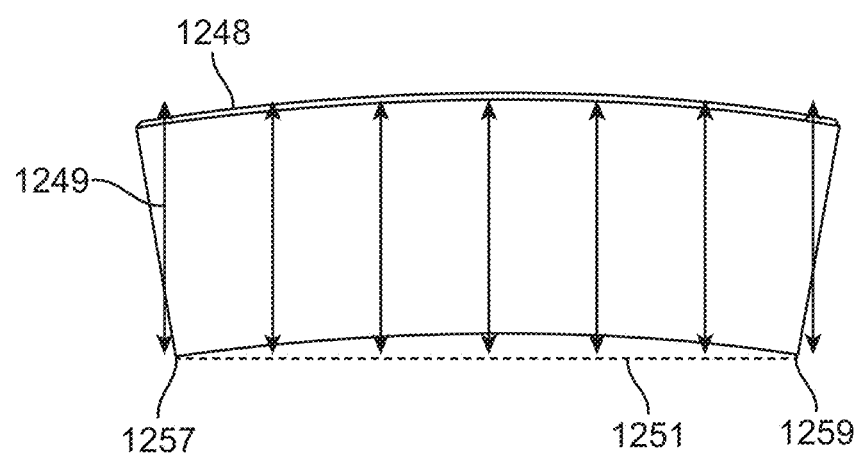
Figure 12E:
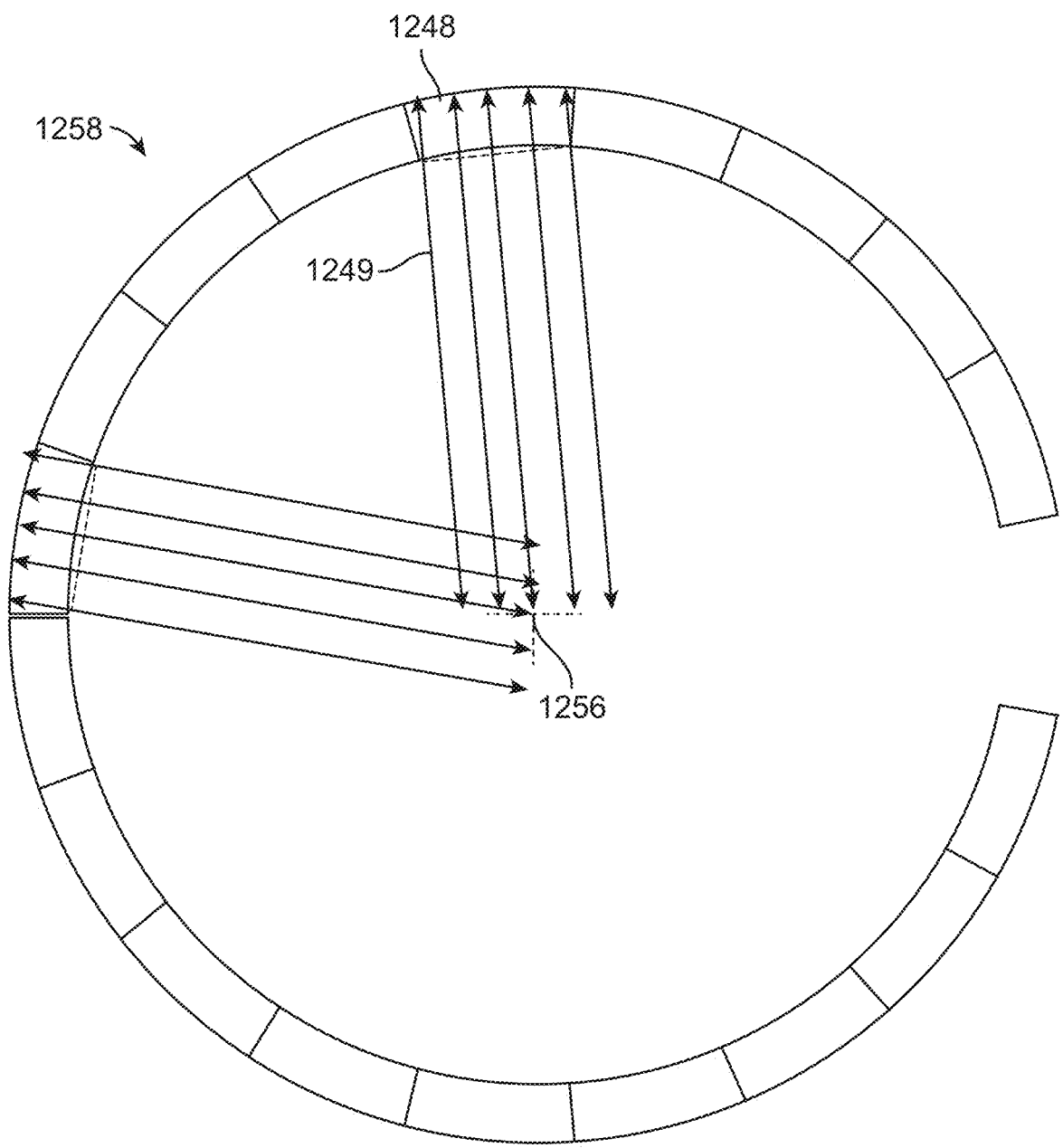

As used herein, a "radial" orientation need not be exactly or purely radial. For example, FIG. 12C shows a secondary arcuate magnet 1238 according to some embodiments. Secondary arcuate magnet 1238 has a purely radial magnetic orientation, as indicated by arrows 1239. Each arrow 1239 is directed at the center of curvature of magnet 1238; if extended inward, arrows 1239 would converge at the center of curvature. However, achieving this purely radial magnetization requires that magnetic domains within magnet 1238 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 12C. FIG. 12D shows a secondary arcuate magnet 1248 with pseudoradial magnetic orientation according to some embodiments. Magnet 1248 has a magnetic orientation, shown by arrows 1249, that is perpendicular to a baseline 1251 connecting the inner corners 1257, 1259 of arcuate magnet 1248. If extended inward, arrows 1249 would not converge. Thus, neighboring magnetic domains in magnet 1248 are parallel to each other, which is readily achievable in magnetic materials such as NdFeB. The overall effect in a magnetic alignment system, however, can be similar to the purely radial magnetic orientation shown FIG. 12C. FIG. 12E shows a secondary annular alignment component 1258 made up of magnets 1248 according to some embodiments. Magnetic orientation arrows 1249 have been extended to the center point 1261 of annular alignment component 1258. As shown the magnetic field direction can be approximately radial, with the closeness of the approximation depending on the number of magnets 1248 and the inner radius of annular alignment component 1258. In some embodiments, 18 magnets 1248 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 1218 (e.g., as shown in FIG. 12B) provides a magnetic force profile between secondary alignment component 1218 and primary alignment component 1216 that is the same around the entire circumference of the magnetic alignment system. The radial magnetic orientation can also result in greater magnetic permeance, which allows secondary alignment component 1218 to resist demagnetization as well as enhancing the attractive force in the axial direction and improving shear force in the lateral directions when the two components are aligned.

Figure 13A:
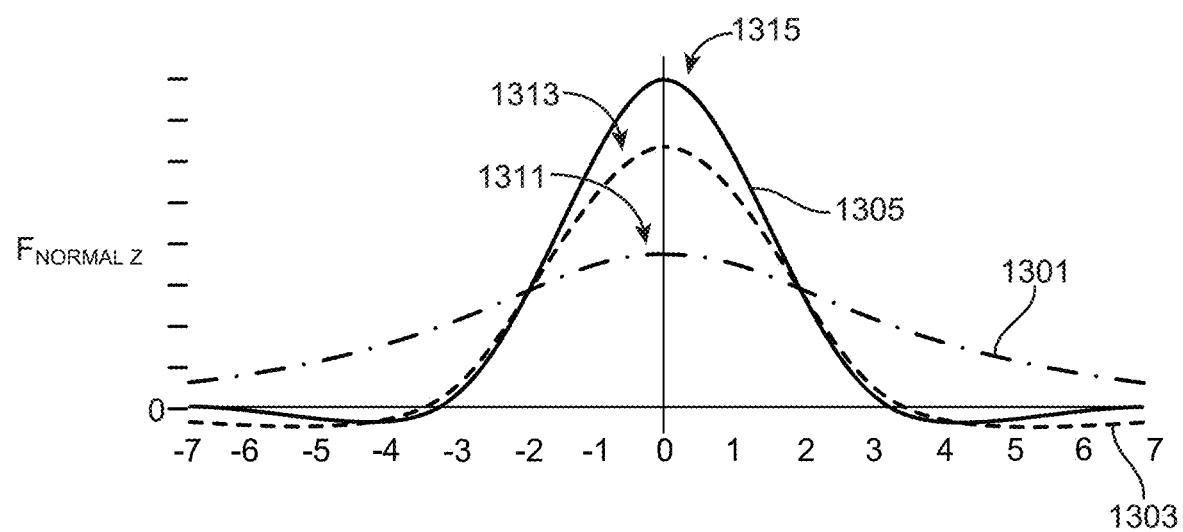
FIGS. 13A and 13B show graphs of force profiles for different magnetic alignment systems, according to some embodiments.
Figure 13B:
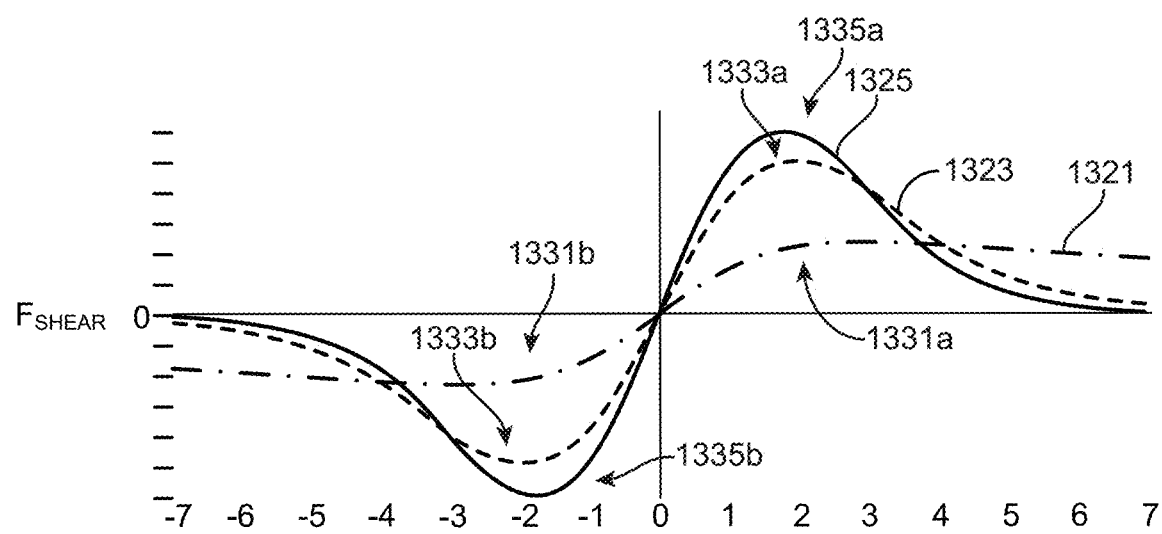

FIGS. 13A and 13B show graphs of force profiles for different magnetic alignment systems, according to some embodiments. Specifically, FIG. 13A shows a graph 1300 of vertical attractive (normal) force in the axial (z) direction for different magnetic alignment systems of comparable size and using similar types of magnets. Graph 1300 has a horizontal axis representing displacement from a center of alignment, where 0 represents the aligned position and negative and positive values represent displacements from the aligned position in opposite directions (in arbitrary units), and a vertical axis showing the normal force ($F_{NORMAL}$) as a function of displacement in the lateral plane (also in arbitrary units). For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 1300 shows normal force profiles for three different types of magnetic alignment systems. A first type of magnetic alignment system uses "central" alignment components, such as a pair of complementary disc-shaped magnets placed along an axis; a representative normal force profile for a central magnetic alignment system is shown as line 1301 (dot-dash line). A second type of magnetic alignment system uses annular alignment components with axial magnetic orientations, e.g., magnetic alignment system 900 of FIGS. 9A and 9B; a representative normal force profile for such an annular-axial magnetic alignment system is shown as line 1303 (dashed line). A third type of magnetic alignment system uses annular alignment components with closed-loop magnetic orientations and radial symmetry (e.g., magnetic alignment system 1200 of FIGS. 12A and 12B); a representative normal force profile for a radially symmetric closed-loop magnetic alignment system is shown as line 1305 (solid line).

Similarly, FIG. 13B shows a graph 1320 of lateral (shear) force in a transverse direction for different magnetic alignment systems. Graph 1320 has a horizontal axis representing lateral displacement in opposing directions from a center of alignment, using the same convention as graph 1300, and a vertical axis showing the shear force ($F_{SHEAR}$) as a function of direction (in arbitrary units). For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 1320 shows shear force profiles for the same three types of magnetic alignment systems as graph 1300: a representative shear force profile for a central magnetic alignment system is shown as line 1321 (dot-dash line); a representative shear force profile for an annular-axial magnetic alignment system is shown as line 1323 (dashed line); and a representative normal force profile for a radially symmetric closed-loop magnetic alignment system is shown as line 1325 (solid line).

As shown in FIG. 13A, each type of magnetic alignment system achieves the strongest magnetic attraction in the axial direction (i.e., normal force) when the primary and secondary alignment components are in the aligned position (0 on the horizontal axis), as shown by respective peaks 1311, 1313, and 1315. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 1200 of FIG. 12) provides stronger magnetic attraction when in the aligned position than the other types of magnetic alignment systems. This strong attractive normal force can overcome small misalignments and can help to hold devices in the aligned position, thereby can achieving a more accurate and robust alignment between the primary and secondary alignment components, which in turn can provide a more accurate and robust alignment between a portable electronic device and a wireless charger device within which the magnetic alignment system is implemented.

As shown in FIG. 13B, the strongest shear forces are obtained when the primary and secondary alignment components are laterally just outside of the aligned position, e.g., at −2 and +2 units of separation from the aligned position, as shown by respective peaks 1331*a-b*, 1333*a-b*, and 1335*a-b*. These shear forces act to urge the alignment components toward the aligned position. Similarly to the normal force, the peak strength of shear force depends on the type of magnetic alignment system. In particular, a radially-symmetric closed-loop magnetic alignment system (e.g., magnetic alignment system 1200 of FIG. 12) provides higher magnitude of shear force when just outside of the aligned position than the other types of magnetic alignment systems. This strong shear force can provide tactile feedback (sometimes described as a sensation of "snappiness") to help the user identify when the two components are aligned. In addition, like the normal force, the shear force can overcome small misalignments due to frictional force and can achieve a more accurate and robust alignment between the primary and secondary alignment components, which in turn can provide a more accurate and robust alignment between a portable electronic device and a wireless charger device within which the magnetic alignment system is implemented.

Depending on the particular configuration of magnets, various design choices can be used to increase the sensation of snappiness for a closed-loop magnetic alignment system. For example, reducing the amount of magnetic material in the devices in areas near the magnetic alignment components—e.g., by using less material or by increasing the distance between the magnetic alignment component and the other magnetic material—can reduce stray fields and increase the perceived "snapping" effect of the magnetic alignment components. As another example, increasing the magnetic-field strength of the alignment magnets (e.g., by increasing the amount of material) can increase both shear and normal forces. As yet another example, the widths of the magnetized regions in the primary annular alignment component (and/or the relative strength of the magnetic field in each region) can be optimized based on the particular magnetic orientation pattern for the secondary annular alignment component (e.g., whether the secondary annular alignment components have the purely radial magnetic orientation of FIG. 12C or the pseudo-radial magnetic orientation of FIG. 12D). Another consideration can be the coefficient of friction between the surfaces of the devices containing primary and secondary alignment components; lower friction decreases resistance to the shear force exerted by the annular magnetic alignment components.

A radially-symmetric closed-loop magnetic alignment system (e.g., magnetic alignment system 1200 of FIGS. 12A and 12B) can provide accurate and robust alignment in the axial and lateral directions. Further, because of the radial symmetry, the alignment system does not have a preferred rotational orientation in the lateral plane about the axis; the shear force profile can be the same regardless of relative rotational orientation of the electronic devices being aligned.

Figure 14:
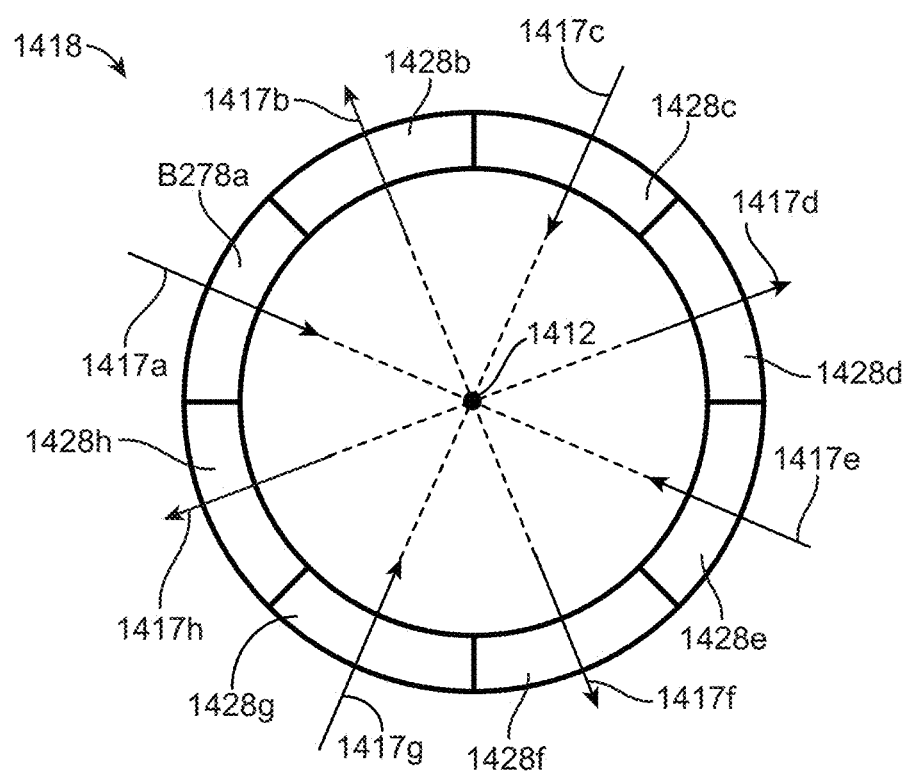
FIG. 14 shows a simplified top-down view of a secondary alignment component according to some embodiments.

In some embodiments, a closed-loop magnetic alignment system can be designed to provide one or more preferred rotational orientations. FIG. 14 shows a simplified top-down view of a secondary alignment component 1418 according to some embodiments. Secondary alignment component 1418 includes sectors 1428*a-h* having radial magnetic orientations as shown by magnetic polarity indicators 1417*a-h*. Each of sectors 1428*a-h* can include one or more secondary arcuate magnets. In this example, secondary magnets in sectors 1428*b*, 1428*d*, 1428*f*, and 1428*h* each have a north magnetic pole oriented toward the radially outward side and a south magnetic pole toward the radially inward side, while secondary magnets in sectors 1428*a*, 1428*c*, 1428*e*, and 1428*g* each have a north magnetic pole oriented toward the radially inward side and a south magnetic pole toward the radially outward side. In other words, magnets in adjacent sectors 1428*a-h* of secondary alignment component 1418 have alternating magnetic orientations.

Figure 15A:
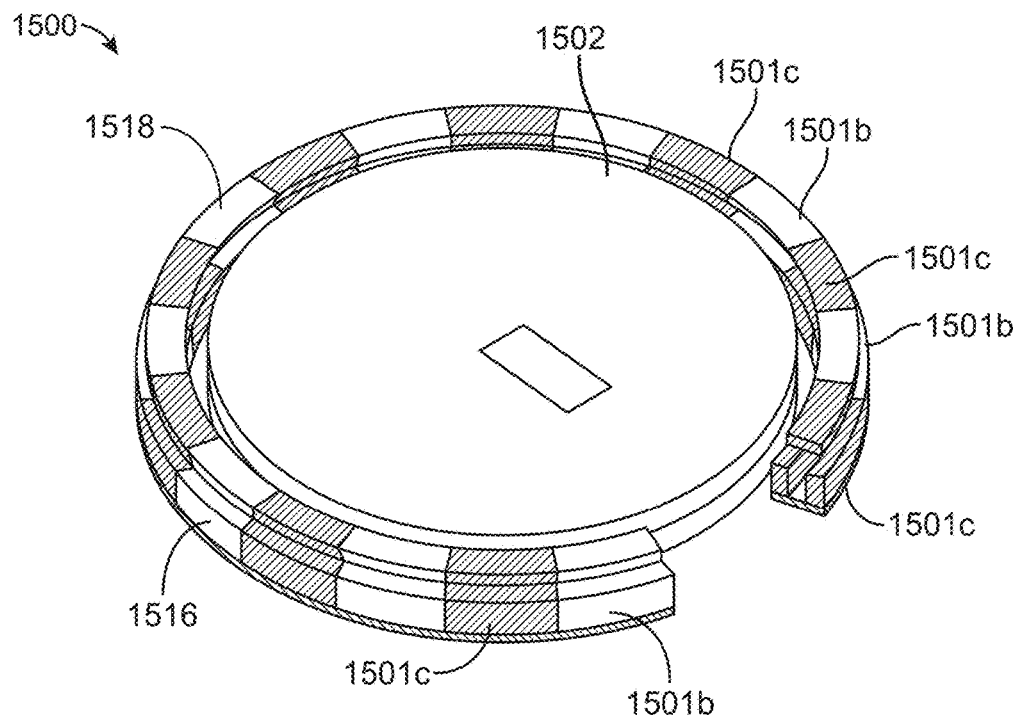
FIG. 15A shows a perspective view of a magnetic alignment system according to some embodiments.

A complementary primary alignment component can have sectors with correspondingly alternating magnetic orientations. For example, FIG. 15A shows a perspective view of a magnetic alignment system 1500 according to some embodiments. Magnetic alignment system 1500 includes a secondary alignment component 1518 having alternating radial magnetic orientations (e.g., as shown in FIG. 14) and a complementary primary alignment component 1516. Some of the arcuate sections of magnetic alignment system 1500 are not shown in order to reveal internal structure; however, it should be understood that magnetic alignment system 1500 can be a complete annular structure. Also shown are components 1502, which can include, for example, inductive coil assemblies or other components located within the central region of primary annular alignment component 1516 and/or secondary annular alignment component 1518.

Magnetic alignment system 1500 can be a closed-loop magnetic alignment system similar to magnetic alignment system 1000 described above and can include arcuate sectors 1501*b*, 1501*c* of alternating magnetic orientations, with each arcuate sector 1501*b*, 1501*c* including one or more arcuate magnets in each of primary annular alignment component 1516 and secondary annular alignment component 1518. In some embodiments, the closed-loop configuration of magnetic alignment system 1500 can reduce or prevent magnetic field leakage that may affect component 1502. Like magnetic alignment system 1200, magnetic alignment system 1500 can include a gap 1503 between two sectors.

Figures 15B, 15C:
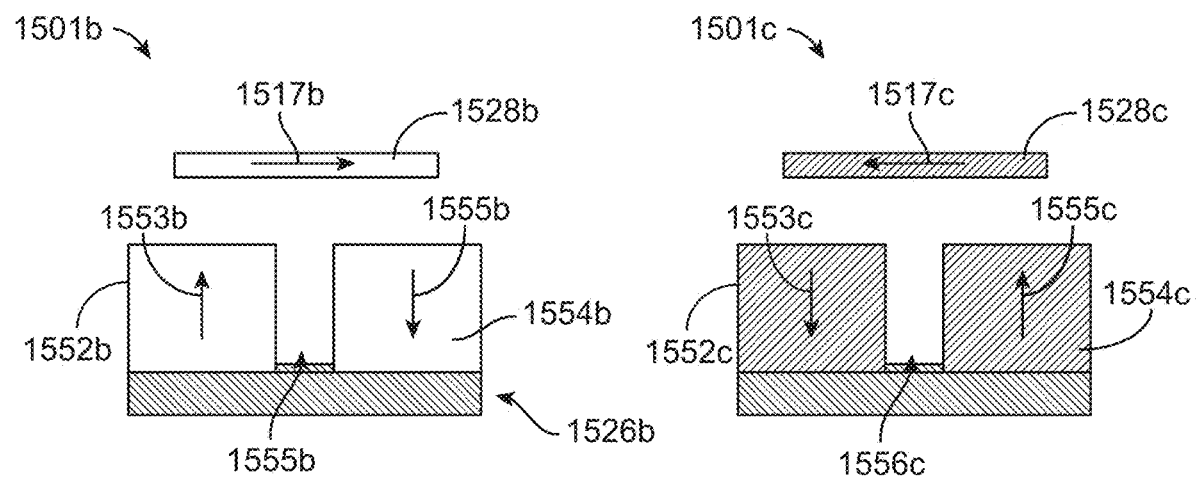
FIGS. 15B and 15C show axial cross-section views through different portions of the system of FIG. 15A.

FIG. 15B shows an axial cross-section view through one of arcuate sectors 1501*b*, and FIG. 15C shows an axial cross-section view through one of arcuate sectors 1501*c*. Arcuate sector 1501*b* includes a primary magnet 1526*b* and a secondary magnet 1528*b*. As shown by orientation indicator 1517*b*, secondary magnet 1528*b* has a magnetic polarity oriented in a radially outward direction, i.e., the north magnetic pole is toward the radially outward side of magnetic alignment system 1500. Like primary magnets 1026 described above, primary magnet 1526*b* includes an inner arcuate magnetic region 1552*b*, an outer arcuate magnetic region 1554*b*, and a central non-magnetized region 1556*b* (which can include, e.g., an air gap or a region of nonmagnetic or non-magnetized material). Inner arcuate magnetic region 1552*b* has a magnetic polarity oriented axially such that the north magnetic pole is toward secondary magnet 1528*b*, as shown by indicator 1553*b*, while outer arcuate magnetic region 1554*b* has an opposite magnetic orientation, with the south magnetic pole oriented toward secondary magnet 1528*b*, as shown by indicator 1555*b*. As described above with reference to FIG. 10B, the arrangement of magnetic orientations shown in FIG. 15B results in magnetic attraction between primary magnet 1526*b* and secondary magnet 1528*b*.

As shown in FIG. 15C, arcuate sector 1501*c* has a "reversed" magnetic orientation relative to arcuate sector 1501*b*. Arcuate sector 1501*c* includes a primary magnet 1526*c* and a secondary magnet 1528*c*. As shown by orientation indicator 1517*c*, secondary magnet 1528*c* has a magnetic polarity oriented in a radially inward direction, i.e., the north magnetic pole is toward the radially inward side of magnetic alignment system 1500. Like primary magnets 1026 described above, primary magnet 1526*c* includes an inner arcuate magnetic region 1552*c*, an outer arcuate magnetic region 1554*c*, and a central non-magnetized region 1556*c* (which can include, e.g., an air gap or a region of nonmagnetic or non-magnetized material). Inner arcuate magnetic region 1552*c* has a magnetic polarity oriented axially such that the south magnetic pole is toward secondary magnet 1528*c*, as shown by indicator 1553*c*, while outer arcuate magnetic region 1554*c* has an opposite magnetic orientation, with the north magnetic pole oriented toward secondary magnet 1528*c*, as shown by indicator 1555*c*. As described above with reference to FIG. 10B, the arrangement of magnetic orientations shown in FIG. 15C results in magnetic attraction between primary magnet 1526*c* and secondary magnet 1528*c*.

An alternating arrangement of magnetic polarities as shown in FIGS. 14 and 15A-8C can create a "ratcheting" feel when secondary alignment component 1518 is aligned with primary alignment component 1516 and one of alignment components 1516, 1518 is rotated relative to the other about the common axis. For instance, as secondary alignment component 1516 is rotated relative to primary alignment component 1516, each radially-outward magnet 1528*b* alternately comes into proximity with a complementary magnet 1526*b* of primary alignment component 1516, resulting in an attractive magnetic force, or with an anti-complementary magnet 1526*c* of primary alignment component 1516, resulting in a repulsive magnetic force. If primary magnets 1526*b*, 1526*c* and secondary magnets 1528*b*, 1528*c* have the same angular size and spacing, in any given orientation, each pair of magnets will experience similar net (attractive or repulsive) magnetic forces such that alignment is stable and robust in rotational orientations in which complementary magnet pairs 1526*b*, 1528*b* and 1526*c*, 1528*c* are in proximity. In other rotational orientations, a torque toward a stable rotational orientation can be experienced.

Figure 16A:
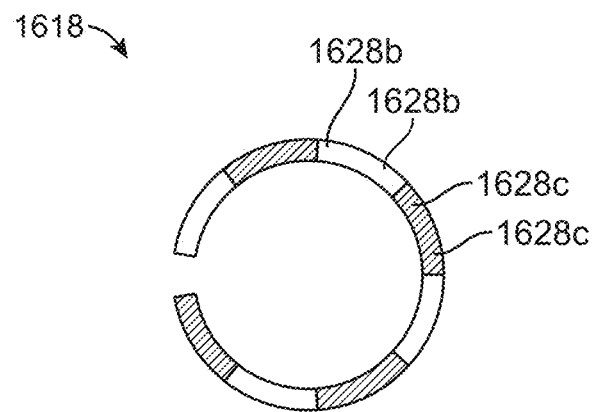
FIGS. 16A and 16B show simplified top-down views of secondary alignment components according to various embodiments.
Figure 16B:
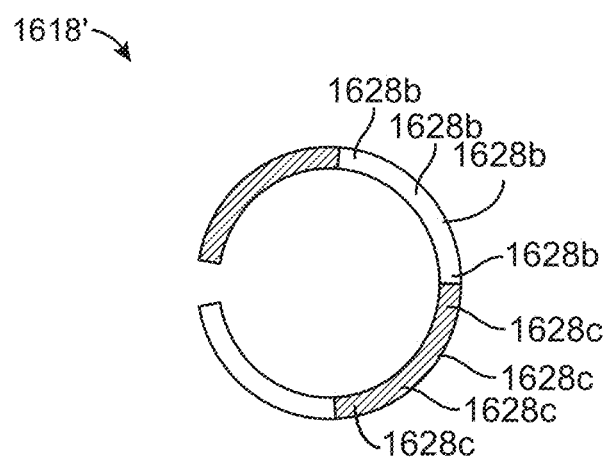

In the examples shown in FIGS. 14 and 15A-8C, each sector includes one magnet, and the direction of magnetic orientation alternates with each magnet. In some embodiments, a sector can include two or more magnets having the same direction of magnetic orientation. For example, FIG. 16A shows a simplified top-down view of a secondary alignment component 1618 according to some embodiments. Secondary alignment component 1618 includes secondary magnets 1628*b* with radially outward magnetic orientations and secondary magnets 1628*c* with radially inward orientations, similarly to secondary alignment component 1518 described above. In this example, the magnets are arranged such that a pair of outwardly-oriented magnets 1628*b* (forming a first sector 1601) are adjacent to a pair of inwardly-oriented magnets 1628*c* (forming a second sector 1603 adjacent to first sector 1601). The pattern of alternating sectors (with two magnets per sector) repeats around the circumference of secondary alignment component 1618. Similarly, FIG. 16B shows a simplified top-down view of another secondary alignment component 1618' according to some embodiments. Secondary alignment component 1618' includes secondary magnets 1628*b* with radially outward magnetic orientations and secondary magnets 1628*c* with radially inward orientations. In this example, the magnets are arranged such that a group of four radially-outward magnets 1628*b* (forming a first sector 1611) is adjacent to a group of four radially-inward magnets 1628*c* (forming a second sector 1613 adjacent to first sector 1611). The pattern of alternating sectors (with four magnets per sector) repeats around the circumference of secondary alignment component 1618'. Although not shown in FIGS. 16A and 16B, the structure of a complementary primary alignment component for secondary alignment component 1618 or 1618' should be apparent in view of FIGS. 15A-8C. A shear force profile for the alignment components of FIGS. 16A and 16B can be similar to the ratcheting profile described above, although the number of rotational orientations that provide stable alignment will be different.

Figure 17:
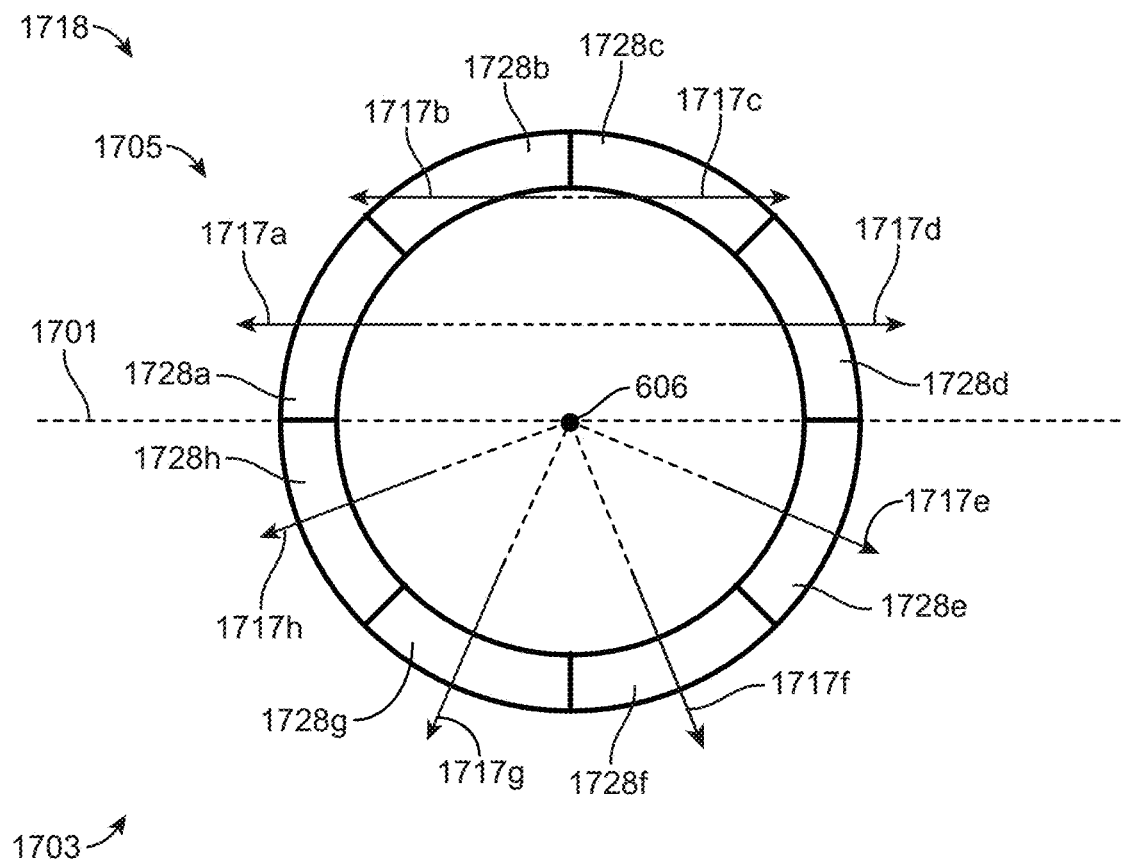
FIG. 17 shows a simplified top-down view of a secondary alignment component according to some embodiments.

In other embodiments, a variety of force profiles can be created by changing the magnetic orientations of different sectors within the primary and/or secondary alignment components. As just one example, FIG. 17 shows a simplified top-down view of a secondary alignment component 1718 according to some embodiments. Secondary alignment component has sectors 1728*a-h* with sector-dependent magnetic orientations as shown by magnetic polarity indicators 1717*a-h*. In this example, secondary alignment component 1718 can be regarded as bisected by bisector line 1701, which defines two halves of secondary alignment component 1718. In a first half 1703, sectors 1728*e-h* have magnetic polarities oriented radially outward, similarly to examples described above.

In the second half 1705, sectors 1728*a-d* have magnetic polarities oriented substantially parallel to bisector line 1701 rather than radially. In particular, sectors 1728*a* and 1728*b* have magnetic polarities oriented in a first direction parallel to bisector line 1701, while sectors 1728*c* and 1728*d* have magnetic polarities oriented in the direction opposite to the direction of the magnetic polarities of sectors 1728*a* and 1728*b*. A complementary primary alignment component can have an inner annular region with magnetic north pole oriented toward secondary alignment component 1718, an outer annular region with magnetic north pole oriented away from secondary alignment component 1718, and a central non-magnetized region, providing a closed-loop magnetic orientation as described above. The asymmetric arrangement of magnetic orientations in secondary alignment component 1718 can modify the shear force profile such that secondary alignment component 1718 generates less shear force resisting motion in the direction toward second half 1705 (upward in the drawing) than in the direction toward first half 1703 (downward in the drawing). In some embodiments, an asymmetrical arrangement of this kind can be used where the primary alignment component is mounted in a docking station and the secondary alignment component is mounted in a portable electronic device that docks with the docking station. Assuming secondary annular alignment component 1718 is oriented in the portable electronic device such that half-annulus 1705 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

In the embodiments described above, the secondary annular magnetic alignment component has a magnetic orientation that is generally aligned in the transverse plane. In some alternative embodiments, a secondary annular magnetic alignment component can instead have a quad-pole configuration similar to that of primary annular magnetic alignment component 1016 of FIGS. 10A and 10B, with or without a DC shield (which, if present, can be similar to DC shield 1014 of FIGS. 10A and 10B) on the distal surface of the secondary arcuate magnets. Using quad-pole magnetic configurations in both the primary and secondary alignment components can provide a closed-loop DC magnetic flux path and a strong sensation of "snappiness"; however, the thickness of the secondary magnetic alignment component may need to be increased to accommodate the quad-pole magnets and DC shield, which may increase the overall thickness of a portable electronic device that houses the secondary magnetic alignment component. To reduce thickness, the DC shield on the distal surface of the secondary alignment component can be omitted; however, omitting the DC shield may result in increased flux leakage into neighboring components.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations that exert forces toward the desired position of alignment. Different combinations of magnetic orientations may create different shear force profiles, and the selection of magnetic orientations may be made based on a desired shear force profile (e.g., high snappiness), avoidance of DC flux leakage into other components, and other design considerations.

In various embodiments described above, a magnetic alignment system can provide robust alignment in a lateral plane and may or may not provide rotational alignment. For example, radially symmetric magnetic alignment system 1200 of FIGS. 12A-5B may not define a preferred rotational orientation. Radially alternating magnetic alignment system 1500 of FIGS. 15A-8C can define multiple equally preferred rotational orientations. For some applications, such as alignment of a portable electronic device with a wireless charger puck or mat, rotational orientation may not be a concern. In other applications, such as alignment of a portable electronic device in a docking station or other mounting accessory, a particular rotational alignment may be desirable. Accordingly, in some embodiments an annular magnetic alignment component can be augmented with one or more rotational alignment components positioned outboard of and spaced apart from the annular magnetic alignment components. The rotational alignment component(s) can help guide devices into a target rotational orientation relative to each other.

Figure 18:
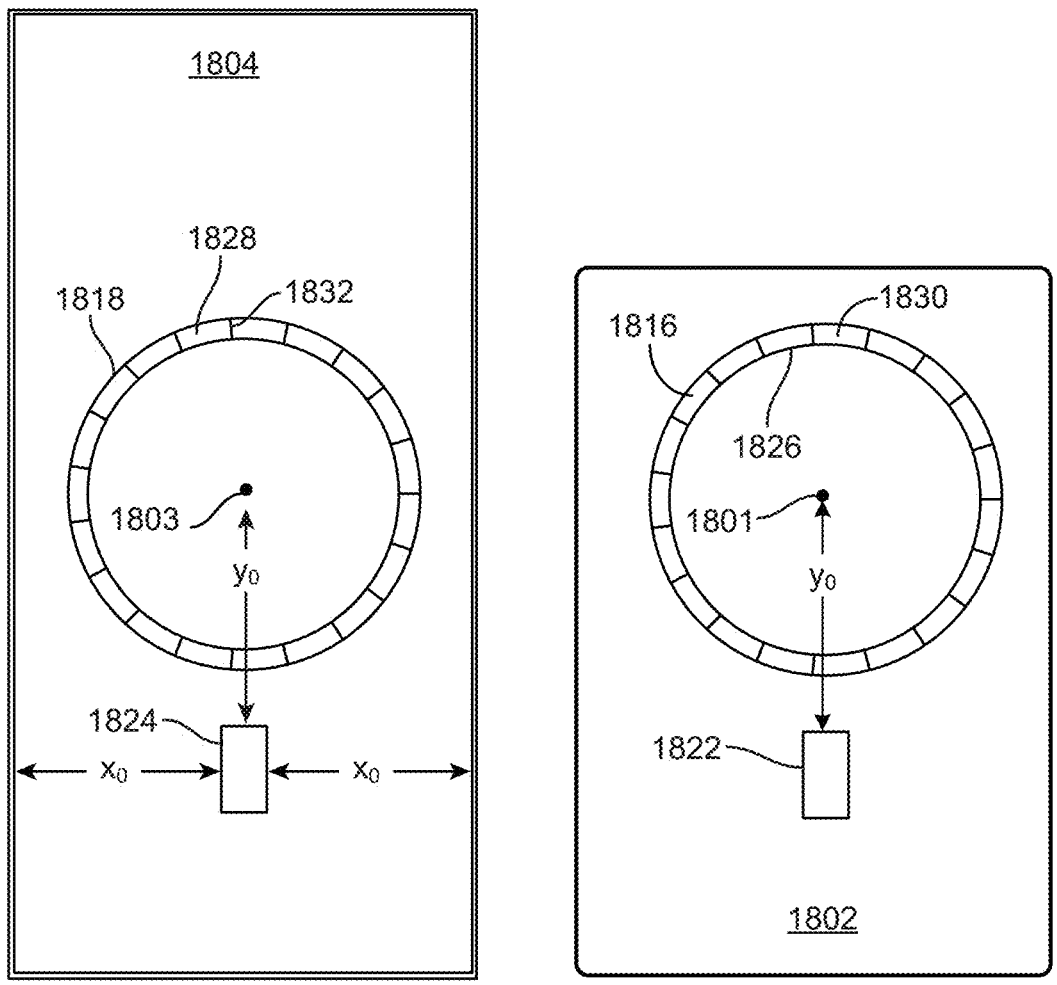
FIG. 18 shows an example of a portable electronic device and an accessory incorporating a magnetic alignment system with an annular alignment component and a rotational alignment component according to some embodiments.

FIG. 18 shows an example of a magnetic alignment system with an annular alignment component and a rotational alignment component according to some embodiments. FIG. 18 shows respective proximal surfaces of a portable electronic device 1804 and an accessory device 1802. In this example, primary alignment components of the magnetic alignment system are included in an accessory device 1802, and secondary alignment components of the magnetic alignment system are included in a portable electronic device 1804. Portable electronic device 1804 can be, for example, a smart phone whose front surface provides a touchscreen display and whose back surface is designed to support wireless charging. Accessory device 1802 can be, for example, a charging dock that supports portable electronic device 1804 such that its display is visible and accessible to a user. For instance, accessory device 1802 can support portable electronic device 1804 such that the display is vertical or at a conveniently tilted angle for viewing and/or touching. In the example shown, accessory device 1802 supports portable electronic device 1804 in a "portrait" orientation (shorter sides of the display at the top and bottom); however, in some embodiments accessory device 1802 can support portable electronic device 1804 in a "landscape" orientation (longer sides of the display at the top and bottom). Accessory device 1802 can also be mounted on a swivel, gimbal, or the like, allowing the user to adjust the orientation of portable electronic device 1804 by adjusting the orientation of accessory device 1802.

As described above, components of a magnetic alignment system can include a primary annular alignment component 1816 disposed in accessory device 1802 and a secondary annular alignment component 1818 disposed in portable electronic device 1804. Primary annular alignment component 1816 can be similar or identical to any of the primary alignment components described above. For example, primary annular alignment component 1816 can be formed of arcuate magnets 1826 arranged in an annular configuration. Although not shown in FIG. 18, one or more gaps can be provided in primary annular alignment component 1816, e.g., by omitting one or more of arcuate magnets 1826 or by providing a gap at one or more interfaces 1830 between adjacent arcuate magnets 1826. In some embodiments, each arcuate magnet 1826 can include an inner arcuate region having a first magnetic orientation (e.g., axially oriented in a first direction), an outer arcuate region having a second magnetic orientation opposite the first magnetic orientation (e.g., axially oriented opposite the first direction), and a central non-magnetized arcuate region between the inner and outer regions (as described above, the non-magnetized central region can include an air gap or a nonmagnetic material). In some embodiments, primary annular alignment component 1816 can also include a DC shield (not shown) on the distal side of arcuate magnets 1826.

Likewise, secondary annular alignment component 1818 can be similar or identical to any of the secondary alignment components described above. For example, secondary annular alignment component 1818 can be formed of arcuate magnets 1828 arranged in an annular configuration. Although not shown in FIG. 18, one or more gaps can be provided in secondary annular alignment component 1818, e.g., by omitting one or more arcuate magnets 1828 or by providing a gap at one or more interfaces 1832 between adjacent magnets 1828. As described above, arcuate magnets 1828 can provide radially-oriented magnetic polarities. For instance, all sectors of secondary annular alignment component 1818 can have a radially-outward magnetic orientation or a radially-inward magnetic orientation, or some sectors of secondary annular alignment component 1818 may have a radially-outward magnetic orientation while other sectors of secondary annular alignment component 1818 have a radially-inward magnetic orientation.

As described above, primary annular alignment component 1816 and secondary annular alignment component 1818 can provide shear forces that promote alignment in the lateral plane so that center point 1801 of primary annular alignment component 1816 aligns with center point 1803 of secondary annular alignment component 1818. However, primary annular alignment component 1816 and secondary annular alignment component 1818 might not provide torque forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 18, a primary rotational alignment component 1822 can be disposed outboard of and spaced apart from primary annular alignment component 1816 while a secondary rotational alignment component 1824 is disposed outboard of and spaced apart from secondary annular alignment component 1818. Secondary rotational alignment component 1824 can be positioned at a fixed distance ($y_0$) from center point 1803 of secondary annular alignment component 1818 and centered between the side edges of portable electronic device 1804 (as indicated by distance xo from either side edge). Similarly, primary rotational alignment component 1822 can be positioned at the same distance $y_0$ from center point 1801 of primary annular alignment component 1816 and located at a rotational angle that results in a torque profile that favors the desired orientation of portable electronic device 1804 relative to accessory device 1802 when secondary rotational alignment component 1824 is aligned with primary rotational alignment component 1822. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 1822 and secondary rotational alignment component 1824 can be implemented using one or more magnets (e.g., rare earth magnets such as NdFeB) each of which has each been magnetized such that its magnetic polarity is oriented in a desired direction. In the example of FIG. 18, the magnets have rectangular shapes; however, other shapes (e.g., rounded shapes) can be substituted. The magnetic orientations of rotational alignment components 1822 and 1824 can be complementary so that when the proximal surfaces of rotational alignment components 1822 and 1824 are near each other, an attractive magnetic force is exerted. This attractive magnetic force can help to rotate portable electronic device 1804 and accessory device 1802 into a preferred rotational orientation in which the proximal surfaces of rotational alignment components 1822 and 1824 are aligned with each other. Examples of magnetic orientations for rotational alignment components 1822 and 1824 that can be used to provide a desired attractive force are described below. In some embodiments, primary rotational alignment component 1822 and secondary rotational alignment component 1824 can have the same lateral (xy) dimensions and the same thickness. The dimensions can be chosen based on a desired magnetic field strength and/or torque, the dimensions of devices in which the rotational alignment components are to be deployed, and other design considerations. In some embodiments, the lateral dimensions can be about 6 mm (x direction) by about 18 mm (y direction), and the thickness can be anywhere from about 0.3 mm to about 1.5 mm; the particular dimensions can be chosen based on the sizes of the devices that are to be aligned. In some embodiments, each of primary rotational alignment component 1822 and secondary rotational alignment component 1824 can be implemented using two or more rectangular blocks of magnetic material positioned adjacent to each other. As in other embodiments, a small gap may be present between adjacent magnets, e.g., due to manufacturing tolerances.

Figure 19A:
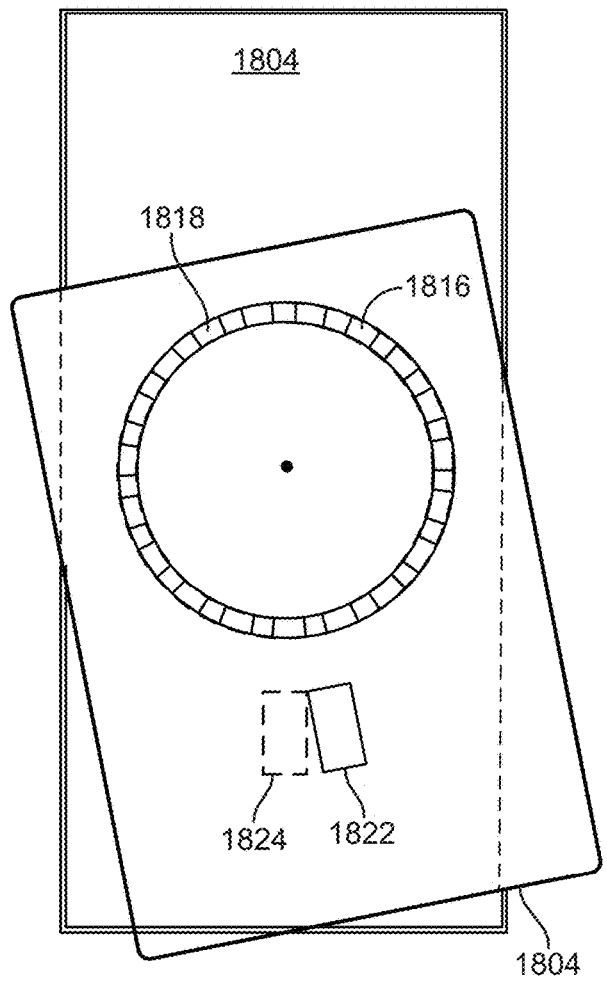
FIGS. 19A and 19B show an example of rotational alignment according to some embodiments.
Figure 19B:
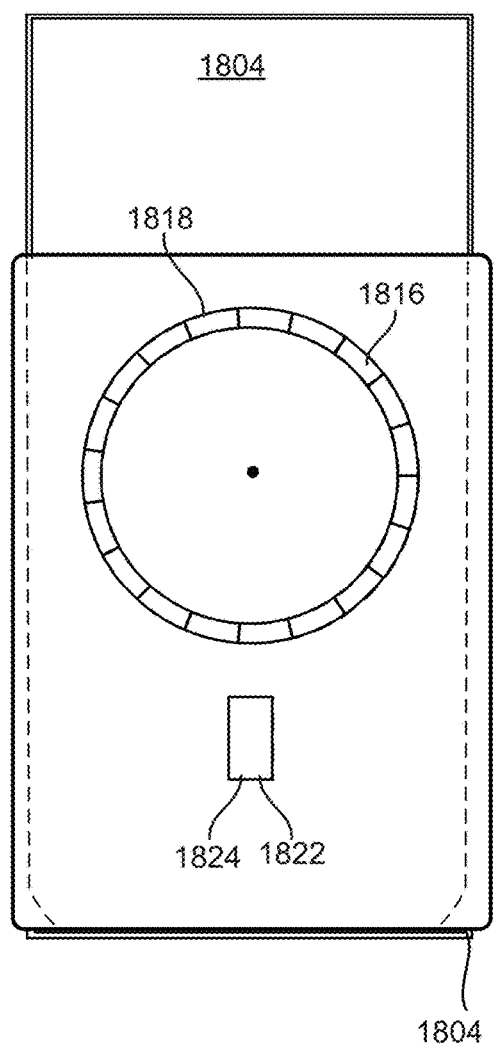

FIGS. 19A and 19B show an example of rotational alignment according to some embodiments. In FIG. 19A, accessory device 1802 is placed on the back surface of portable electronic device 1804 such that primary annular alignment component 1816 and secondary alignment component 1818 are aligned with each other in the lateral plane such that, in the view shown, center point 1801 of primary annular alignment component 1816 overlies center point 1803 of secondary annular alignment component 1818. A relative rotation is present such that rotational alignment components 1822 and 1824 are not aligned. In this configuration, an attractive force between rotational alignment components 1822 and 1824 can urge portable electronic device 1804 and accessory device 1802 toward a target rotational orientation. In FIG. 19B, the attractive magnetic force between rotational alignment components 1822 and 1824 has brought portable electronic device 1804 and accessory device 1802 into the target rotational alignment with the sides of portable electronic device 1804 parallel to the sides of accessory device 1802. In some embodiments, the attractive magnetic force between rotational alignment components 1822 and 1824 can also help to hold portable electronic device 1804 and accessory device 1802 in a fixed rotational alignment.

Rotational alignment components 1822 and 1824 can have various patterns of magnetic orientations. As long as the magnetic orientations of rotational alignment components 1822 and 1824 are complementary to each other, a torque toward the target rotational orientation can be present when the devices are brought into lateral alignment and close to the target rotational orientation. FIGS. 20A-21B show examples of magnetic orientations for a rotational alignment component according to various embodiments. While the magnetic orientation is shown for only one rotational alignment component, it should be understood that the magnetic orientation of a complementary rotational alignment component can be complementary to the magnetic orientation of shown.

Figures 20A, 20B:
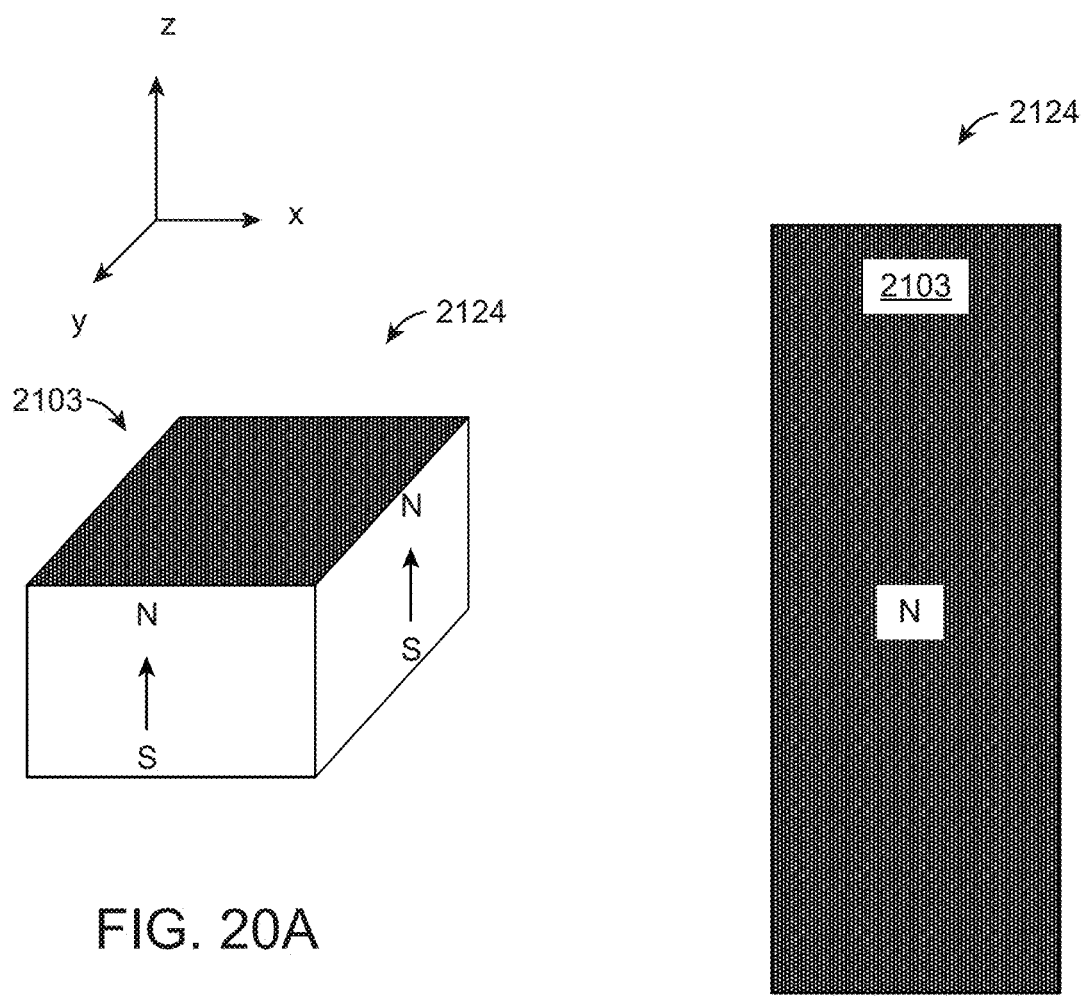
FIGS. 20A and 20B show a perspective view and a top view of a rotational alignment component having a "z-pole" configuration according to some embodiments.

FIGS. 20A and 20B show a perspective view and a top view of a rotational alignment component 2024 having a "z-pole" configuration according to some embodiments. It should be understood that the perspective view is not to any particular scale and that the lateral (xy) dimensions and axial (z) thickness can be varied as desired. As shown in FIG. 20A, rotational alignment component 2024 can have a uniform magnetic orientation along the axial direction. Accordingly, as shown in FIG. 20B, a north magnetic pole (N) can be nearest the proximal surface 2003 of rotational alignment component 2024. A complementary z-pole alignment component would have uniform magnetic orientation with a south magnetic pole nearest the proximal surface. The z-pole configuration can provide reliable alignment.

Other configurations can provide reliable alignment as well as a stronger, or more salient, "clocking" sensation for the user. A clocking sensation as used herein refers to a user-perceptible torque about the common axis of the annular alignment components that pulls toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration.

Figure 21A:
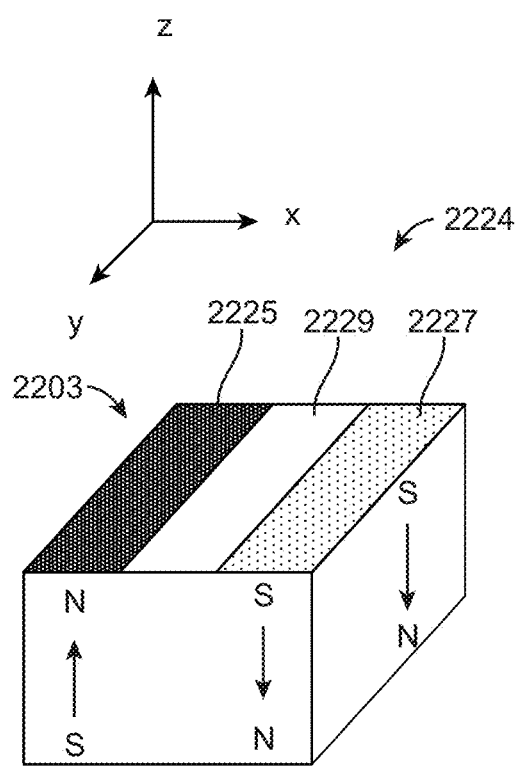
FIGS. 21A through 21F show rotational alignment components according to some embodiments.
Figure 21B:
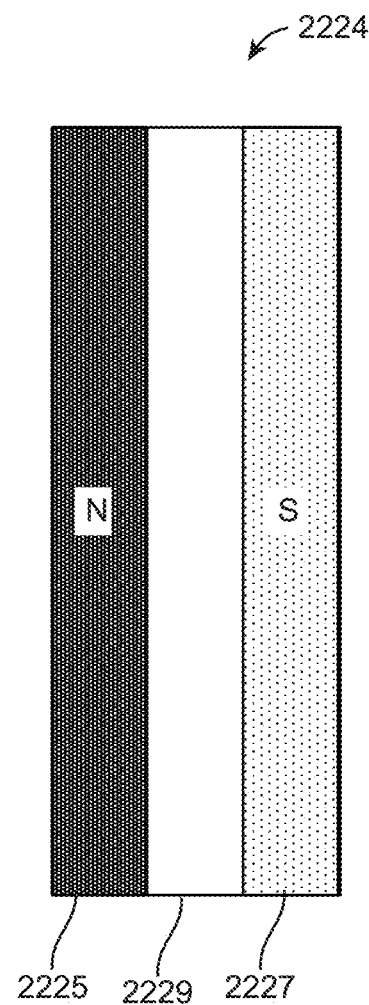

FIGS. 21A and 21B show a perspective view and a top view of a rotational alignment component 2124 having a "quad pole" configuration according to some embodiments. It should be understood that the perspective view is not to any particular scale and that the lateral (xy) dimensions and axial (z) thickness can be varied as desired. As shown in FIG. 21A, rotational alignment component 2124 has a first magnetized region 2125 with a magnetic orientation along the axial direction such that the north magnetic pole (N) is nearest the proximal (+z) surface 2103 of rotational alignment component 2124, a second magnetized region 2127 with a magnetic orientation opposite to the magnetic orientation of the first region such that the south magnetic pole (S) is nearest to proximal surface 2103. Between magnetized regions 2125 and 2127 is a neutral region 2129 that is not strongly magnetized. In some embodiments, rotational alignment component 2124 can be formed from a single piece of magnetic material that is exposed to a magnetizer to create regions 2125, 2127, 2129. Alternatively, rotational alignment component 2124 can be formed using two pieces of magnetic material with a nonmagnetic material or an air gap between them. As shown in FIG. 21B, the proximal surface of rotational alignment component 2124 can have one region having a "north" polarity and another region having a "south" polarity. A complementary quad-pole rotational alignment component would have corresponding regions of south and north polarity at the proximal surface.

Figure 21C:
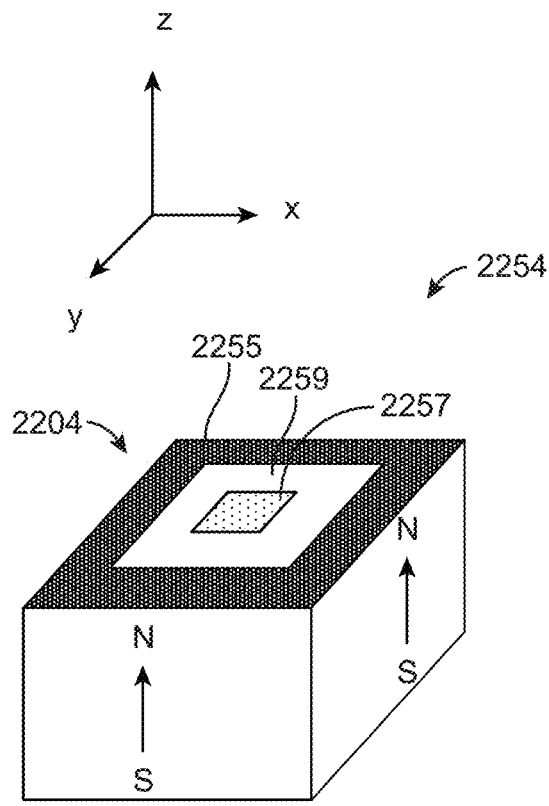
Figure 21D:
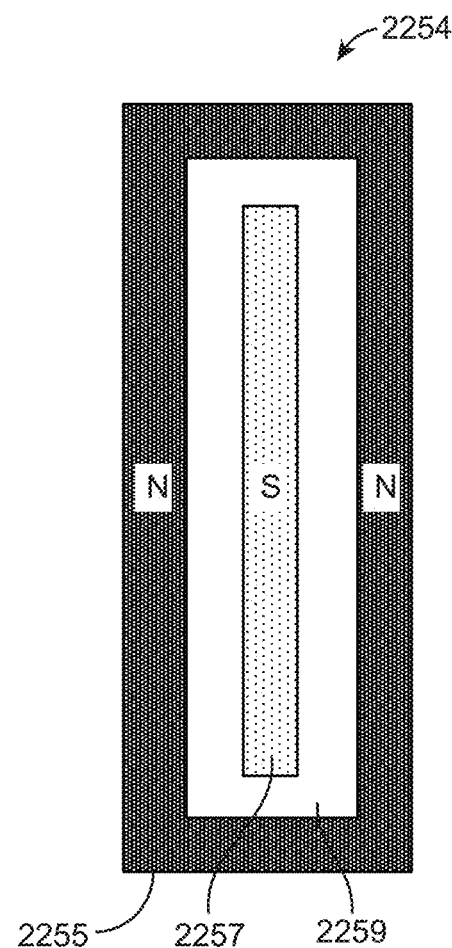

FIGS. 21C and 21D show a perspective view and a top view of a rotational alignment component 2154 having an "annulus design" configuration according to some embodiments. It should be understood that the perspective view is not to any particular scale and that the lateral (xy) dimensions and axial (z) thickness can be varied as desired. As shown in FIG. 21A, rotational alignment component 2154 has an outer magnetized region 2155 with a magnetic orientation along the axial direction such that the north magnetic pole (N) is nearest the proximal (+z) surface 2103 of rotational alignment component 2154, and an inner magnetized region 2157 with a magnetic orientation opposite to the magnetic orientation of the first region such that the south magnetic pole (S) is nearest to proximal surface 2104. Between magnetized regions 2155 and 2157 is a neutral annular region 2159 that is not strongly magnetized. In some embodiments, rotational alignment component 2154 can be formed from a single piece of magnetic material that is exposed to a magnetizer to create regions 2155, 2157, 2159. Alternatively, rotational alignment component 2154 can be formed using two pieces of magnetic material with a non-magnetic material or an air gap between them. As shown in FIG. 21B, the proximal surface of rotational alignment component 2154 can have an annular outer region having a "north" polarity and an inner region having a "south" polarity. The proximal surface of a complementary annulus-design rotational alignment component would have an annular outer region of south polarity and an inner region of north polarity.

Figures 21E, 21F:
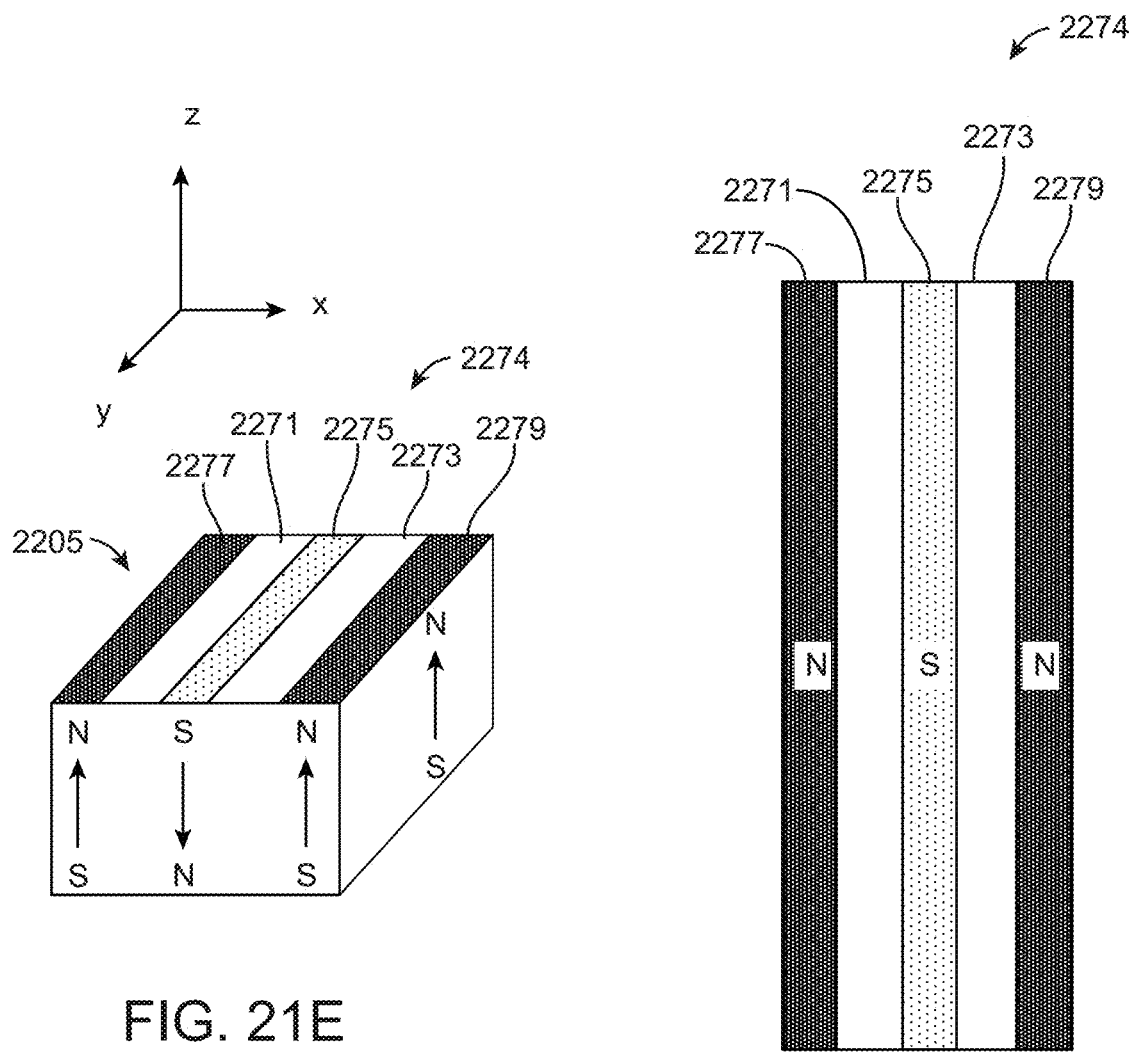

FIGS. 21E and 21F show a perspective view and a top view of a rotational alignment component 2174 having a "triple pole" configuration according to some embodiments. It should be understood that the perspective view is not to any particular scale and that the lateral (xy) dimensions and axial (z) thickness can be varied as desired. As shown in FIG. 21A, rotational alignment component 2174 has a central magnetized region 2175 with a magnetic orientation along the axial direction such that the south magnetic pole (S) is nearest the proximal (+z) surface 2105 of rotational alignment component 2174, and outer magnetized regions 2177, 2179 with a magnetic orientation opposite to the magnetic orientation of central region 2175 such that the north magnetic pole (N) is nearest to proximal surface 2105. Between central magnetized region 2175 and each of outer magnetized regions 2177, 2179 is a neutral annular region 2171, 2173 that is not strongly magnetized. In some embodiments, rotational alignment component 2174 can be formed from a single piece of magnetic material that is exposed to a magnetizer to create regions 2175, 2177, 2179. Alternatively, rotational alignment component 2174 can be formed using three pieces of magnetic material with nonmagnetic materials or air gaps between them. As shown in FIG. 21B, the proximal surface can have a central region having a "south" polarity with an outer region having "north" polarity to either side. The proximal surface of a complementary triple-pole rotational alignment component would have a central region of north polarity with an outer region of south polarity to either side.

It should be understood that the examples in FIGS. 20A-21F are illustrative and that other configurations can be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque. For example, it can be desirable to provide a strong tactile "clocking" feel to a user when close to the desired rotational alignment. The "clocking" feel can be a result of torque about a rotational axis defined by the annular alignment components. The amount of torque depends on various factors, including the distance between the axis and the rotational alignment component (distance y0 in FIG. 18), as well as the strength of the magnetic fields of the rotational alignment components (which can depend on the size of the rotational alignment component) and whether the annular alignment components exert any torque toward a preferred rotational orientation.

Figure 22:
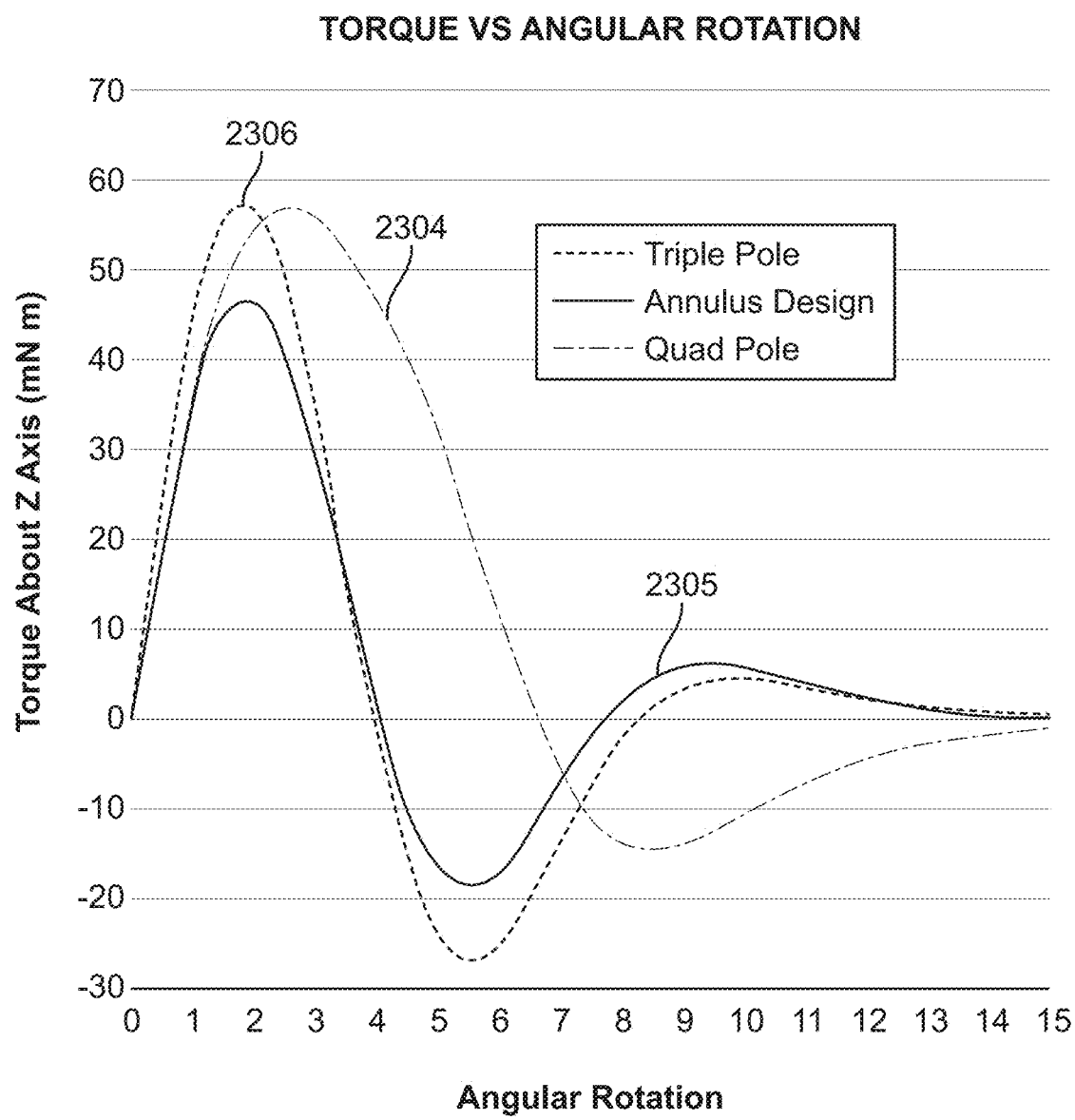
FIG. 22 shows graphs of torque as a function of angular rotation for magnetic alignment systems having rotational alignment components according to various embodiments.

FIG. 22 shows graphs of torque as a function of angular rotation (in degrees) for an alignment system of the kind shown in FIG. 18, for different magnetization configurations of the rotational alignment component according to various embodiments. Angular rotation is defined such that zero degrees corresponds to the target rotational alignment (where the proximal surfaces of rotational angular components 1822 and 1824 are in closest proximity). Torque is defined such that positive (negative) values indicate force in the direction of decreasing (increasing) rotational angle. For purpose of generating the torque profiles, it is assumed that annular alignment components 1816 and 1818 are rotationally symmetric and do not exert torque about the z axis defined by center points 1801 and 1803. Three different magnetization configurations are considered. Line 2204 corresponds to the quad-pole configuration of FIGS. 21A and 21B. Line 2205 corresponds to the annulus design configuration of FIGS. 21A and 21B. Line 2206 corresponds to the triple-pole configuration of FIGS. 21A and 21B. As shown, the annulus design (line 2205) and triple-pole (line 2206) configurations provide a sharper peak in the torque and therefore a more salient clocking sensation for the user, as compared to the quad-pole configuration (line 2204). In addition, the triple-pole configuration provides a stronger peak torque and therefore a more salient clocking sensation than the annulus-design configuration. It should be understood that the numerical values in FIG. 22 are illustrative, and that torque in a particular embodiment can depend on a variety of other factors in addition to the magnetization configuration, such as the magnet volume, aspect ratio, and distance y0 from the center of the annular alignment component.

Figure 23:
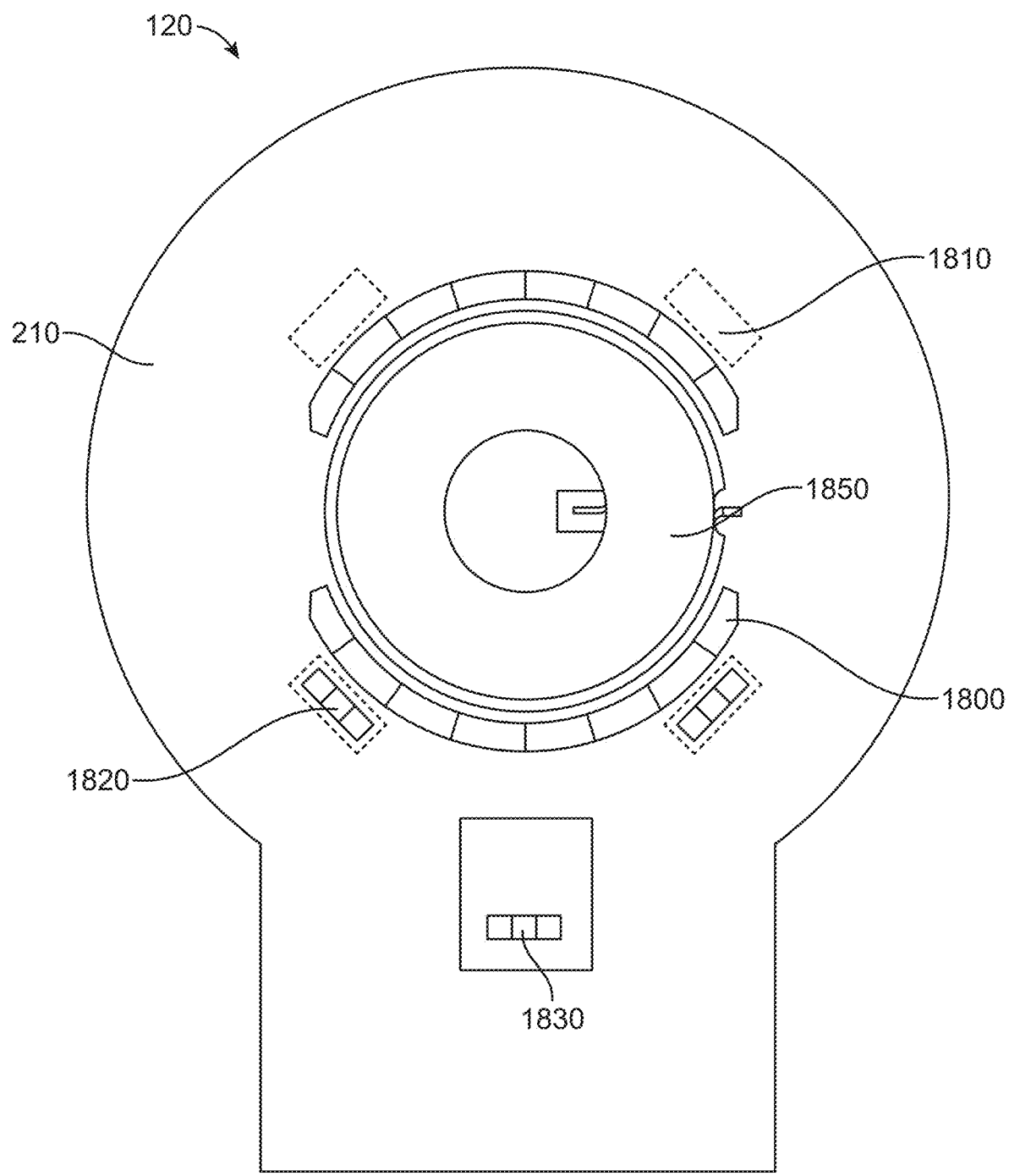
FIG. 23 shows a portable electronic device having an alignment system with multiple rotational alignment components according to some embodiments.

In the examples shown above, a single rotational alignment component is placed outside the annular alignment component at a distance $y_0$ from the center of the annular alignment component. This arrangement allows a single magnetic element to generate enough torque to produce a salient clocking sensation for a user aligning devices. In some embodiments, other arrangements are also possible. For example, FIG. 23 shows a portable electronic device, in this example adapter 120, having an alignment system 2300 inside enclosure 410 with multiple rotational alignment components according to some embodiments. In this example, alignment system 2300 includes an annular alignment component 2318 and a set of rotational alignment components 2324 positioned at various locations around the perimeter of annular alignment component 2318. In this example, there are four rotational alignment components 2324 positioned at angular intervals of approximately 90 degrees. In other embodiments, different numbers and spacing of rotational alignment components can be used. Each rotational alignment component 2324 can have any of the magnetization configurations described above, including z-pole, quad-pole, triple-pole, or annulus-design configurations, or a different configuration. Further, different rotational alignment components 2324 can have different magnetization configurations from each other. It should be noted that rotational alignment components 2324 can be placed close to the perimeter of annular alignment component 2318, and the larger number of magnetic components can provide increased torque at a smaller radius. In this example, an additional rotational alignment component 2330 can be used along with, or instead of rotational alignment components 2324. Additional rotational alignment component 2330 can be arranged to be attracted to a corresponding rotational alignment component in a phone or other electronic device 180 (shown in FIG. 1.) This can be particularly helpful when aligning electronic device 180 to adapter 120 in either a portrait or landscape orientation.

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 1804 of FIG. 18 can align rotationally to accessory device 1802 (which has both annular alignment component 1816 and rotational alignment component 1822) as well as aligning laterally to another accessory (not shown) that has annular alignment component 1816 but not rotational alignment component 1822. In the latter case, lateral alignment can be achieved, e.g., to support efficient wireless charging, but there might be no preferred rotational alignment, or rotational alignment can be achieved using a non-magnetic feature (e.g., a mechanical retention feature such as a ledge, a clip, a notch, or the like). A rotational magnetic alignment component can be used together with any type of annular magnetic alignment component (e.g., primary annular magnetic alignment components, secondary annular magnetic alignment components, or auxiliary annular magnetic alignment components as described below).

In embodiments described above, it is assumed (though not required) that the magnetic alignment components are fixed in position relative to the device enclosure and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

FIGS. 24A through 24C illustrate examples of moving magnets according to an embodiment of the present invention. In this example, first electronic device 2400 can be any of the adapters shown above, a wireless charging device, or other device having a magnet 2410 (which can be, e.g., any of the annular or other magnetic alignment components described herein.) In FIG. 24A, moving magnet 2410 can be housed in a first electronic device 2400. First electronic device 2400 can include device enclosure 2430, magnet 2410, and shield 2420. Magnet 2410 can be in a first position (not shown) adjacent to nonmoving shield 2420. In this position, magnet 2410 can be separated from device enclosure 2430. As a result, the magnetic flux 2412 at a surface of device enclosure 2430 can be relatively low, thereby protecting magnetic devices and magnetically stored information, such as information stored on payment cards. As magnet 2410 in first electronic device 2400 is attracted to a second magnet (not shown) in a second electronic device (not shown), magnet 2410 can move, for example it can move away from shield 2420 to be adjacent to device enclosure 2430, as shown. With magnet 2410 at this location, magnetic flux 2412 at surface of device enclosure 2430 can be relatively high. This increase in magnetic flux 2412 can help to attract the second electronic device to first electronic device 2400.

With this configuration, it can take a large amount of magnetic attraction for magnet 2410 to separate from shield 2420. Accordingly, these and other embodiments of the present invention can include a shield that is split into a shield portion and a return plate portion. For example, in FIG. 24B, line 2460 can be used to indicate a split of shield 2420 into a shield 2440 and return plate 2450. Shield 2420, and the other shields shown here or otherwise utilized by embodiments of the present invention, can be formed of a material that has high magnetic permeability, such as stainless steel. Return plate 2450, and the other return plates shown here or otherwise utilized by embodiments of the present invention, can be formed of a material that has high magnetic permeability, such as stainless steel.

In FIG. 24C, moving magnet 2410 can be housed in first electronic device 2400. First electronic device 2400 can include device enclosure 2430, magnet 2410, shield 2440, and return plate 2450. In the absence of a magnetic attraction, magnet 2410 can be in a first position (not shown) such that shield 2440 can be adjacent to return plate 2450. Again, in this configuration, magnetic flux 2412 at a surface of device enclosure 2430 can be relatively low. As magnet 2410 and first electronic device is attracted to a second magnet (not shown) in a second electronic device (not shown), magnet 2410 can move, for example it can move away from return plate 2450 to be adjacent to device enclosure 2430, as shown. In this configuration, shield 2440 can separate from return plate 2450 and the magnetic flux 2412 at a surface of device enclosure 2430 can be increased. As before, this increase in magnetic flux 2412 can help to attract the second electronic device to the first electronic device 2400.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

FIGS. 25A and 25B illustrate a moving magnetic structure according to an embodiment of the present invention In this example, first electronic device 2500 can be any of the adapters shown above, a wireless charging device, or other device having a magnet 2510 (which can be, e.g., any of the annular or other magnetic alignment components described herein.) FIG. 25A illustrates a moving first magnet 2510 in a first electronic device 2500. First electronic device 2500 can include first magnet 2510, protective surface 2512, housings 2520 and 2522, compliant structure 2524, shield 2540, and return plate 2550. In this figure, first magnet 2510 is not attracted to a second magnet (not shown), and therefore shield 2540 is magnetically attracted to or attached to return plate 2550. In this position, compliant structure 2524 can be expanded or relaxed. Compliant structure 2524 can be formed of an elastomer, silicon rubber open cell foam, silicon rubber, polyurethane foam, or other foam or other compressible material.

In FIG. 25B, second electronic device 2560 has been brought into proximity of first electronic device 2500. Second magnet 2570 can attract first magnet 2510, thereby causing shield 2540 and return plate 2550 to separate from each other. Housings 2520 and 2522 can compress compliant structure 2524, thereby allowing protective surface 2512 of first electronic device 2500 to move towards or adjacent to housing 2580 of second electronic device 2560. Second magnet 2570 can be held in place in second electronic device 2560 by housing 2590 or other structure. As second electronic device 2560 is removed from first electronic device 2500, first magnet 2510 and shield 2540 can be magnetically attracted to return plate 2550, as shown in FIG. 25A.

Figure 26B:
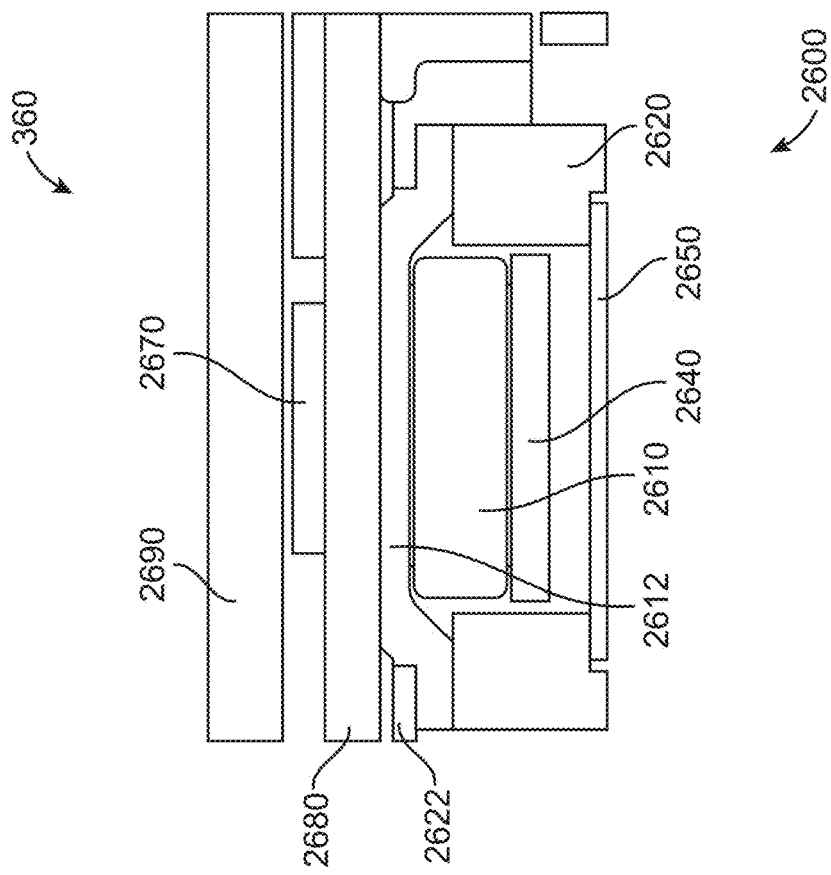
FIGS. 26A and 26B illustrate a moving magnetic structure according to an embodiment of the present invention.
Figure 26A:
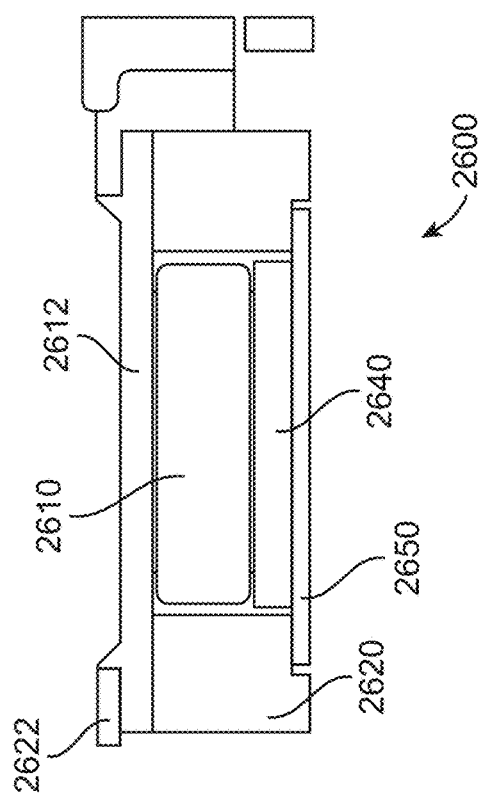

FIGS. 26A and 26B illustrate moving magnetic structures according to an embodiment of the present invention. In this example, first electronic device 2600 can be any of the adapters shown above, a wireless charging device, or other device having a magnet 2610 (which can be, e.g., any of the annular or other magnetic alignment components described herein.) FIG. 26A illustrates a moving first magnet 2610 in a first electronic device 2600. First electronic device 2600 can include first magnet 2610, pliable surface 2612, housing portions 2620 and 2622, shield 2640, and return plate 2650. In this figure, first magnet 2610 is not attracted to a second magnet, and therefore shield 2640 is magnetically attached or attracted to return plate 2650. In this position, pliable surface 2612 can be relaxed. Pliable surface 2612 can be formed of an elastomer, silicon rubber open cell foam, silicon rubber, polyurethane foam, or other foam or other compressible material.

In FIG. 26B, second electronic device 2660 has been brought into the proximity of first electronic device 2600. Second magnet 2670 can attract first magnet 2610, thereby causing shield 2640 and return plate 2650 to separate from each other. First magnet 2610 can stretch pliable surface 2612 towards second electronic device 2660, thereby allowing first magnet 2610 of first electronic device 2600 to move towards housing 2680 of second electronic device 2660. Second magnet 2670 can be held in place in second electronic device 2660 by housing 2690 or other structure. As second electronic device 2660 is removed from first electronic device 2600, first magnet 2610 and shield 2640 can be magnetically attracted to return plate 2650 as shown in FIG. 26A.

Figure 27:
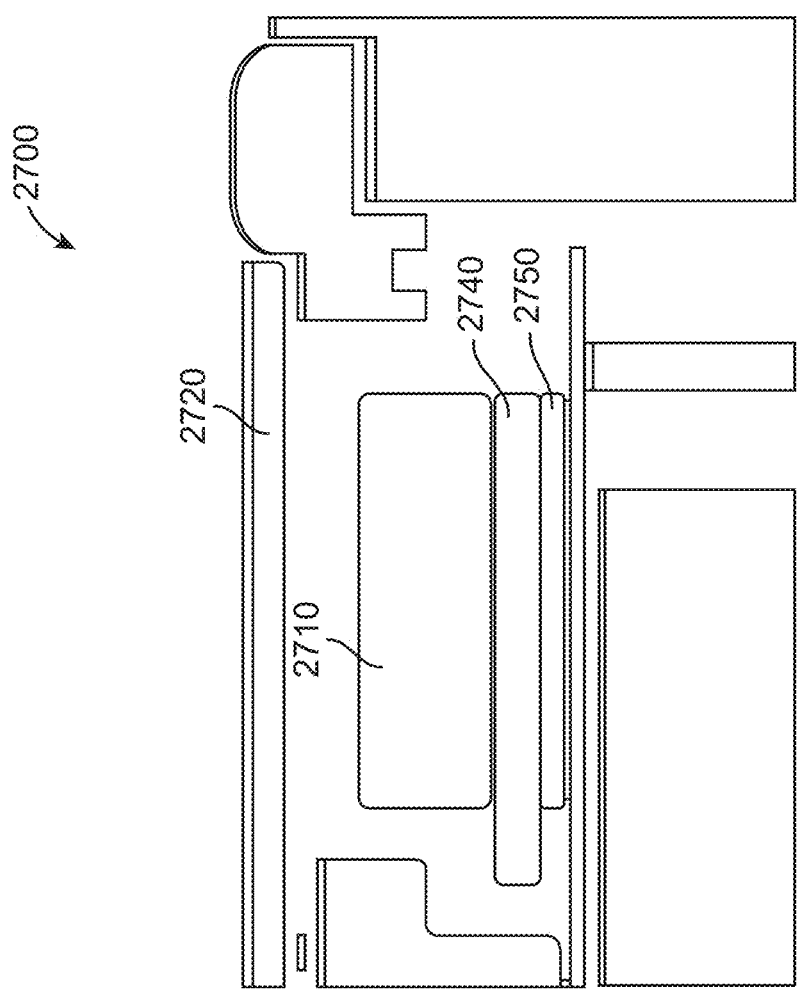
FIG. 27 through FIG. 29 illustrate a moving magnetic structure according to an embodiment of the present invention.
Figure 28:
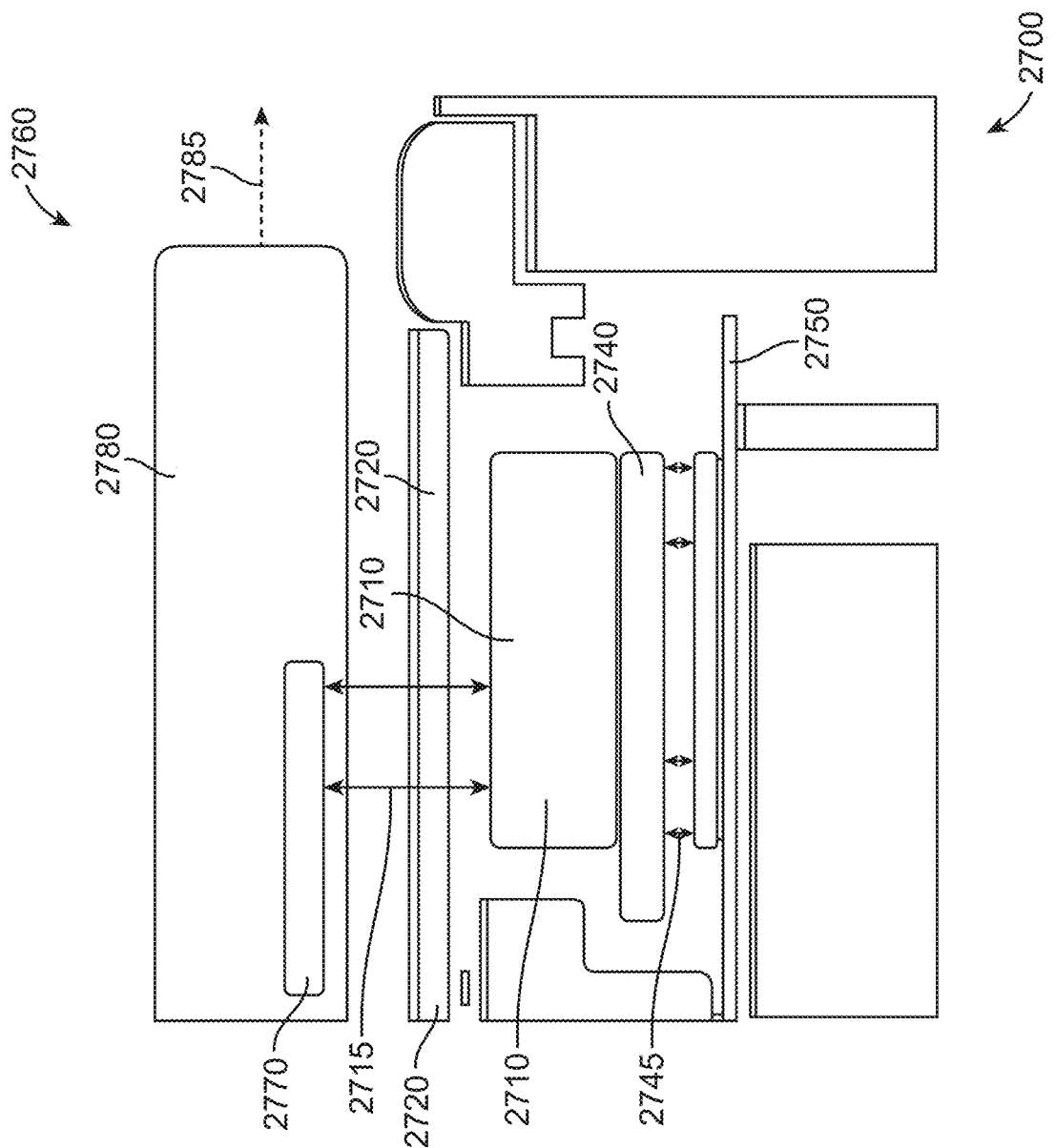
Figure 29:
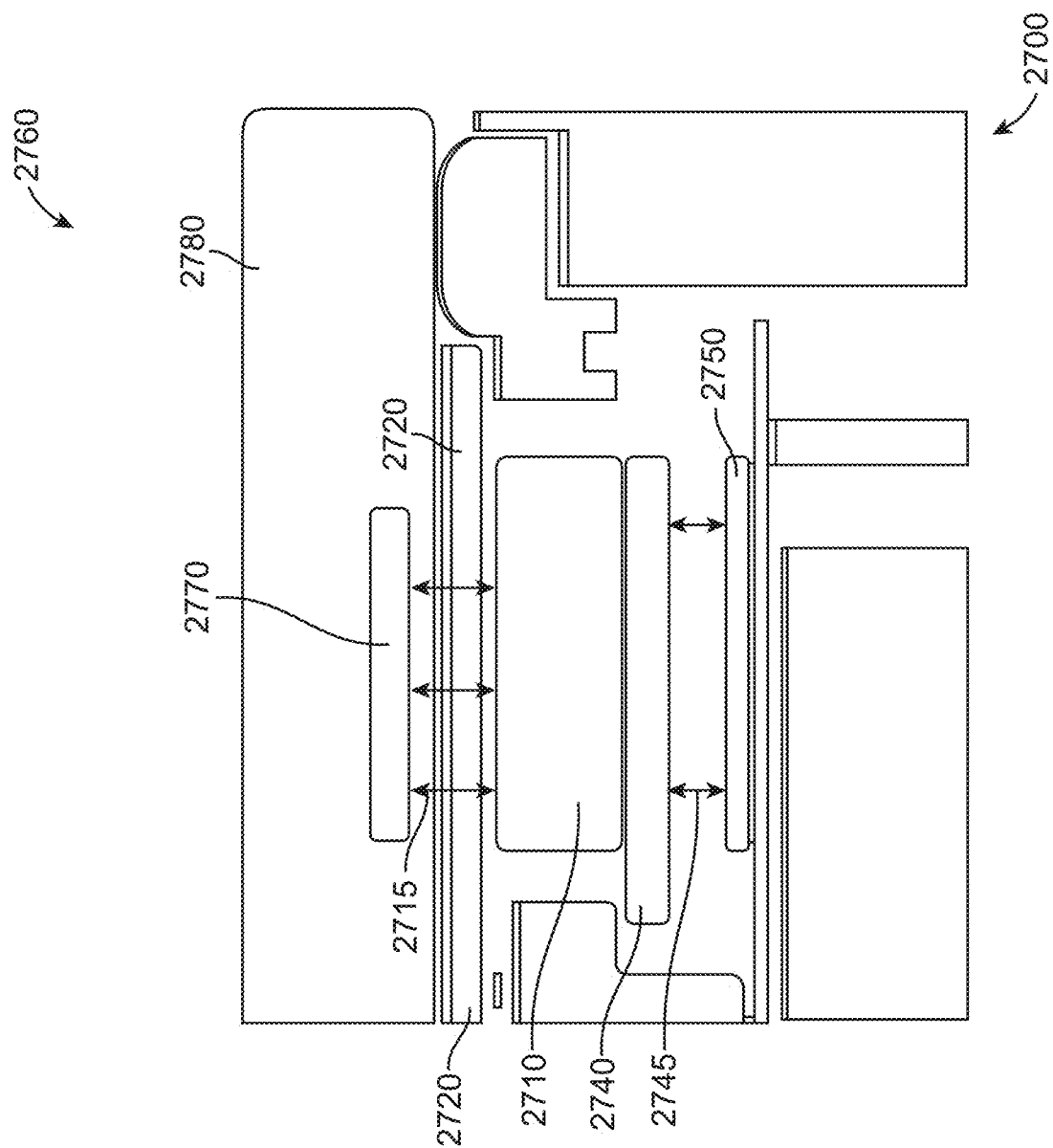

FIG. 27 to FIG. 29 illustrate a moving magnetic structure according to an embodiment of the present invention. In this example, first electronic device 2700 can be any of the adapters shown above, a wireless charging device, or other device having a magnet 2710 (which can be, e.g., any of the annular or other magnetic alignment components described herein.) In FIG. 27, first magnet 2710 and shield 2740 can be magnetically attracted to or attached to return plate 2750 in first electronic device 2700. First electronic device 2700 can be at least partially housed in device enclosure 2720. In FIG. 28, housing 2780 of second electronic device 2760 can move laterally across a surface of device enclosure 2720 of first electronic device 2700 in a direction 2785. Second magnet 2770 in second electronic device 2760 can begin to attract first magnet 2710 in first electronic device 2700. This magnetic attraction 2715 can cause first magnet 2710 and shield 2740 to pull away from return plate 2750 by overcoming the magnetic attraction 2745 between shield 2740 and return plate 2750. In FIG. 29, second magnet 2770 in second electronic device 2760 has become aligned with first magnet 2710 in first electronic device 2700. First magnet 2710 and shield 2740 have pulled away from return plate 2750 thereby reducing the magnetic attraction 2745. First magnet 2710 has moved nearby or adjacent to device enclosure 2720, thereby increasing the magnetic attraction 2715 to second magnet 2770 in second electronic device 2760.

As shown in FIG. 27 through FIG. 29, the magnetic attraction between first magnet 2710 in first electronic device 2700 and the second magnet 2770 in the second electronic device 2760 can increase when first magnet 2710 and shield 2740 pull away from return plate 2750. This is shown graphically in the following figures.

Figure 30:
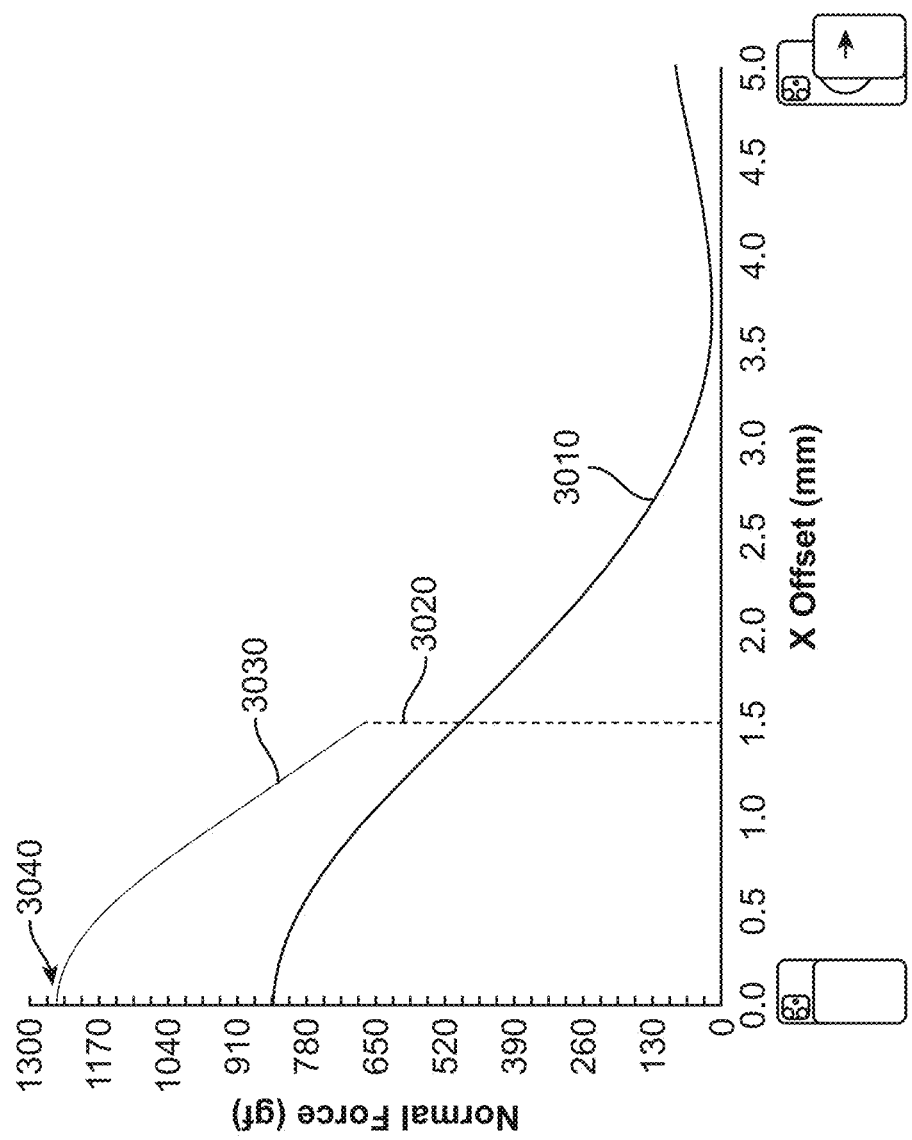
FIG. 30 illustrates a normal force between a first magnet in a first electronic device and a second magnet in a second electronic device.

FIG. 30 illustrates a normal force between a first magnet in first electronic device and a second magnet in a second electronic device as a function of a lateral offset between them. As shown in FIGS. 27-36, with a large offset between first magnet 2710 and second magnet 2970, first magnet 2710 and shield 2740 can remain attached to return plate 2750 in first electronic device 2700 and the magnetic attraction 2715 can be minimal. The shear force necessary to overcome this magnetic attraction is illustrated here as curve 3010. As shown in FIG. 28, as the offset or lateral distance between first magnet 2710 and second magnet 2770 decreases, first magnet 2710 and shield 2740 can pull away or separate from return plate 2750, thereby increasing the magnetic attraction 2715 between first magnet 2710 and second magnet 2770. This is illustrated here as discontinuity 3020. As shown in FIG. 29, as first magnet 2710 and second magnet 2770 come into alignment, the magnetic attraction 2715 increases along curve 3030 to a maximum 3040. The difference between curve 3010 and curve 3030 can show the increase in magnetic attraction between a phone or other electronic device, such as second electronic device 2760 and an attachable wallet or wireless charging device, such as first electronic device 2700, that results from first magnet 2710 being able to move axially. It should also be noted that in this example first magnet 2710 does not move in a lateral direction, though in other examples it is capable of such movement. Where first magnet 2710 is capable of moving in a lateral direction, curve 3030 can have a flattened peak from an offset of zero to an offset that can be overcome by a range of possible lateral movement of first magnet 2710.

Figure 31:
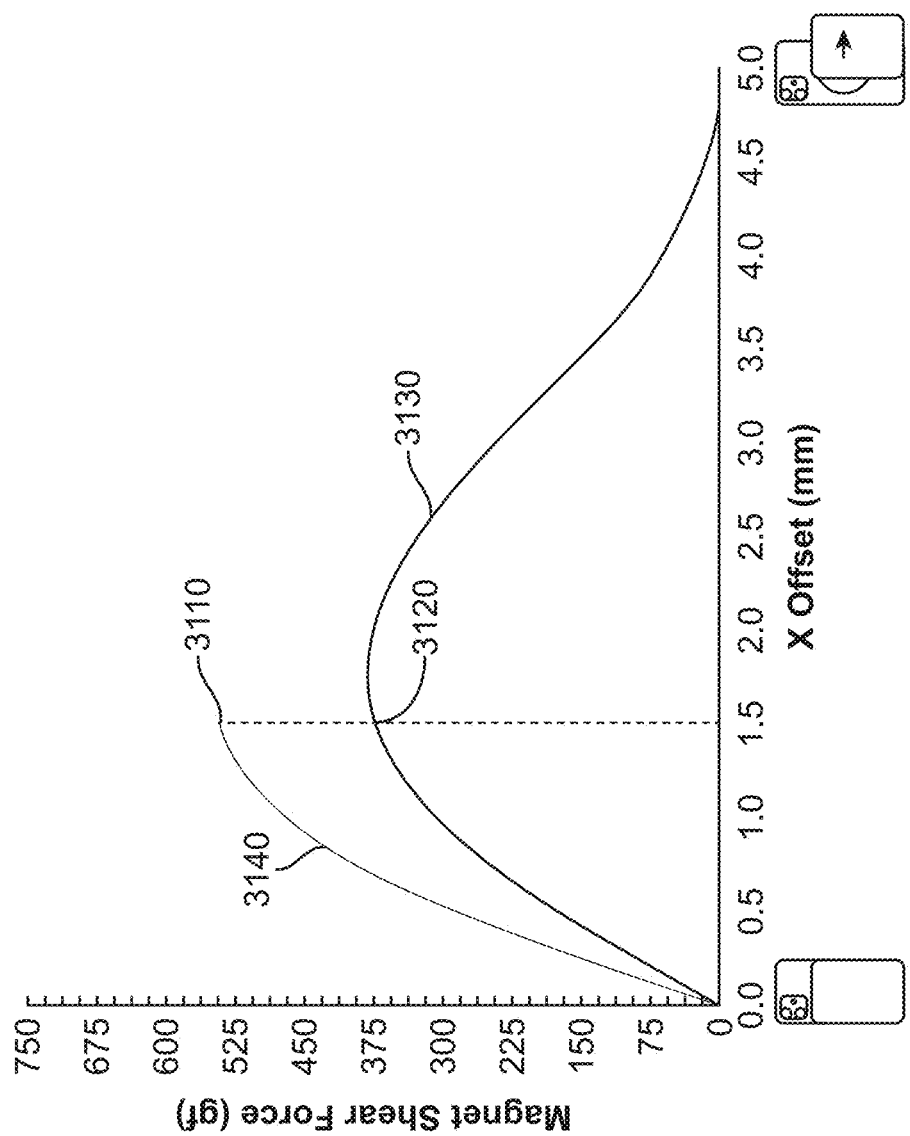
FIG. 31 illustrates a shear force between a first magnet in a first electronic device and a second magnet in a second electronic device.

FIG. 31 illustrates a shear force between a first magnet in a first electronic device and a second magnet in a second electronic device as a function of a lateral offset between them. With no offset between first magnet 2710 and second magnet 2770, there it is no shear force to move second magnet 2770 relative to first magnet 2710, as shown in FIG. 27. As the offset is increased, the shear force, that is the force attempting to realign the magnets, can increase along curve 3140. At discontinuity 3110, first magnet 2710 and shield 2740 can return to return plate 2750 (as shown in FIGS. 27-36), thereby decreasing the magnetic shear force to point 3120. The magnetic shear force can continue to drop off along curve 3130 as the offset increases. The difference between curve 3130 and curve 3140 can show the increase in magnetic attraction between a phone or other electronic device, such as second electronic device 2760 and an attachable wallet or wireless charging device, such as first electronic device 2700, that results from first magnet 2710 being able to move axially. It should also be noted that in this example first magnet 2710 does not move in a lateral direction, though in other examples it is capable of such movement. Where first magnet 2710 is capable of moving in a lateral direction, curve 3130 can remain at zero until the lateral movement of the second magnet 2770 overcomes the range of possible lateral movement of first magnet 2710.

In these and other embodiments of the present invention, it can be desirable to further increase this shear force. Accordingly, embodiments of the present invention can provide various high friction or high stiction surfaces, suction cups, pins, or other structures to increase this shear force. Examples are shown in the following figures.

Figure 32A:
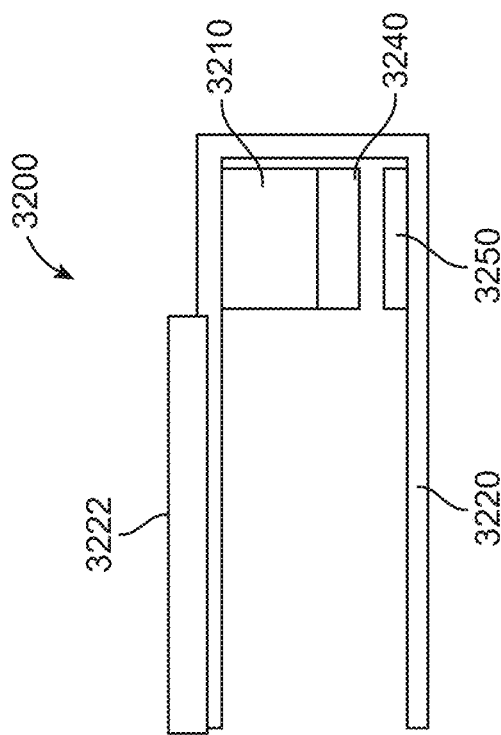
FIGS. 32A and 32B illustrate a moving magnet in conjunction with a high friction surface according to an embodiment of the present invention.
Figure 32B:
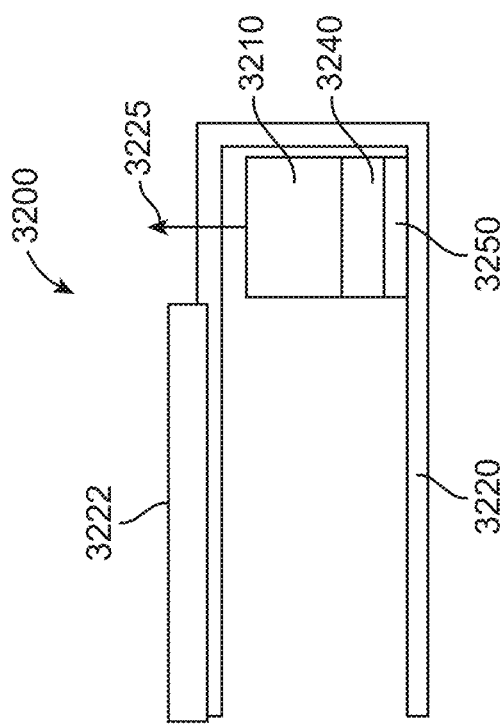

FIGS. 32A and 32B illustrate a moving magnet in conjunction with a high friction or high stiction surface according to an embodiment of the present invention. In this example, first electronic device 3200 can be a wireless charger device or other device having a first magnet 3210 (which can be, e.g., any of the annular magnetic alignment components described above). In FIG. 32A, first magnet 3210 and shield 3240 can be magnetically attracted or attached to return plate 3250 in first electronic device 3200. First electronic device 3200 can be housed in device enclosure 3220. Some or all of a surface of device enclosure 3220 can have a coating, layer, or other structure 3222. Structure 3222 can provide a high friction or high stiction surface. In FIG. 32B, first magnet 3210 and shield 3240 can be attracted to a second magnet (not shown) in a second electronic device (not shown.) As before, the separation of first magnet 3210 and shield 3240 from return plate 3250 can provide an increased amount of magnetic flux to hold the second electronic device in place relative to first electronic device 3200. Structure 3222 can increase the friction or stiction between first electronic device 3200 and the second electronic device in a lateral or shear direction.

Figure 33B:
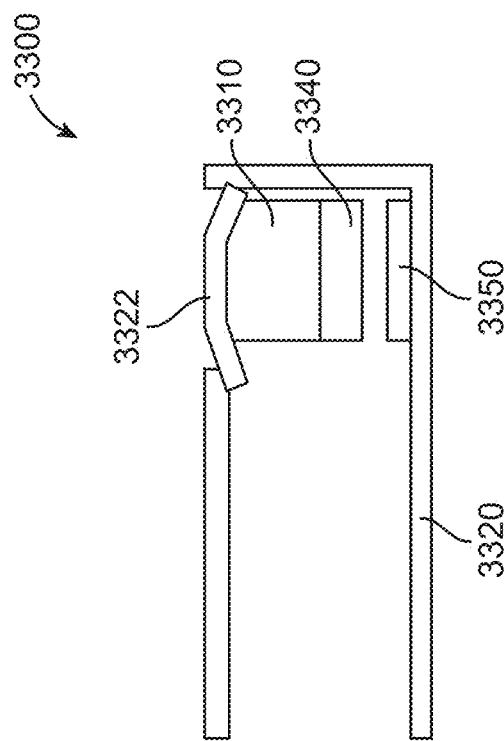
FIGS. 33A and 33B illustrate a moving magnet in conjunction with a high friction surface according to an embodiment of the present invention.
Figure 33A:
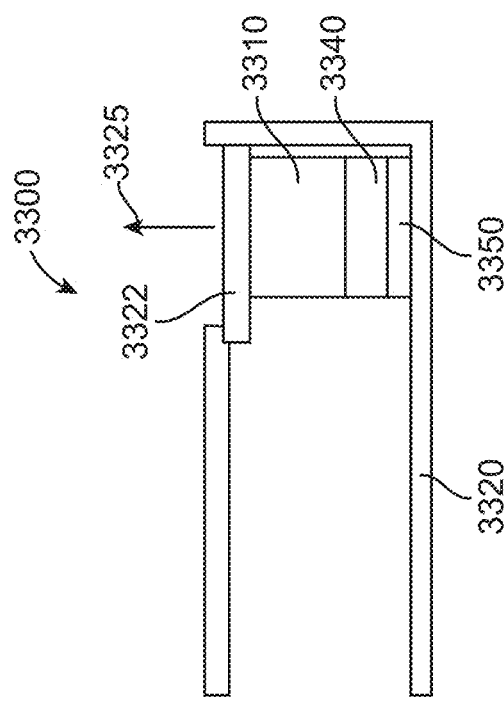

FIGS. 33A and 33B illustrate a moving magnet in conjunction with a high friction or high stiction surface according to an embodiment of the present invention. In this example, first electronic device 3300 can be a wireless charger device or other device having a first magnet 3310 (which can be, e.g., any of the annular magnetic alignment components described above). In FIG. 33A, first magnet 3310 and shield 3340 can be magnetically attracted or attached to return plate 3350 in first electronic device 3300. First electronic device 3300 can be housed in device enclosure 3320. Some or all of a surface of device enclosure 3320 can have a coating, layer, or other structure 3322, in this example over first magnet 3310. Structure 3322 can provide a high friction or high stiction surface. In FIG. 33B, first magnet 3310 and shield 3340 can be attracted to a second magnet (not shown) in a second electronic device (not shown.) This can cause first magnet 3310 and shield 3340 to separate from return plate 3250, thereby deforming structure 3322, which can be pliable or compliant. As before, first magnet 3310 can provide an increased amount of magnetic flux to hold the second electronic device in place relative to first electronic device 3300. Structure 3322 can increase the friction or stiction between first electronic device 3300 and the second electronic device in a lateral or shear direction.

Figure 34B:
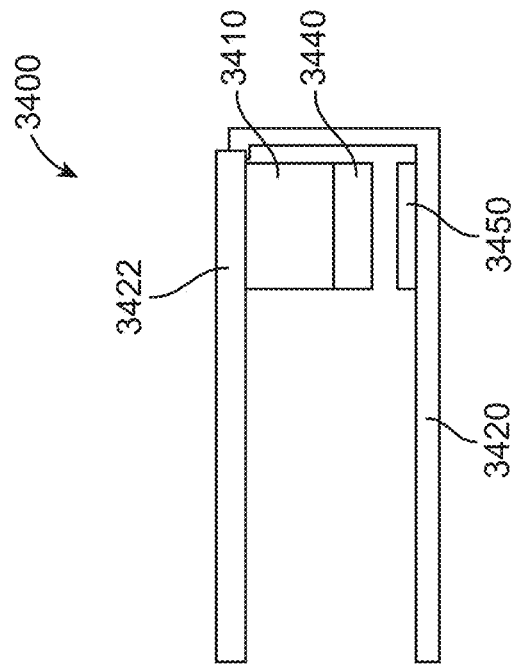
FIGS. 34A and 34B illustrate a moving magnet in conjunction with a high friction surface according to an embodiment of the present invention.
Figure 34A:
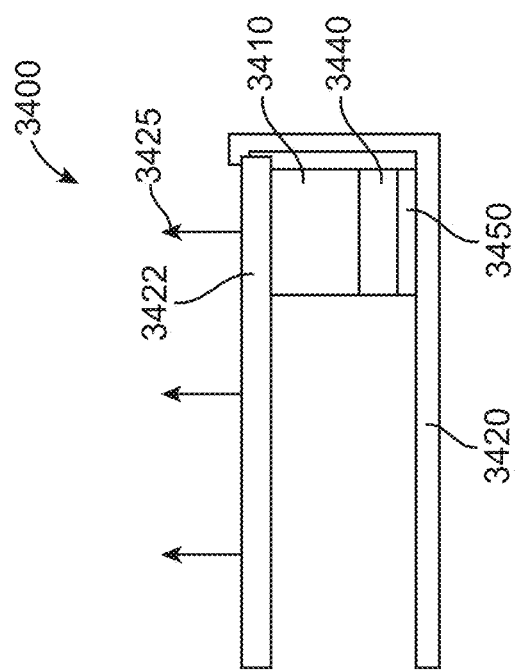

FIGS. 34A and 34B illustrate a moving magnet in conjunction with a high friction surface according to an embodiment of the present invention. In this example, first electronic device 3400 can be a wireless charger device or other device having a first magnet 3410 (which can be, e.g., any of the primary annular magnetic alignment components described above). In FIG. 34A, first magnet 3410 and shield 3440 can be magnetically attracted or attached to return plate 3450 in first electronic device 3400. First electronic device 3400 can be housed in device enclosure 3420. Some or all of a surface of device enclosure 3420 can have a coating, layer, or other structure 3422, in this example over a top surface of first electronic device 3400. Structure 3422 can provide a high friction or high stiction surface. In FIG. 34B, first magnet 3410 and shield 3440 can be attracted to a second magnet (not shown) in a second electronic device (not shown.) The separation of first magnet 3410 and shield 3440 from return plate 3450 can push the top surface formed by structure 3422 upward where it can engage the second electronic device with a high-friction surface. As before, first magnet 3410 can provide an increased amount of magnetic flux to hold the second electronic device in place relative to first electronic device 3400. Structure 3422 can increase the friction or stiction between first electronic device 3400 and the second electronic device in a lateral or shear direction.

Figure 35A:
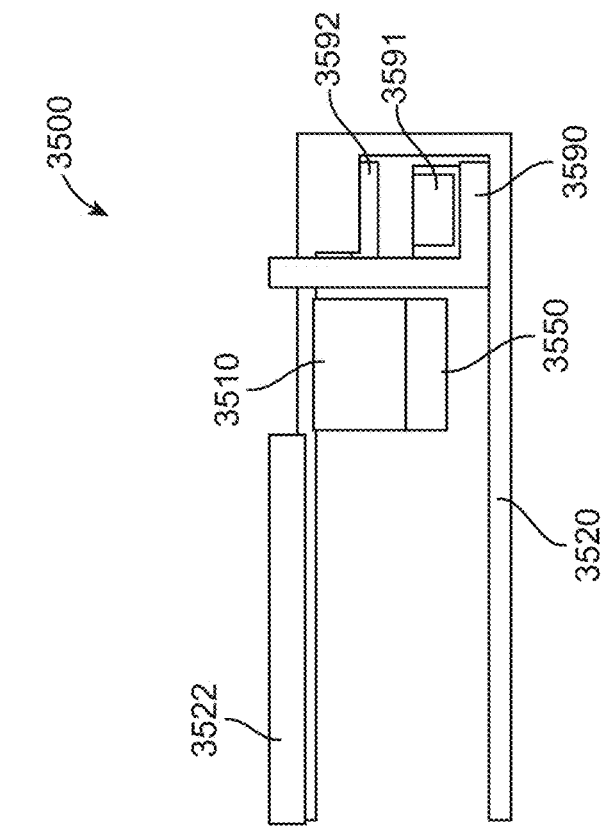
FIGS. 35A and 35B illustrate another moving magnet in conjunction with a high friction surface according to an embodiment of the present invention.
Figure 35B:
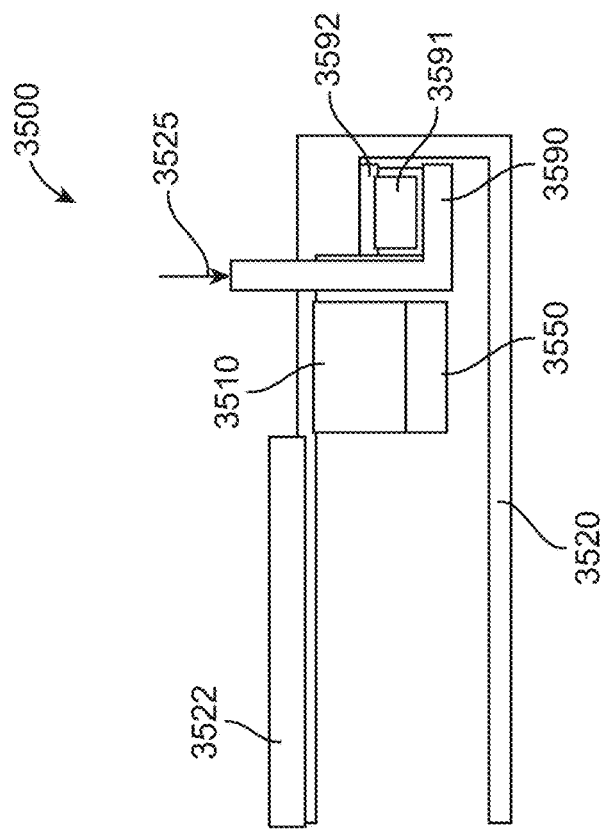

FIGS. 35A and 35B illustrate another moving magnet in conjunction with a high friction or high stiction surface according to an embodiment of the present invention. In this example, first electronic device 3500 can be a wireless charger device or other device having a first magnet 3510 (which can be, e.g., any of the annular magnetic alignment components described above). In FIG. 35A, first magnet 3510 and first shield 3550 can be fixed in place in device enclosure 3520 of first electronic device 3500. Some or all of a surface of device enclosure 3520 can have a coating, layer, or other structure 3522. Structure 3522 can provide a high friction or high stiction surface. First electronic device 3500 can further include a moving second magnet 3591 and second shield 3592, which can be attached to sliding mechanism 3590. In FIG. 35B, as a second electronic device (not shown) comes into contact with first electronic device 3500, sliding mechanism 3590 can be depressed, thereby moving second magnet 3591 away from second shield 3592 and the top surface of device enclosure 3520. The polarity of second magnet 3591 can be in opposition to, or the opposite of, the polarity of first magnet 3510, such that the net magnetic flux at a top surface of device enclosure 3520 is increased as sliding mechanism 3590 is depressed. Structure 3522 can increase the friction or stiction between first electronic device 3500 and the second electronic device in a lateral or shear direction.

Figure 36:
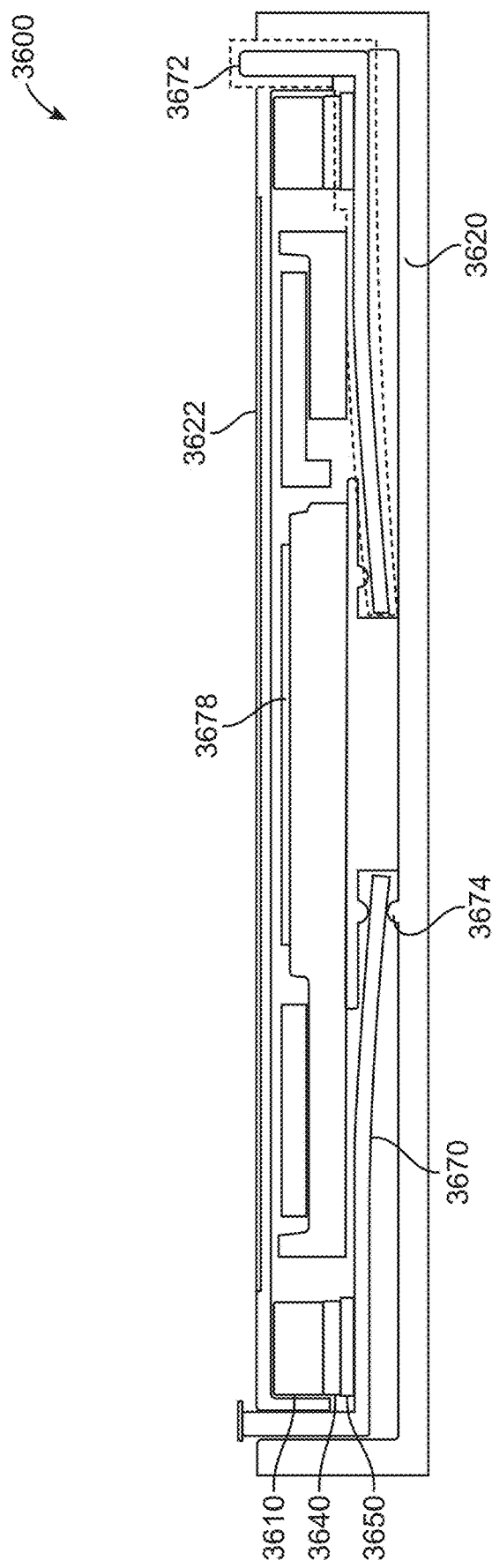
FIG. 36 illustrates a cutaway side view of another moving magnet structure according to an embodiment of the present invention.
Figure 37:
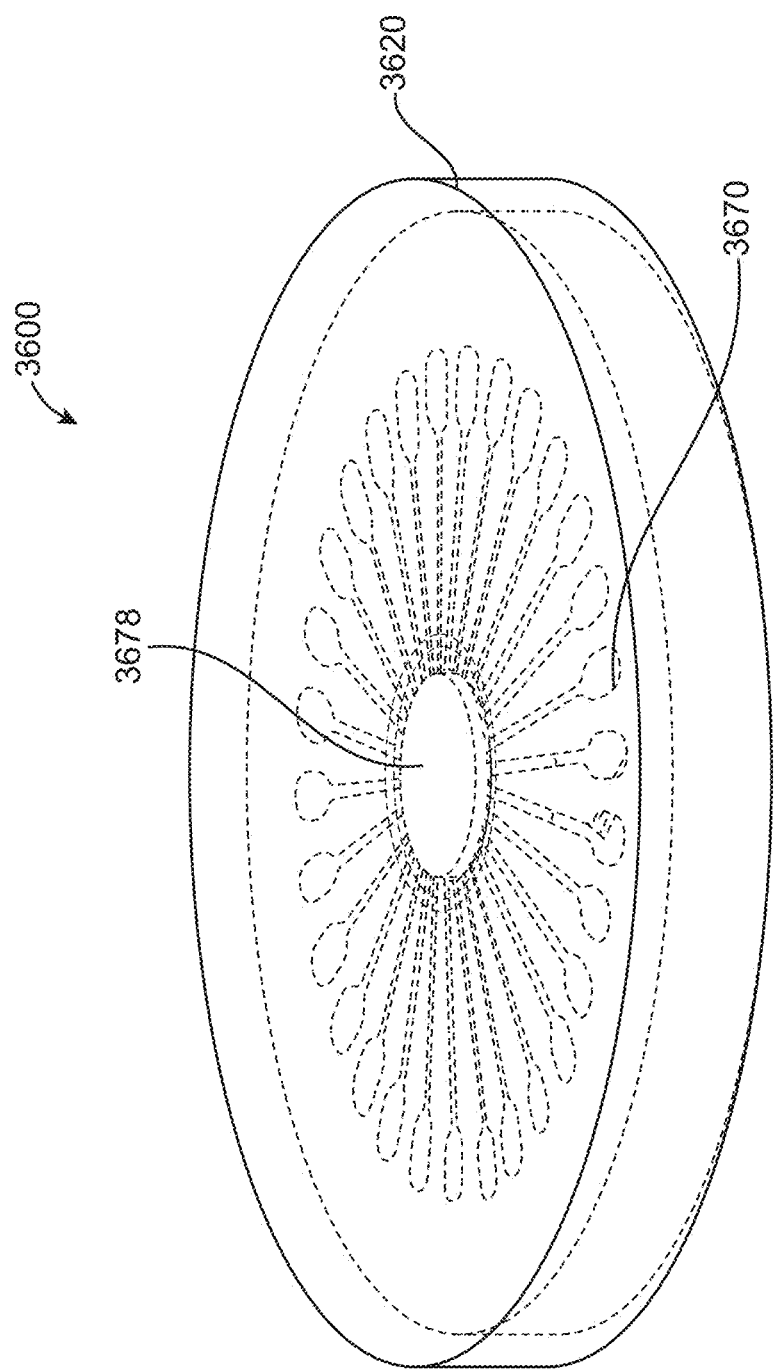
FIG. 37 is a partially transparent view of the moving magnet structure of FIG. 36.

FIG. 37 is a partially transparent view of the moving magnet structure of FIG. 36. First electronic device 3600 can be housed in device enclosure 3620. As before, first electronic device 3600 can include inductive charging, near field communication complements, or other electronic circuits for components 3678. Return plates 3650 (shown in FIG. 36) can be attached to beams 3670.

Figure 38:
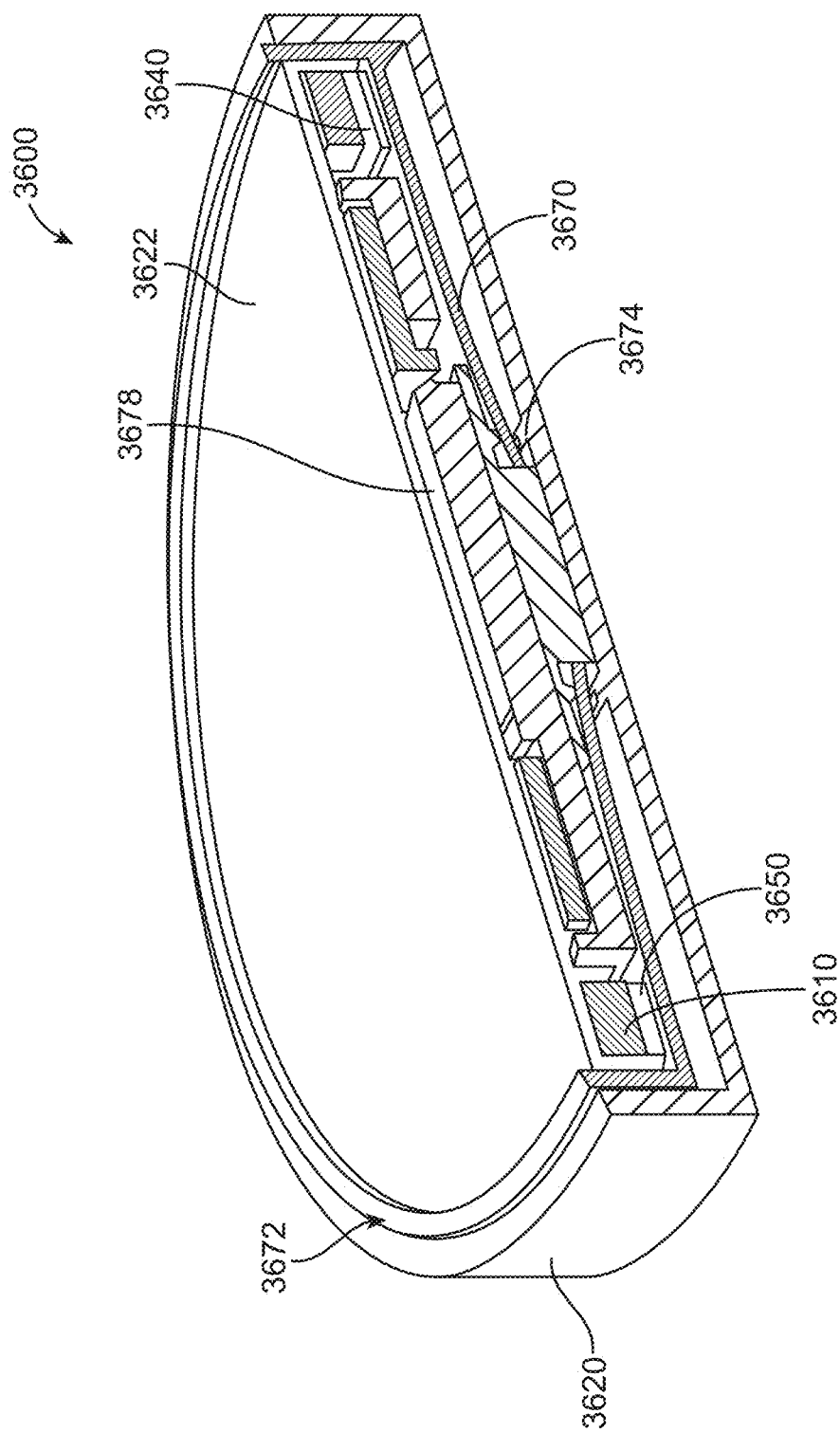
FIG. 38 is another cutaway side view of the electronic device of FIG. 36.

FIG. 38 is another cutaway side view of the electronic device of FIG. 36. First electronic device 3600 can be housed in device enclosure 3620. As before, first electronic device 3600 can include inductive charging, near field communication components, or other electronic circuits for components 3678. Return plates 3650 can be attached to beams 3670. First magnets 3610 and shield 3640 can be attracted or attached to return plate 3650. A high friction or high stiction structure 3622 can cover some or all of a top surface of first electronic device 3600. Beams 3670 can be attached to return plates 3650, can be anchored at points 3674, and can have a tip 3672 extending above top surface of device enclosure 3620.

Figure 39:
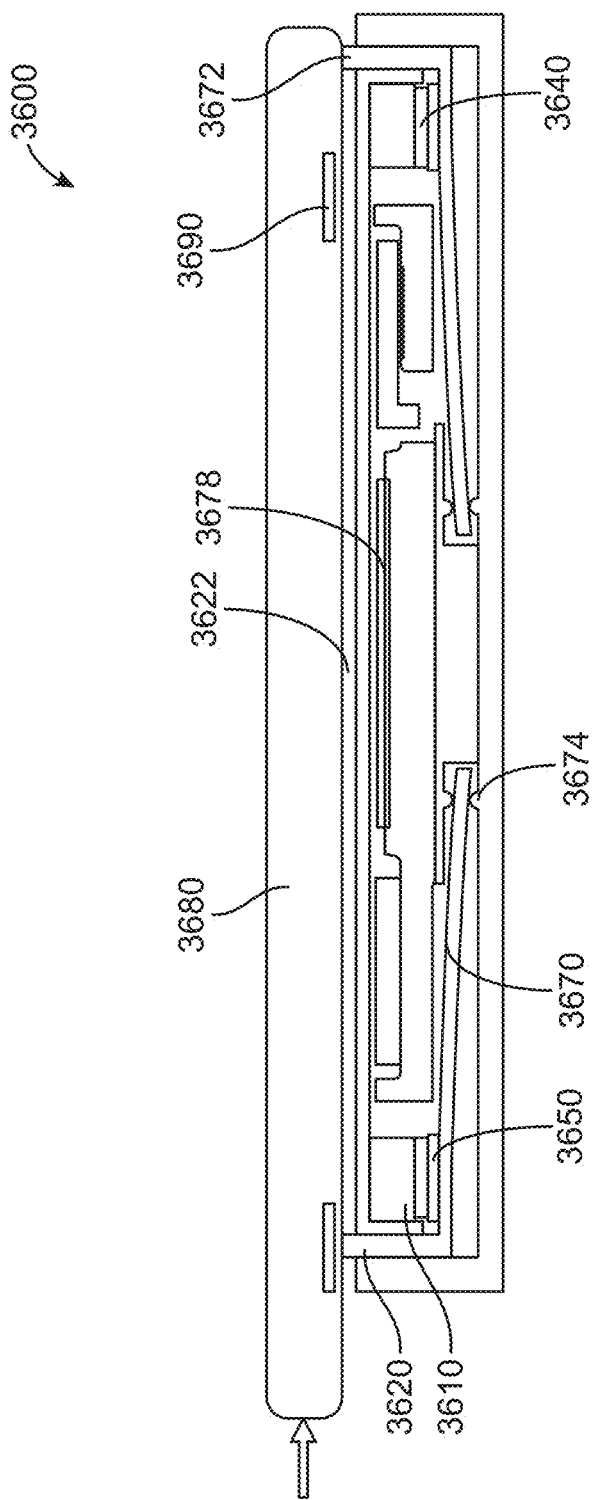
FIGS. 39 and 40 illustrate the electronic device of FIG. 36 as it engages with a second electronic device.
Figure 40:
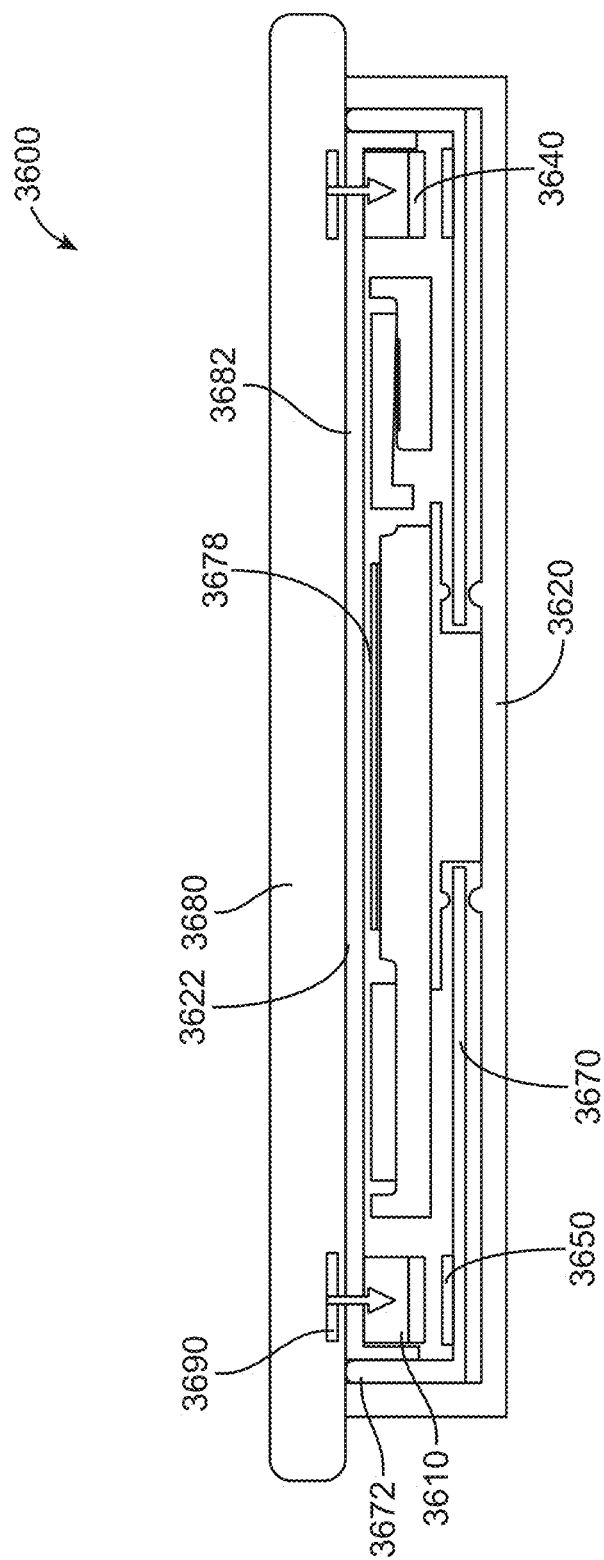

FIGS. 39 and 40 illustrate the electronic device of FIG. 36 as it engages with a second electronic device. In FIG. 39, second electronic device 3680 can include second magnets 3690. Second electronic device 3680 can engage with first electronic device 3600. First electronic device 3600 can include first magnets 3610, shields 3640, and return plates 3650. Return plates 3650 can be attached to beams 3670. Beams 3670 can include tips 3672 which can extend above a top surface of device enclosure 3620. Tips 3672 can prevent second electronic device 3680 from engaging with the high friction or high stiction structure 3622 of first electronic device 3600 until the second electronic device 3680 is aligned, or nearly aligned, with first electronic device 3600. Beams 3670 can be attached at points 3674 to device enclosure 3620. First electronic device 3600 can include components 3678.

In FIG. 40, second electronic device 3680 can be aligned with the first electronic device 3600. When this occurs, first magnets 3610 and shields 3640 can detach from return plates 3650. This can increase magnetic flux between second magnets 3690 in second electronic device 3680 and first magnets 3610 and first electronic device 3600. Tips 3672 can become depressed into device enclosure 3620 due to this increase magnetic attraction, thereby further pushing return plates 3650 away from shields 3640. High friction or high stiction structure 3622 can engage with second electronic device 3680 to increase the shear force necessary for a detachment of second electronic device 3680 from first electronic device 3600.

In these and other embodiments of the present invention, various structures can be used to constrain movement of magnets in an electronic device. Examples are shown in the following figures.

Figure 41A:
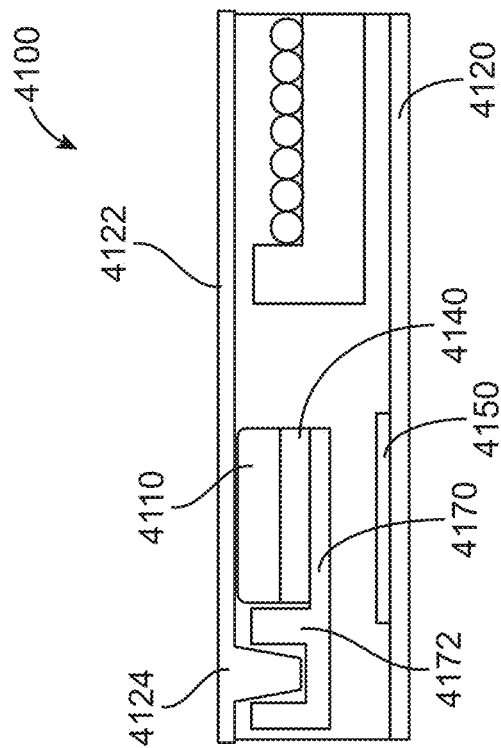
FIGS. 41A and 41B illustrate structures for constraining motions of magnets in an electronic device according to an embodiment of the present invention.
Figure 41B:
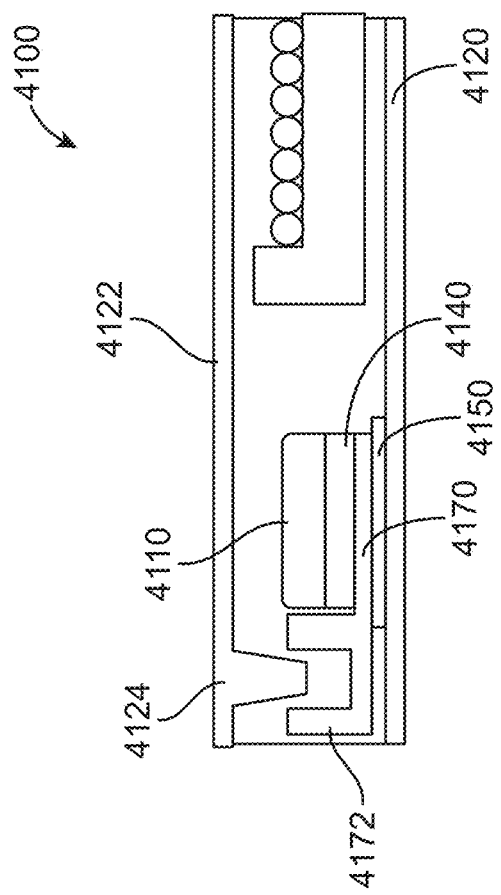

FIGS. 41A and 41B illustrate structures for constraining motions of magnets in an electronic device according to an embodiment of the present invention. In this example, first electronic device 4100 can be a wireless charger device or other device having a first magnet 4110 (which can be, e.g., any of the annular magnetic alignment components described above). In FIG. 41A, magnet 4110, shield 4140, and structure 4170 can be housed by device enclosure 4120 in electronic device 4100. Structure 4170 can include notch 4172, which can fit in tab 4124. In FIG. 41B, magnet 4110 has moved, taking along with it shield 4140 and structure 4170. Notch 4172 accepts tab 4124 as shield 4140 detaches from return plate 4150. This can constrain the motion of magnets 4110 in electronic device 4100. Electronic device 4100 can include a top device enclosure portion 4122. Tab 4124 can be formed as part of or separate from top device enclosure portion 4122.

Figure 42B:
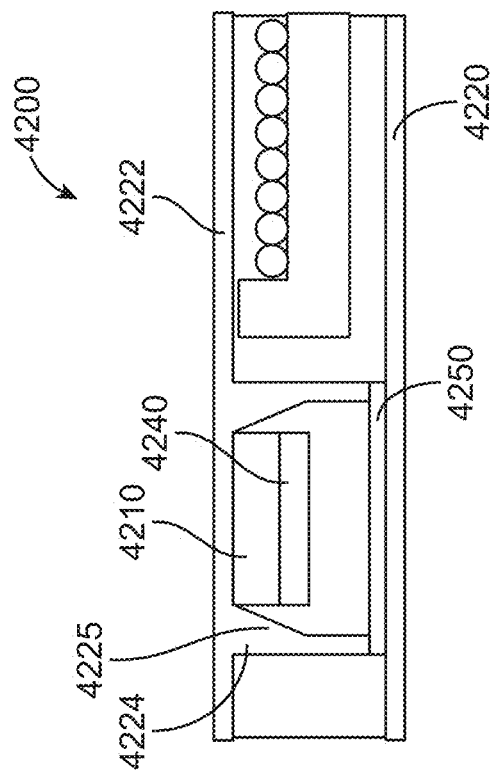
FIGS. 42A and 42B illustrate structures for constraining motions of magnets in an electronic device according to an embodiment of the present invention.
Figure 42A:
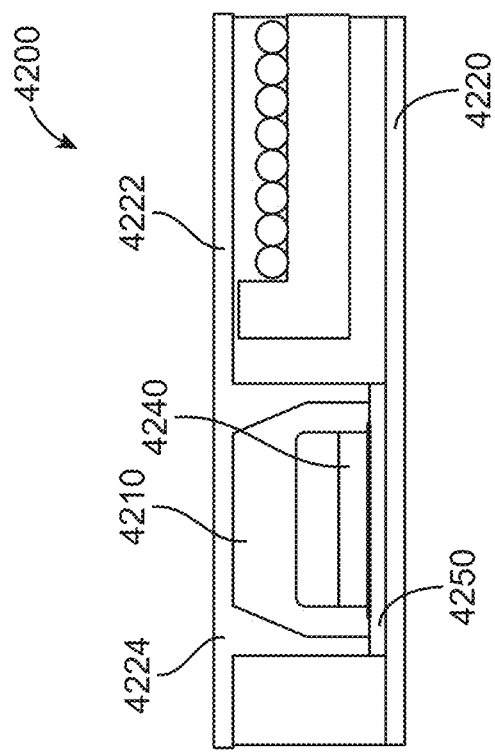

FIGS. 42A and 42B illustrate structures for constraining motions of magnets in an electronic device according to an embodiment of the present invention. In this example, first electronic device 4200 can be a wireless charger device or other device having a first magnet 4210 (which can be, e.g., any of the annular magnetic alignment components described above). In FIG. 42A, magnet 4210, shield 4240, and return plate 4250 can be housed in device enclosure 4220 of electronic device 4200. Top device enclosure portion 4222 can include guide 4224. Guide 4224 can constrain motion of magnet 4210 in electronic device 4200. In FIG. 42B, magnet 4210 and shield 4240 have detached from return plate 4250 and have been guided into position by guide 4224. Guide 4224 can include one or more chamfered edges 4225. Again, guide 4224 can be formed along with or separate from top device enclosure portion 4222 of electronic device 4200.

Figure 43B:
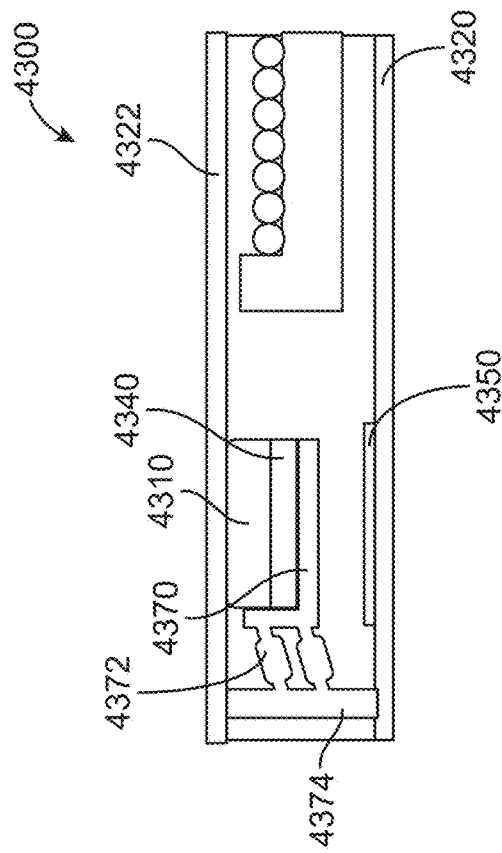
FIGS. 43A and 43B illustrate structures for constraining motions of magnets an electronic device according to an embodiment of the present invention.
Figure 43A:
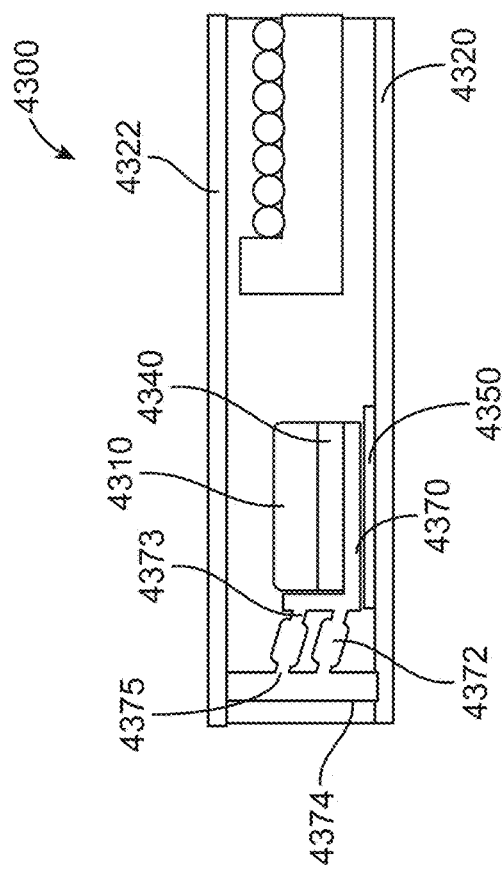

FIGS. 43A and 43B illustrate structures for constraining motions of magnets in an electronic device according to an embodiment of the present invention. In this example, first electronic device 4300 can be a wireless charger device or other device having a first magnet 2410 (which can be, e.g., any of the annular magnetic alignment components described above). In FIG. 43A, magnet 4310, shield 4340, and return plate 4350 can be housed in device enclosure 4320 of electronic device 4300. Magnet 4310 and shield 4340 can be supported by structure 4370. Structure 4370 can be attached to anchor 4374 through actuators 4372. Actuators 4372 can have hinges 4373 and 4375 at each end to allow structure 4370 to move relative to anchor 4374. Anchor 4374 can be attached to, or formed as either part of, top device enclosure portion 4322 or device enclosure 4320. In FIG. 43B, magnet 4310 and shield 4340 have detached from return plate 4350. Actuators 4372 have changed positions but continued to connect structure 4370 to anchor 4374. Anchor 4374 can be attached to, or formed as either part of, top device enclosure portion 4322 or device enclosure 4320.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication, including device identification, from a tag circuit located in one device to a reader circuit located in another device. (As used herein, "NFC" encompasses various protocols, including known standard protocols, that use near-field electromagnetic radiation to communicate data between antenna structures, e.g., coils of wire, that are in proximity to each other.) For example, each device that has an annular magnetic alignment component can also have an NFC coil that can be disposed inboard of and concentric with the annular magnetic alignment component. Where the device also has an inductive charging coil (which can be a transmitter coil or a receiver coil), the NFC coil can be disposed in an annular gap between the inductive charging coil and the annular magnetic alignment component. In some embodiments, an NFC protocol can be used to allow a portable electronic device to identify an accessory device when the respective magnetic alignment components of the portable electronic device and the accessory device are brought into alignment. For example, the NFC coil of a portable electronic device can be coupled to an NFC reader circuit while the NFC coil of an accessory device is coupled to an NFC tag circuit. When devices are brought into proximity, the NFC reader circuit of the portable electronic device can be activated to read the NFC tag of the accessory device. In this manner, the portable electronic device can obtain information (e.g., device identification) from the accessory device.

In some embodiments, an NFC reader in a portable electronic device can be triggered by detecting a change in a DC (or static) magnetic field within the portable electronic device that corresponds to a change expected when an accessory device having a complementary magnetic alignment component is brought into alignment. When the expected change is detected, the NFC reader can be activated to read an NFC tag in the other device, assuming the other device is present.

Examples of devices incorporating NFC circuitry and magnetic alignment components will now be described.

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 44:
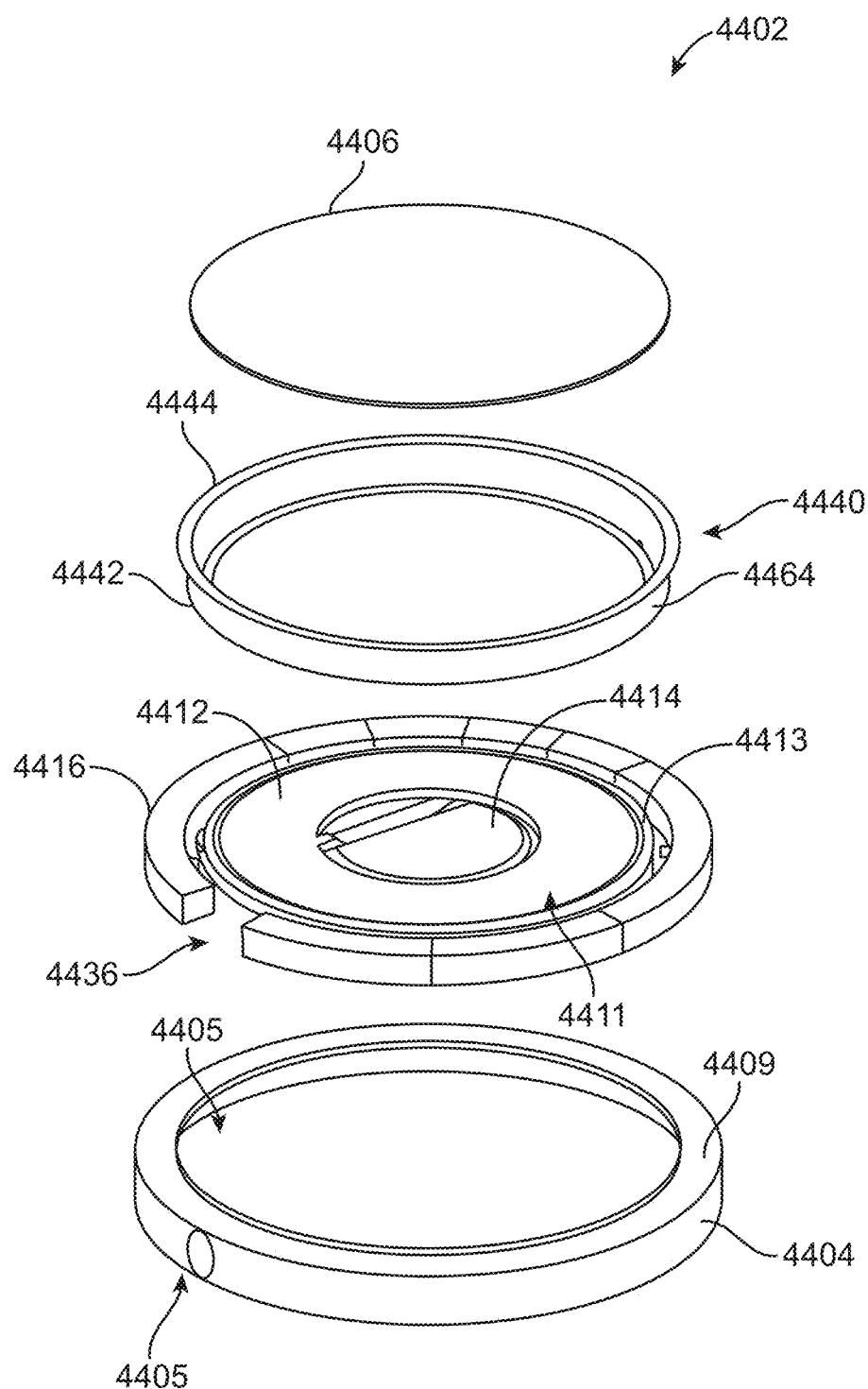
FIG. 44 shows an exploded view of a wireless charger device incorporating an NFC tag circuit according to some embodiments.
Figure 45:
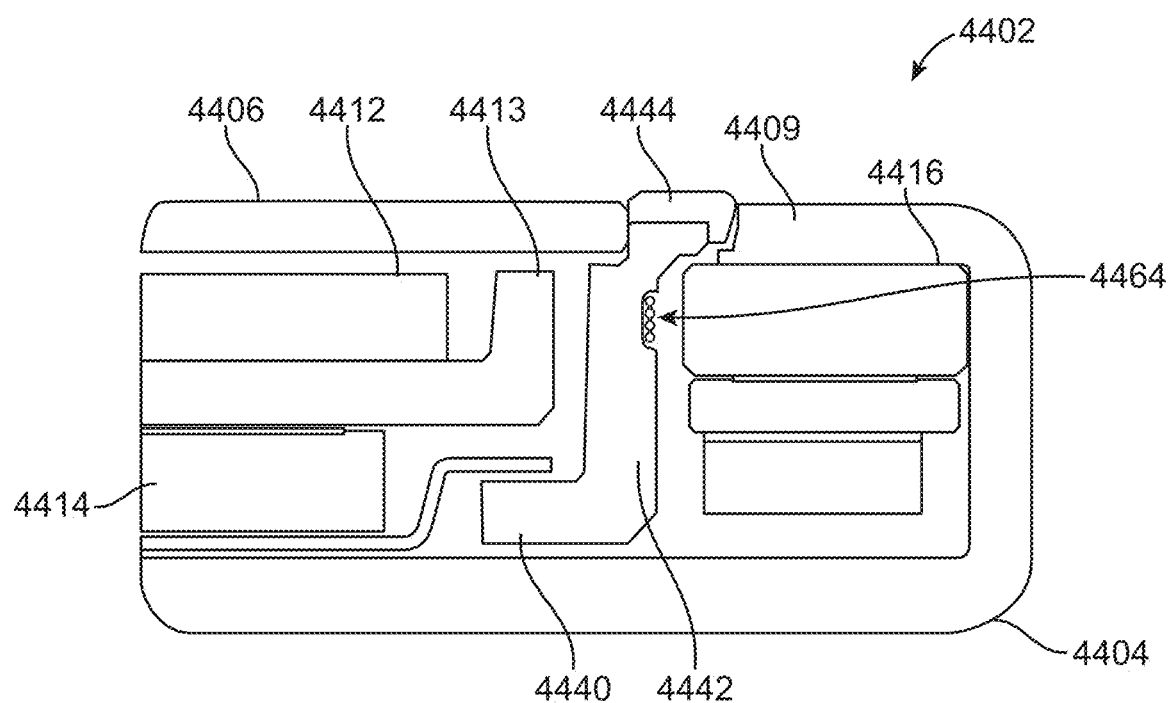
FIG. 45 shows a partial cross-section view of wireless charger device according to some embodiments.

FIG. 44 shows an exploded view of a wireless charger device 4402 incorporating an NFC tag according to some embodiments, and FIG. 45 shows a partial cross-section view of wireless charger device 4402 according to some embodiments. As shown in FIG. 44, wireless charger device 4402 can include an enclosure 4404, which can be made of plastic or metal (e.g., aluminum), and a charging surface 4406, which can be made of silicone, plastic, glass, or other material that is permeable to AC and DC magnetic fields. Charging surface 4406 can be shaped to fit within a circular opening 4403 at the top of enclosure 4404.

A wireless transmitter coil assembly 4411 can be disposed within enclosure 4404. Wireless transmitter coil assembly 4411 can include a wireless transmitter coil 4412 for inductive power transfer to another device as well as AC magnetic and/or electric shield(s) 4413 disposed around some or all surfaces of wireless transmitter coil 4412. Control circuitry 4414 (which can include, e.g., a logic board and/or power circuitry) to control wireless transmitter coil 4412 can be disposed in the center of coil 4412 and/or underneath coil 4412. In some embodiments, control circuitry 4414 can operate wireless transmitter coil 4412 in accordance with a wireless charging protocol such as the Qi protocol or other protocols.

A primary annular magnetic alignment component 4416 can surround wireless transmitter coil assembly 4411. Primary annular magnetic alignment component 4416 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above.) In some embodiments, the diameter and thickness of primary annular magnetic alignment component 4416 is chosen such that arcuate magnet sections of primary annular magnetic alignment component 4416 fit under a lip 4409 at the top surface of enclosure 4404, as best seen in FIG. 45. For instance, each arcuate magnet section can be inserted into position under lip 4409, either before or after magnetizing the inner and outer regions. In some embodiments, primary annular magnetic alignment component 4416 can have a gap 4436 between two adjacent arcuate magnet sections. Gap 4436 can be aligned with an opening 4407 in a side surface of enclosure 4404 to allow external wires to be connected to wireless transmitter coil 4412 and/or control circuitry 4414.

A support ring subassembly 4440 can include an annular frame 4442 that extends in the axial direction and a friction pad 4444 at the top edge of frame 4442. Friction pad 4444 can be made of a material such as silicone or thermoplastic elastomers (TPE) such as thermoplastic urethane (TPU) and can provide support and protection for charging surface 4406. Frame 4442 can be made of a material such as polycarbonate (PC), glass-fiber reinforced polycarbonate (GFPC), or glass-fiber reinforced polyamide (GFPA). Frame 4442 can have an NFC coil 4464 disposed thereon. For example, NFC coil 4464 can be a four-turn or five-turn solenoidal coil made of copper wire or other conductive wire that is wound onto frame 4442. NFC coil 4464 can be electrically connected to NFC tag circuitry (not shown) that can be part of control circuitry 4414. The relevant design principles of NFC circuits are well understood in the art and a detailed description is omitted. Frame 4442 can be inserted into a gap region 4417 between primary annular magnetic alignment component 4416 and wireless transmitter coil assembly 4411. In some embodiments, gap region 4417 is shielded by AC shield 4413 from AC electromagnetic fields generated in wireless transmitter coil 4412 and is also shielded from DC magnetic fields of primary annular magnetic alignment component 4416 by the closed-loop configuration of the arcuate magnet sections.

Figure 46:
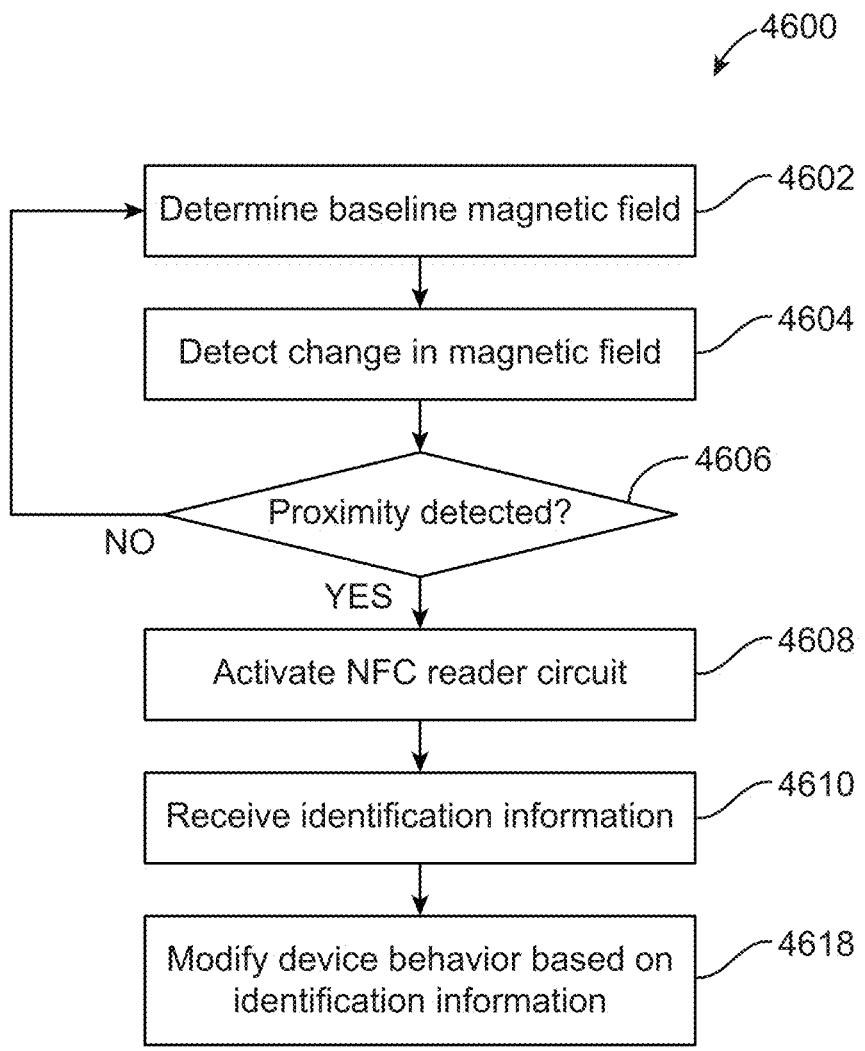
FIG. 46 shows a flow diagram of a process that can be implemented in a portable electronic device according to some embodiments.

FIG. 46 shows a flow diagram of a process 4600 that can be implemented in portable electronic device 5004 according to some embodiments. In some embodiments, process 4600 can be performed iteratively while portable electronic device 5004 is powered on. At block 4602, process 4600 can determine a baseline magnetic field, e.g., using magnetometer 5080. At block 4604, process 4600 can continue to monitor signals from magnetometer 5080 until a change in magnetic field is detected. At block 4606, process 4600 can determine whether the change in magnetic field matches a magnitude and direction of change associated with alignment of a complementary magnetic alignment component. If not, then the baseline magnetic field can be updated at block 4602. If, at block 4606, the change in magnetic field matches a magnitude and direction of change associated with alignment of a complementary alignment component, then at block 4608, process 4600 can activate the NFC reader circuitry associated with NFC coil 5060 to read an NFC tag of an aligned device. In some embodiments, NFC tags associated with different types of devices (e.g., a passive accessory versus an active accessory such as a wireless charger) are tuned to respond to different stimulating signals from the NFC reader circuitry, and information about the particular change in magnetic field can be used to determine a particular stimulating signal to be generated by the NFC reader circuitry. At block 4610, process 4600 can receive identification information read from the NFC tag. At block 4612, process 4600 can modify a behavior of portable electronic device 5004 based on the identification information, for example, generating a color wash effect as described above. After block 4612, process 4600 can optionally return to block 4602 to provide continuous monitoring of magnetometer 5080. It should be understood that process 4600 is illustrative and that other processes may be performed in addition to or instead of process 4600.

It will be appreciated that the NFC tag and NFC reader circuits described above are illustrative and that variations and modifications are possible. For example, coil designs can be modified by replacing wound wire coils with etched coils (or vice versa) and solenoidal coils with flat coils (or vice versa). "Wound wire" coils can be made using a variety of techniques, including by winding a wire, by stamping a coil from a copper sheet and molding plastic over the stamped part, or by using a needle dispenser to deposit wire on a plastic part; the wire can be heated so that it embeds into the softened plastic. Etched coils can be made by coating a surface with metal and etching away the unwanted metal. The number of turns in various NFC coils can be modified for a particular application. The choice of wound wire coils or etched coils for a particular device may depend on various design considerations. For instance, in devices that have an internal logic board, a wound wire NFC coil can terminate to the logic board; where a logic board is absent, an etched coil may simplify termination of the coil. Other design considerations may include the Q factor of the coil (a wound coil can provide higher Q in a smaller space) and/or ease of assembly.

Further, where a device that has an NFC tag circuit also has active circuitry (such as wireless charger devices that have active circuitry to control charging behavior), the NFC tag circuit is not limited to being a passive tag; an active NFC tag circuit can be provided to enable two-way communication with a compatible portable electronic device. For example, active NFC circuits in a portable electronic device and a wireless charger device can be used to support delivery of firmware updates to the wireless charger device.

Proximity-detection techniques can also be varied. For example, a different type of magnetometer (e.g., a single-axis magnetometer) can be used, or multiple magnetometers in different locations relative to the magnetic alignment components can be used. In some embodiments, a Hall effect sensor can be used instead of a magnetometer, although false positives may increase because a Hall effect sensor can generally only indicate a change or no-change rather than measuring a magnitude or direction of change.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An adapter comprising:
   a lateral base portion, wherein the base portion includes an opening, wherein the opening is configured to provide an attachment to a camera stabilizer; and
   an upright portion comprising:
      a contacting surface for contacting an electronic device; and
      an enclosure, the enclosure forming a ring around the contacting surface, the enclosure further forming sides and a back of the upright portion,
   wherein the enclosure and the contacting surface enclose:
      an attachment structure to attach the electronic device to the adapter; and
      charging components to charge the electronic device.

2. The adapter of claim 1 wherein the upright portion is attached to the base portion with a right-angle portion such that the upright portion is orthogonal to the base portion.

3. The adapter of claim 1 wherein the upright portion is attached to the base portion with a hinge such that the upright portion is rotatable relative to the base portion.

4. The adapter of claim 1 further comprising a near-field communication transmitter.

5. The adapter of claim 1 wherein the contacting surface provides a high-friction surface.

6. The adapter of claim 5 wherein the surface of the contacting surface is adhesive.

7. The adapter of claim 1 wherein the attachment structure comprises a magnet array.

8. The adapter of claim 7 wherein the camera stabilizer is one of a tripod or a gimbal.

9. An adapter comprising:
   a base portion forming a base; and
   an upright portion attached to the base portion with a hinge such that the base portion is rotatable relative to the upright portion, the upright portion comprising:
      a contacting surface for contacting an electronic device; and
      an enclosure, the enclosure around the contacting surface, the enclosure further forming sides and a back of the upright portion,
   wherein the enclosure and the contacting surface enclose an attachment feature.

10. The adapter of claim 9 wherein the upright portion includes a recess and the base portion is rotatable about the hinge such that the base portion fits in the recess.

11. The adapter of claim 9 wherein the base portion includes a receptacle for receiving power and the enclosure and the contacting surface further enclose a charging coil.

12. The adapter of claim 9 further comprising a near-field communication transmitter.

13. The adapter of claim 9 wherein the contacting surface provides a high-friction surface.

14. The adapter of claim 13 wherein the surface of the contacting surface is adhesive.

15. An adapter comprising:
   a lateral base portion; and
   an upright portion attached to the base portion with a right-angle portion such that the upright portion is orthogonal to the base portion, the upright portion comprising:
      a contacting surface for contacting an electronic device; and
      an enclosure, the enclosure around the contacting surface, the enclosure further forming sides and a back of the upright portion,
   wherein the enclosure and the contacting surface enclose an attachment feature.

16. The adapter of claim 15 wherein the enclosure for the upright portion is formed with an enclosure for the base portion and the right-angle portion as a single piece.

17. The adapter of claim 15 wherein the attachment feature comprises a magnet array and the enclosure and the contacting surface further enclose a charging coil.

18. The adapter of claim 15 further comprising a near-field communication transmitter.

19. The adapter of claim 15 wherein the contacting surface provides a high-friction surface.

20. The adapter of claim 19 wherein the surface of the contacting surface is adhesive.

* * * * *